US011085474B2

(12) United States Patent
Davis et al.

(10) Patent No.: US 11,085,474 B2
(45) Date of Patent: Aug. 10, 2021

(54) FURNITURE WITH FLEXIBLE DOVETAIL DOWEL AND SLOT JOINT

(71) Applicant: Clark Davis, Genola, UT (US)

(72) Inventors: Clark Evan Davis, Provo, UT (US); Paul Schmidt, Provo, UT (US)

( * ) Notice: Subject to any disclaimer, the term of this patent is extended or adjusted under 35 U.S.C. 154(b) by 524 days.

(21) Appl. No.: 16/130,878

(22) Filed: Sep. 13, 2018

(65) Prior Publication Data

US 2019/0085886 A1    Mar. 21, 2019

Related U.S. Application Data

(60) Provisional application No. 62/558,967, filed on Sep. 15, 2017.

(51) Int. Cl.
| | |
|---|---|
| *F16B 12/22* | (2006.01) |
| *F16B 12/24* | (2006.01) |
| *A47B 96/06* | (2006.01) |
| *F16B 21/09* | (2006.01) |
| *F16B 12/26* | (2006.01) |
| *F16B 12/10* | (2006.01) |
| *F16B 21/08* | (2006.01) |
| *F16B 15/06* | (2006.01) |

(52) U.S. Cl.
CPC ............... *F16B 12/24* (2013.01); *A47B 96/06* (2013.01); *F16B 12/22* (2013.01); *F16B 12/26* (2013.01); *F16B 21/09* (2013.01); *A47B 2230/0033* (2013.01); *F16B 15/06* (2013.01); *F16B 21/084* (2013.01); *F16B 2012/103* (2013.01)

(58) Field of Classification Search
CPC ........ F16B 12/12; F16B 12/125; F16B 12/22; F16B 12/24; F16B 12/26
See application file for complete search history.

(56) References Cited

U.S. PATENT DOCUMENTS

| | | |
|---|---|---|
| 919,257 A | 4/1909 | Seydewitz |
| 981,532 A | 1/1911 | Cary |
| 1,061,297 A | 5/1913 | Johnson |
| 1,419,647 A | 6/1922 | Shepherdson |
| 1,431,823 A | 10/1922 | Georges |
| 1,747,900 A | 2/1930 | Jenny |

(Continued)

FOREIGN PATENT DOCUMENTS

| | | |
|---|---|---|
| CA | 1255355 | 6/1989 |
| CH | 281702 | 3/1952 |

(Continued)

OTHER PUBLICATIONS

Celery Rocking Chair viewed at http://www.eroomservice.com/manufacturer/celery/ circa Dec. 3, 2011.

(Continued)

*Primary Examiner* — Daniel J Wiley
(74) *Attorney, Agent, or Firm* — Pate Peterson PLLC; Brett Peterson

(57) ABSTRACT

An improved joint is provided for modular furniture. The joint includes a dowel and slot. The dowel is held in the slot tightly to provide stiffness to the joint. The dowel may include a flanged head which is bent elastically by the slot when the dowel is fully inserted into the slot. The head of the dowel may be maintained in a bent configuration when the joint is in assembled configuration.

19 Claims, 39 Drawing Sheets

(56) References Cited

U.S. PATENT DOCUMENTS

| | | |
|---|---|---|
| 1,903,631 A | 4/1933 | Morrison |
| 1,940,117 A | 12/1933 | Carpos |
| 1,981,646 A | 11/1934 | Hamley |
| 2,240,256 A | 4/1941 | Elmendorf |
| 2,279,864 A | 4/1942 | Eide |
| 2,334,912 A | 11/1943 | Eide |
| 2,369,930 A | 2/1945 | Wagner |
| D144,730 S | 5/1946 | Perrault |
| 2,418,731 A | 4/1947 | Seitz |
| 2,479,086 A | 8/1949 | Silverman |
| 2,481,671 A | 9/1949 | John et al. |
| 2,486,987 A | 11/1949 | Scarlett |
| 2,518,955 A | 8/1950 | Stelzer |
| 2,534,413 A | 12/1950 | Cenis |
| 2,551,071 A | 5/1951 | Tyncs |
| D164,552 S | 9/1951 | Curtis |
| 2,595,002 A | 4/1952 | Schneider |
| 2,602,012 A | 7/1952 | Doty |
| 2,615,771 A | 10/1952 | Curtis |
| 2,632,498 A | 3/1953 | Curtis |
| 2,672,181 A | 3/1954 | Rose |
| 2,677,491 A | 5/1954 | Burger |
| 2,703,724 A | 3/1955 | Der Yuen |
| 2,720,253 A | 10/1955 | Turner |
| 2,745,591 A | 5/1956 | Holt |
| 2,786,789 A | 3/1957 | Carlson |
| 2,792,877 A | 5/1957 | West |
| 2,801,895 A | 8/1957 | Gass |
| 2,825,101 A | 3/1958 | Rubsnstein |
| 3,053,598 A | 9/1962 | Cheslow |
| 3,089,675 A | 5/1963 | Lozier |
| 3,149,880 A | 9/1964 | Steuer |
| 3,186,027 A | 6/1965 | Merillat |
| 3,262,405 A | 7/1966 | Sutton |
| 3,300,170 A | 1/1967 | Charles |
| 3,300,245 A | 1/1967 | Rumble |
| D212,601 S | 11/1968 | Rubsnstein |
| 3,527,497 A | 9/1970 | Self |
| 3,547,491 A | 12/1970 | Bovasso |
| 3,578,385 A | 5/1971 | Stiglitz |
| 3,603,274 A | 9/1971 | Ferdinand |
| 3,603,656 A | 9/1971 | Ferman |
| 3,636,893 A | 1/1972 | Lange |
| 3,674,328 A | 7/1972 | White et al. |
| 3,684,285 A | 8/1972 | Kane |
| 3,697,363 A | 10/1972 | Martinez |
| 3,783,801 A | 1/1974 | Engman |
| 3,788,700 A | 1/1974 | Wartes |
| 3,812,977 A | 5/1974 | Glassman |
| 3,831,533 A | 8/1974 | Kellogg |
| 3,847,435 A | 11/1974 | Skinner |
| 4,021,128 A | 5/1977 | Chiames |
| 4,055,924 A | 11/1977 | Beaver |
| D247,596 S | 3/1978 | Osamu |
| 4,082,356 A | 4/1978 | Johnson |
| 4,099,472 A | 7/1978 | Kellogg |
| 4,103,818 A | 8/1978 | Raubenheimer |
| 4,140,065 A | 2/1979 | Chacon |
| 4,153,311 A | 5/1979 | Takhasaki |
| 4,158,277 A | 6/1979 | Krempp et al. |
| 4,188,067 A | 2/1980 | Elmer |
| 4,191,113 A | 3/1980 | Hogberg |
| 4,202,581 A | 5/1980 | Fleishman |
| 4,225,180 A | 9/1980 | Gillis |
| 4,258,464 A * | 3/1981 | Ullman, Jr. ............ A47B 57/22 29/525.01 |
| 4,348,052 A | 9/1982 | Roland |
| 4,390,204 A | 6/1983 | Fleishman |
| 4,419,028 A | 12/1983 | Roland |
| 4,433,753 A | 2/1984 | Watson |
| 4,433,843 A | 2/1984 | Bricco |
| 4,492,332 A | 1/1985 | Collins |
| 4,501,512 A | 2/1985 | Hiltz |
| 4,509,794 A | 4/1985 | Roland |
| 4,533,174 A | 8/1985 | Fleishman |
| 4,544,092 A | 10/1985 | Palmer |
| 4,548,350 A | 10/1985 | Engle |
| 4,574,917 A | 3/1986 | Stoddard |
| 4,591,090 A | 5/1986 | Collins |
| 4,593,950 A | 6/1986 | Vittorio |
| 4,595,105 A | 6/1986 | Gold |
| D289,234 S | 4/1987 | Hoult |
| 4,685,609 A | 8/1987 | Ferrari |
| 4,706,573 A | 11/1987 | Sielaff |
| 4,712,837 A | 12/1987 | Swilley |
| 4,759,449 A | 7/1988 | Gold |
| D299,087 S | 12/1988 | Bruce |
| 4,841,878 A | 6/1989 | Kriegsman |
| D302,216 S | 7/1989 | Roland |
| 4,846,530 A | 7/1989 | Noble |
| 4,867,327 A | 9/1989 | Roland |
| 4,878,439 A | 11/1989 | Samson |
| 4,884,420 A | 12/1989 | Finkel |
| 4,926,759 A | 5/1990 | Vitsky et al. |
| 4,934,765 A | 6/1990 | Slifer |
| 5,011,228 A | 4/1991 | Marcantel |
| 5,069,144 A | 12/1991 | Williford |
| 5,082,329 A | 1/1992 | Mars |
| 5,253,594 A | 10/1993 | Sideris |
| 5,253,595 A | 10/1993 | Heidmann |
| 5,263,766 A | 11/1993 | McCullough |
| 5,275,467 A | 1/1994 | Kawecki |
| 5,343,816 A | 9/1994 | Sideris |
| 5,354,589 A | 10/1994 | Waas |
| 5,367,964 A | 11/1994 | Hockensmith |
| 5,387,027 A | 2/1995 | Maloney |
| 5,454,331 A | 10/1995 | Green |
| 5,478,145 A * | 12/1995 | Kamachi ............... F16B 5/02 312/263 |
| 5,605,378 A | 2/1997 | Oyediran |
| 5,613,449 A | 3/1997 | Pullman |
| 5,644,995 A | 7/1997 | Gurwell et al. |
| 5,655,812 A | 8/1997 | Albecker |
| 5,706,741 A | 1/1998 | Thorp |
| 5,720,537 A | 2/1998 | Lutz |
| 5,752,611 A | 5/1998 | Nakagawa |
| 5,765,922 A | 6/1998 | Hsia |
| 5,803,548 A | 9/1998 | Battle |
| 5,803,561 A | 9/1998 | Puehlhorn |
| 5,881,653 A | 3/1999 | Pfister |
| 5,901,521 A | 5/1999 | Guy |
| 5,921,631 A | 7/1999 | Bush |
| 5,927,816 A | 7/1999 | Hsu |
| 5,941,377 A | 8/1999 | Hart |
| 5,992,938 A | 11/1999 | Jones |
| 6,029,584 A | 2/2000 | Cochrane |
| 6,036,270 A | 3/2000 | Bufalini |
| 6,041,920 A | 3/2000 | Hart |
| D422,799 S | 4/2000 | Dworshak et al. |
| 6,053,585 A | 4/2000 | Osen |
| 6,109,695 A | 8/2000 | Kahwaji |
| 6,126,022 A | 10/2000 | Merkel |
| 6,155,641 A | 12/2000 | Frost |
| 6,174,116 B1 | 1/2001 | Brand |
| 6,189,974 B1 | 2/2001 | Beck |
| 6,247,754 B1 | 6/2001 | Vanderaue et al. |
| 6,283,564 B1 | 9/2001 | Corson |
| 6,347,772 B1 | 2/2002 | L'Hotel |
| 6,378,707 B1 | 4/2002 | Taggert |
| 6,443,076 B1 | 9/2002 | Case |
| 6,532,878 B2 | 3/2003 | Tidemann |
| 6,595,378 B2 | 7/2003 | Wang |
| 6,615,746 B2 | 9/2003 | Bart |
| 6,615,999 B1 | 9/2003 | Culp |
| 6,619,749 B2 | 9/2003 | Willy |
| 6,675,979 B2 | 1/2004 | Taylor |
| 6,769,369 B1 | 8/2004 | Brandenberg |
| 6,807,912 B2 | 10/2004 | Willy |
| D499,577 S | 12/2004 | Willy |
| 6,845,871 B1 | 1/2005 | Culp |
| 6,848,747 B1 | 2/2005 | Robinson |
| 6,895,870 B1 | 5/2005 | Bizlewicz |
| 6,955,401 B1 | 10/2005 | Shoulberg |
| 7,066,548 B2 | 6/2006 | Butler |

(56) References Cited

U.S. PATENT DOCUMENTS

| | | |
|---|---|---|
| 7,114,300 B1 | 10/2006 | Culp |
| 7,168,766 B2 | 1/2007 | Pelletier |
| 7,219,962 B2 | 5/2007 | Stone |
| D547,076 S | 7/2007 | Hughes et al. |
| 7,255,403 B2 | 8/2007 | Butler |
| 7,300,110 B1 | 11/2007 | Debien |
| 7,386,960 B2 | 6/2008 | Molteni |
| 7,533,940 B1 | 5/2009 | Zook |
| 7,631,605 B2 | 12/2009 | Willy |
| 7,765,942 B2 | 8/2010 | Choi |
| 7,856,772 B1 | 12/2010 | Culp et al. |
| 8,123,311 B2 | 2/2012 | Nilsson |
| 8,167,377 B2 | 5/2012 | Kovach |
| 8,215,245 B2 | 7/2012 | Morrison |
| 8,220,399 B2 | 7/2012 | Berent et al. |
| 8,332,917 B2 | 12/2012 | Forster et al. |
| 8,459,476 B2 | 6/2013 | Malekmadani |
| 8,590,976 B2 | 11/2013 | Davis |
| 8,667,911 B2 | 3/2014 | Brandenberg |
| 8,863,470 B2 * | 10/2014 | Bottorff .............. E04F 21/0069 52/718.02 |
| 9,277,814 B2 | 3/2016 | Winker |
| 9,282,819 B2 | 3/2016 | Blake |
| 9,447,804 B2 | 9/2016 | Andersson |
| 9,534,623 B2 | 1/2017 | Anderson et al. |
| 9,615,663 B2 | 4/2017 | Davis |
| 9,706,836 B1 | 7/2017 | Nelson |
| 10,138,917 B2 | 11/2018 | Koch |
| 10,227,162 B2 | 3/2019 | Davis et al. |
| 2003/0107255 A1 | 6/2003 | Willy |
| 2004/0056526 A1 | 3/2004 | Willy |
| 2004/0227041 A1 | 11/2004 | Lewis |
| 2007/0187348 A1 | 8/2007 | Malekmadani |
| 2008/0074013 A1 | 3/2008 | Ahlgrim et al. |
| 2008/0302748 A1 | 12/2008 | Tsai |
| 2009/0066140 A1 | 3/2009 | Berent |
| 2009/0084740 A1 | 4/2009 | Lin |
| 2010/0003077 A1 | 1/2010 | Kelley |
| 2012/0080910 A1 | 4/2012 | Davis |
| 2013/0062294 A1 | 3/2013 | Beaty |
| 2013/0080286 A1 | 3/2013 | Rotholz |
| 2013/0170904 A1 | 7/2013 | Cappelle |
| 2014/0048176 A1 | 2/2014 | Susnjara |
| 2014/0048177 A1 | 2/2014 | Susnjara |
| 2014/0059829 A1 * | 3/2014 | Weber .................. F16B 12/125 29/428 |
| 2014/0263130 A1 | 9/2014 | Davis |
| 2015/0335155 A1 | 11/2015 | Winker |
| 2017/0023043 A1 | 1/2017 | Koelling et al. |
| 2017/0079426 A1 | 3/2017 | Davis |
| 2017/0086578 A1 | 3/2017 | Nowak |
| 2017/0099961 A1 | 4/2017 | Church |
| 2017/0321734 A1 * | 11/2017 | Maertens ................ F16B 12/46 |
| 2018/0112696 A1 | 4/2018 | Davis |
| 2019/0038023 A1 | 2/2019 | Stocker |
| 2019/0040890 A1 | 2/2019 | Davis |
| 2019/0059593 A1 | 2/2019 | Davis |
| 2019/0059594 A1 | 2/2019 | Davis |
| 2019/0085886 A1 | 3/2019 | Davis |
| 2019/0107131 A1 | 4/2019 | Davis |
| 2019/0254424 A1 | 8/2019 | Rassat |

FOREIGN PATENT DOCUMENTS

| | | |
|---|---|---|
| DE | 1529719 | 5/1969 |
| DE | 2100168 | 11/1972 |
| DE | 3925302 | 2/1991 |
| DE | 9201692 | 4/1992 |
| DE | 29914896 | 12/1999 |
| DE | 29906711 | 1/2000 |
| DE | 102007058662 | 6/2009 |
| DE | 102014006155 | 10/2014 |
| EP | 0299695 | 1/1989 |
| FR | 1300853 | 8/1962 |
| FR | 2634991 | 2/1990 |
| FR | 2654164 | 5/1991 |
| GB | 143840 | 12/1920 |
| GB | 810752 | 3/1959 |
| GB | 2353080 | 2/2001 |
| NL | 1025719 | 9/2005 |
| WO | WO 2005-085656 | 9/2005 |

OTHER PUBLICATIONS

PlyGrid Shelves viewed at http://offi.com/products/offikids/PLYGRID.php?p2c=249 circa Dec. 3, 2011.
Snap Table viewed at http://www.offi.com/pdfs/snaptable.pdf circa Dec. 3, 2011.
Furniture viewed at http://www.playatech.com/product_list.php circa Dec. 3, 2011.
Arabic Table viewed at http://www.plydea.com/support/assemblypdf.html circa Dec. 3, 2011.
Blue7Chair viewed at http://www.plydea.com/support/assemblypdf.html circa Dec. 3, 2011.
First Desk viewed at http://www.plydea.com/support/assemblypdf.html circa Dec. 3, 2011.
Rinaldo Chair viewed at http://www.plydea.com/support/assemblypdf.html circa Dec. 3, 2011.
Tuffet Stool viewed at http://www.plydea.com/support/assemblypdf.html circa Dec. 3, 2011.
WasteNot Basket viewed at http://www.plydea.com/support/assemblypdf.html circa Dec. 3, 2011.
Winehold Wine Rack viewed at http://www.plydea.com/support/assemblypdf.html circa Dec. 3, 2011.

* cited by examiner

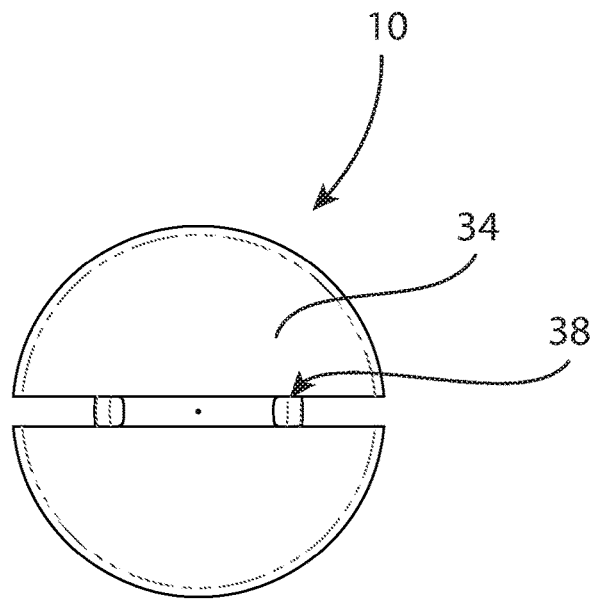
FIG 2A
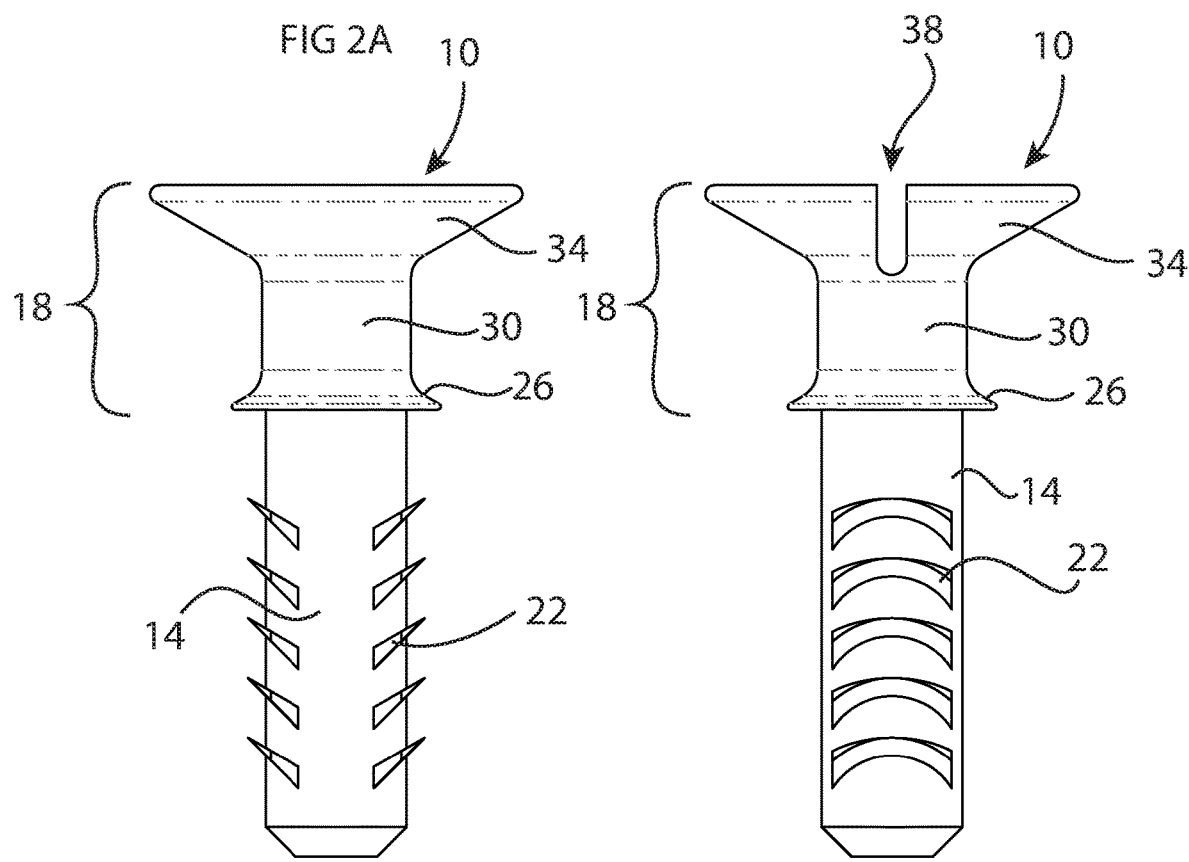
FIG 2B
FIG 2C

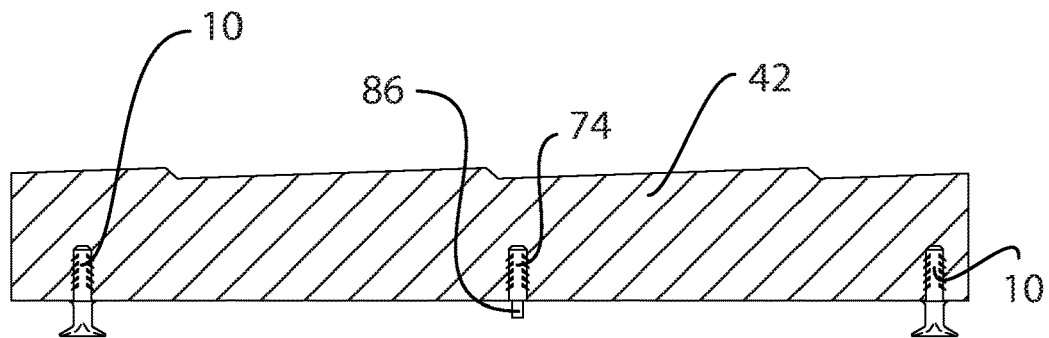
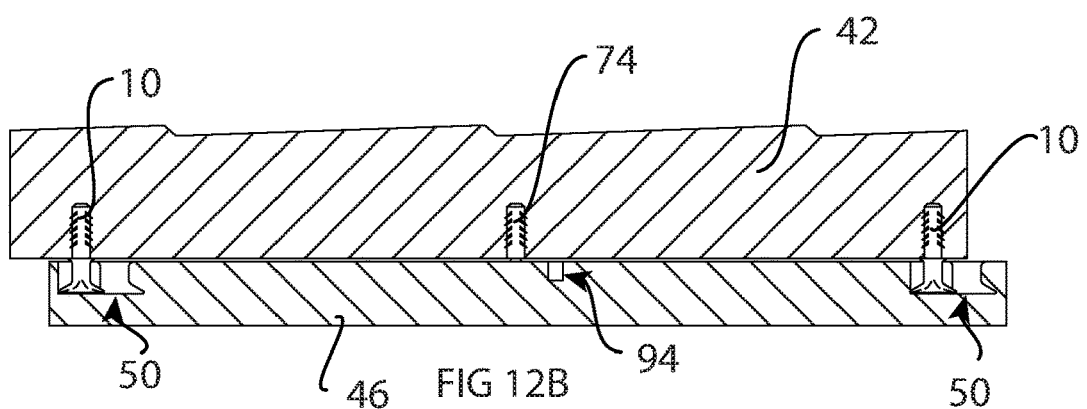
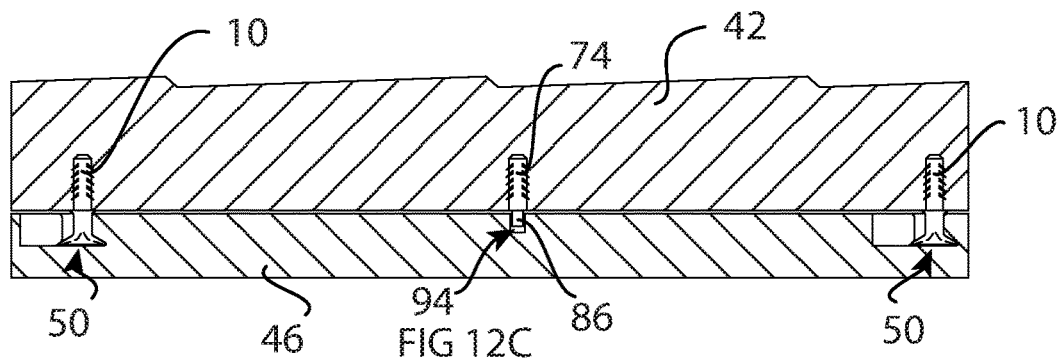
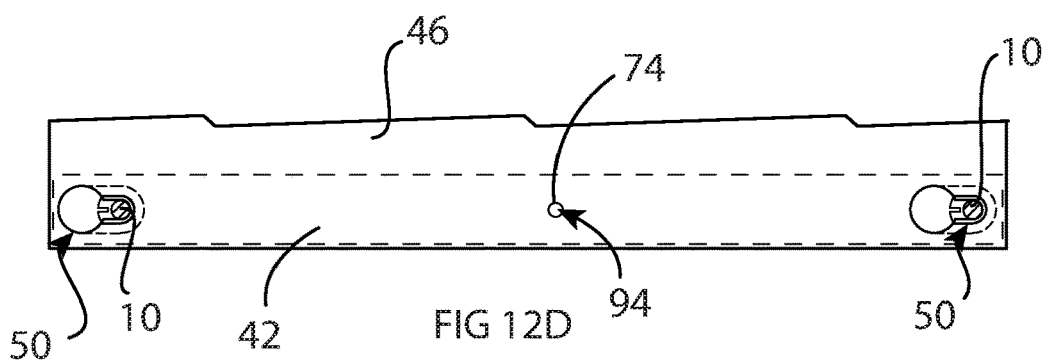

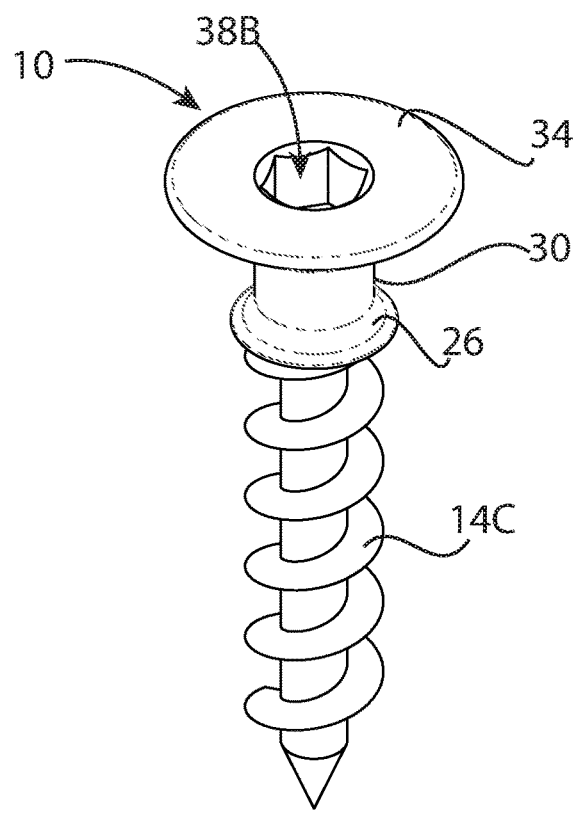
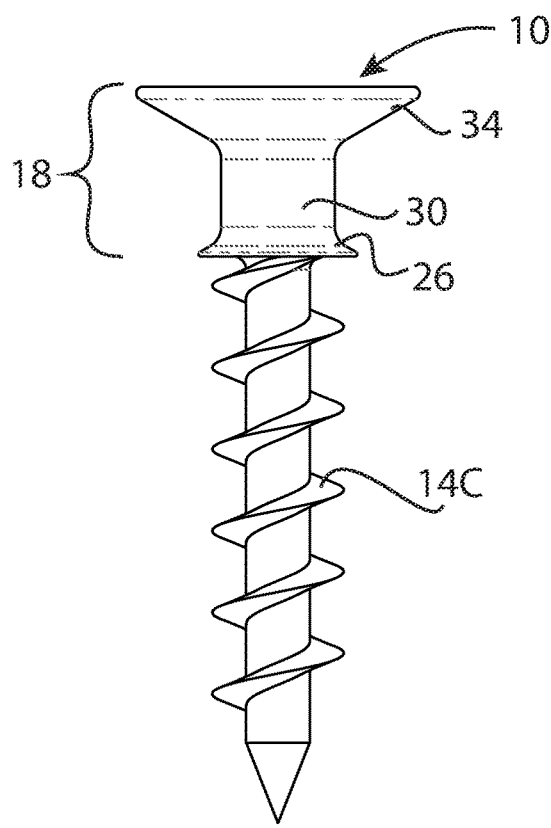
FIG 19A    FIG 19B
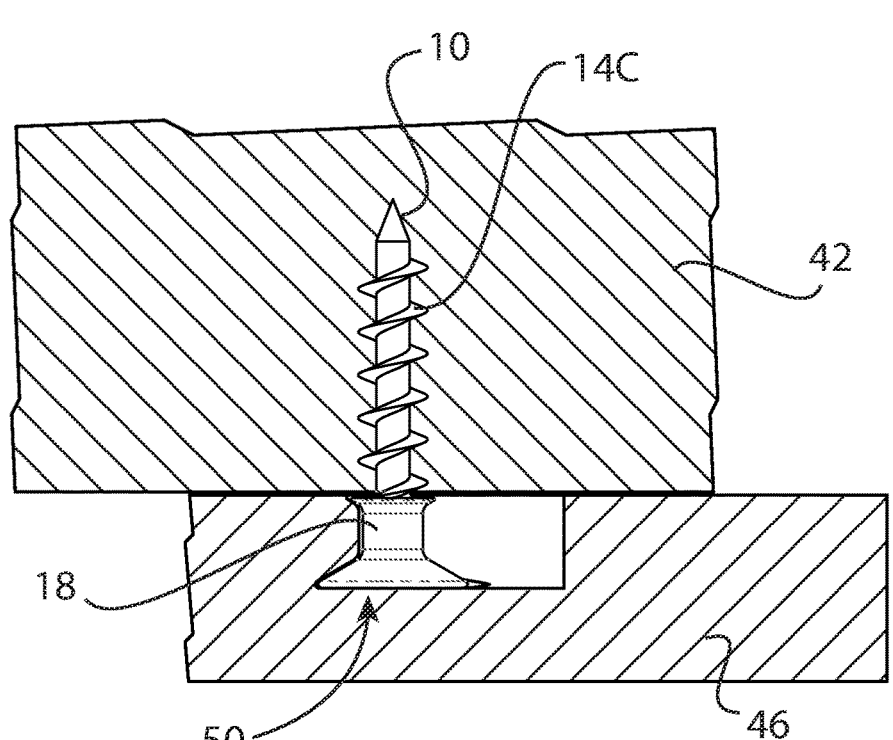
FIG 19C

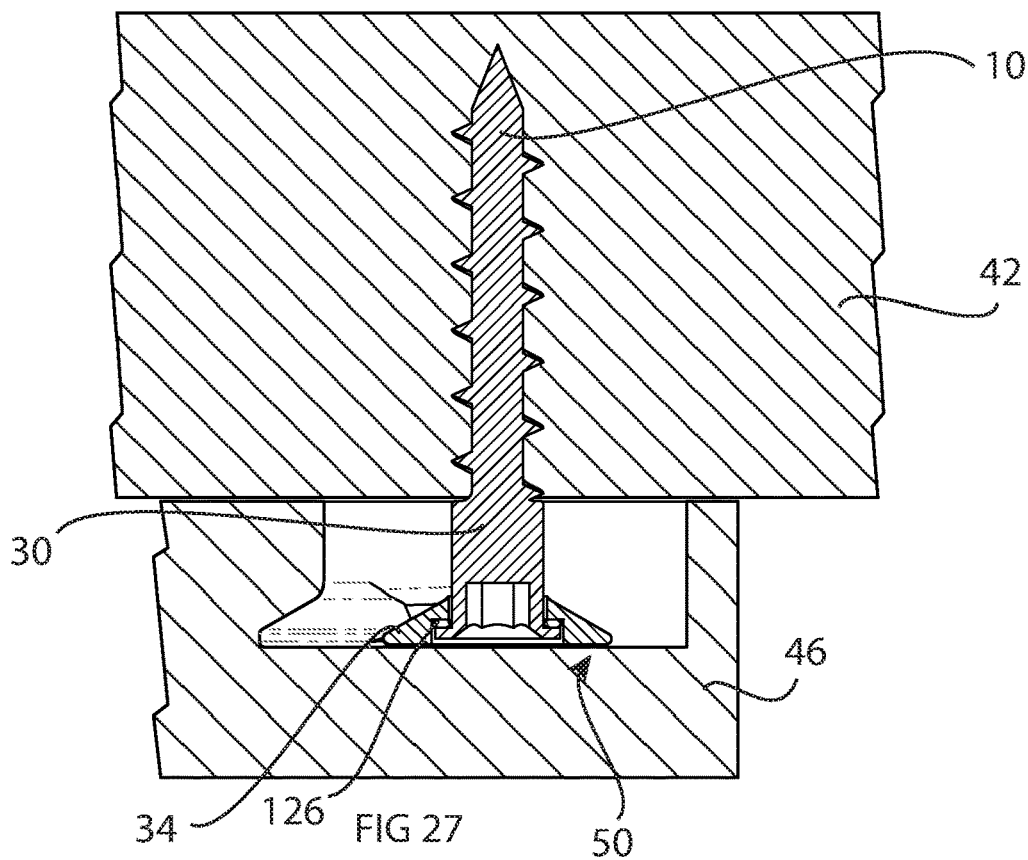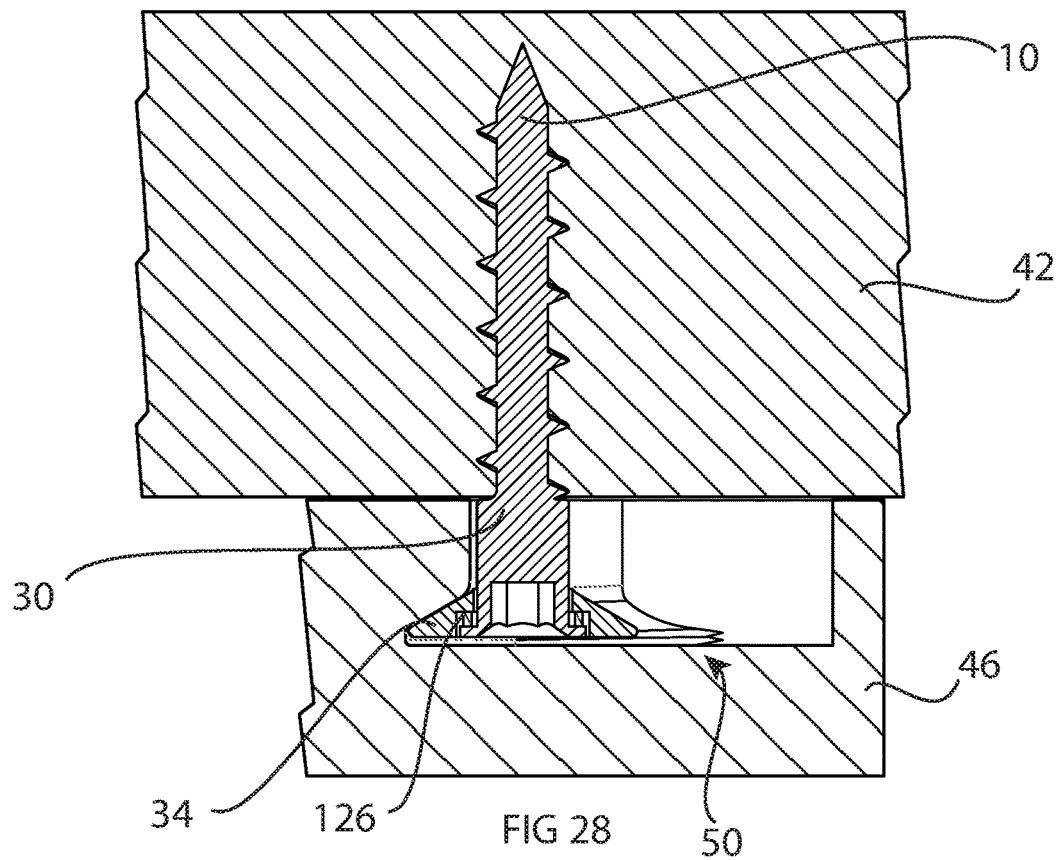

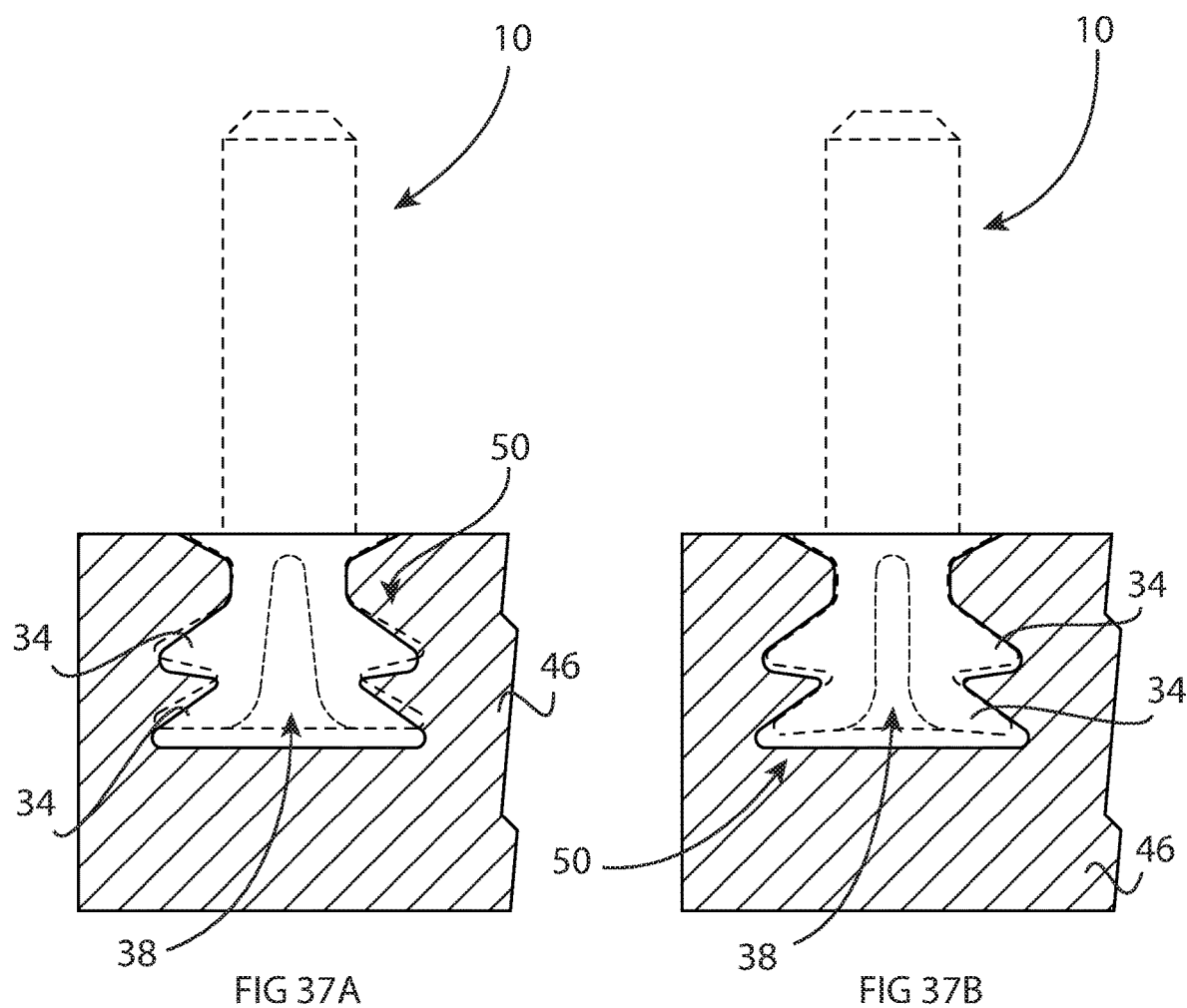

FURNITURE WITH FLEXIBLE DOVETAIL DOWEL AND SLOT JOINT

RELATED APPLICATIONS

The present application claims the benefit of U.S. Provisional Application Ser. No. 62/558,967, filed Sep. 15, 2017, which is hereby incorporated by reference in its entirety.

THE FIELD OF THE INVENTION

The present invention relates to furniture. In particular, examples of the present invention relate to a furniture joint which allows tool-less assembly and increased stability. The present disclosure provides modular furniture joints which allow for easy assembly while also providing a tight fitting and rigid joint.

BACKGROUND

Many persons desire modular furniture. Modular furniture is often assembled by the end user from flat pieces and is thus easy to store and transport in the un-assembled form. Modular furniture often suffers from instability, and in some instances modular furniture is made overly complex or uses more permanent fastening or construction methods to stabilize the furniture. This, however, makes the furniture more cumbersome for the end user and reduces some of the portability and ease of use associated with this type of furniture. Additionally, the use of fasteners such as screws or nails to stabilize the furniture is often problematic in the long term as these fasteners become loose with use and movement of the furniture.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

FIG. 2A shows a top view of the dovetail dowel of FIG. 1.
FIG. 2B shows a side view of the dovetail dowel of FIG. 1.
FIG. 2C shows a front view of the dovetail dowel of FIG. 1.
FIG. 12A shows a cross-sectional view of a joint with the pin of FIG. 11A.
FIG. 12B shows a cross-sectional view of a joint with the pin of FIG. 11A.
FIG. 12C shows a cross-sectional view of a joint with the pin of FIG. 11A.
FIG. 12D shows a top view of a joint with the pin of FIG. 11A.
FIG. 19A shows a perspective view of a dovetail dowel.
FIG. 19B shows a side view of the dovetail dowel of FIG. 19A.
FIG. 19C shows a cross-sectional view of a joint with the dovetail dowel of FIG. 19A.

FIG. 27 shows a cross-sectional view of a joint with the dovetail dowel of FIG. 25.

FIG. 28 shows a cross-sectional view of a joint with the dovetail dowel of FIG. 25.

FIG. 37A shows a cross-sectional view of a slot and the dovetail dowel of FIG. 36.

FIG. 37B shows a cross-sectional view of the slot and the dovetail dowel of FIG. 36.

Figure 1:
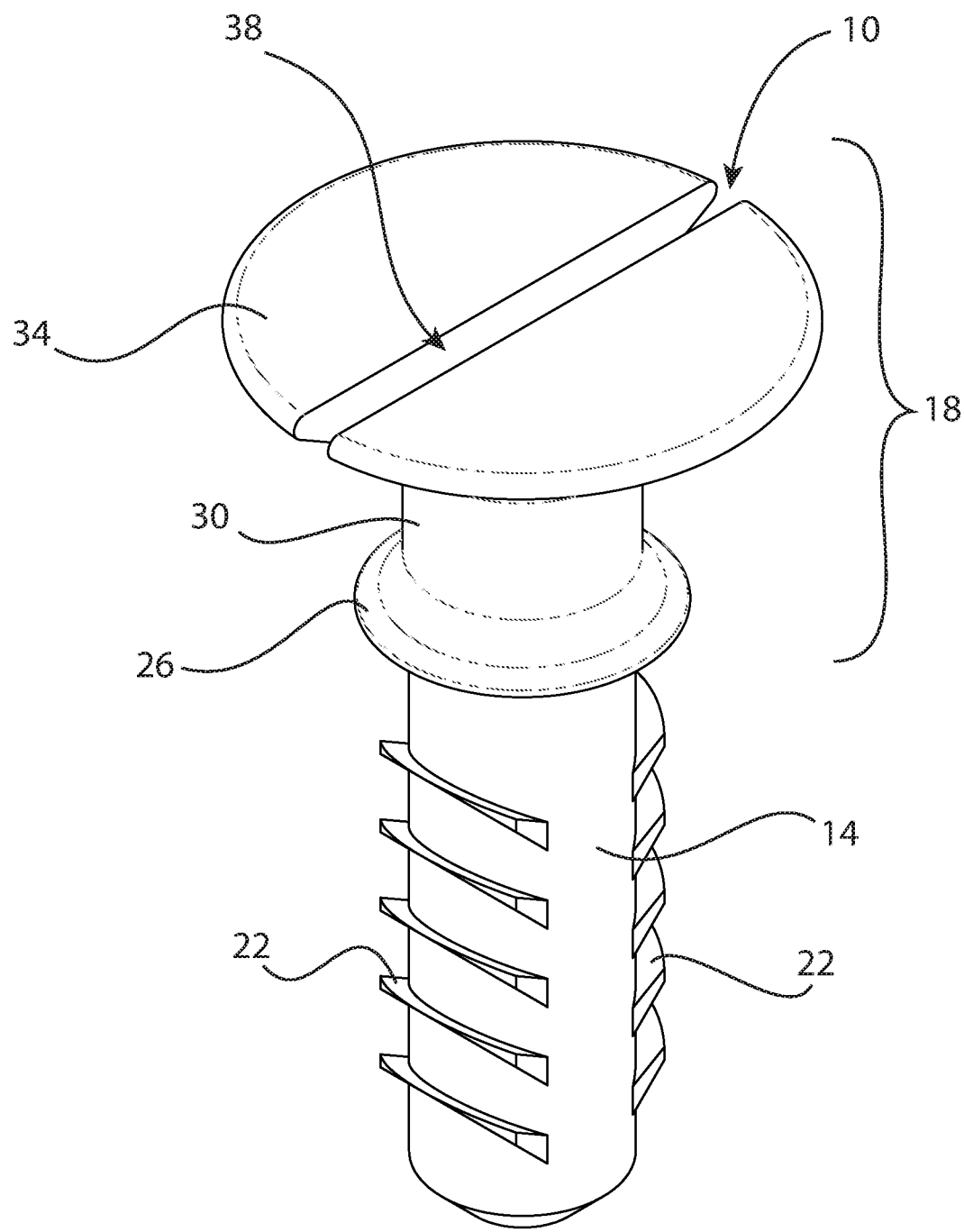
FIG. 1 shows a perspective view of a dovetail dowel.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help to improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art. The drawings are drawn to scale to facilitate understanding of the invention unless otherwise noted.

The present disclosure describes how an item of modular furniture may be constructed with a joint which includes one or more flexible fasteners and corresponding slots which are designed such that the fasteners are elastically bent or deformed during insertion into the slot and are maintained in a bent configuration while the joint is maintained in an assembled configuration.

The illustrated locking joint may be used in a variety of different items of modular furniture such as a bookcase or shelving unit, a box, a desk, etc. These items of modular furniture are typically constructed from flat panels of a material such as plywood. Accordingly, the joint may be formed between two flat panels which are joined to each other at an angle such that a first panel with fasteners inserted into holes formed on an edge of the first panel intersects and is joined to a second panel with slots formed in a face of the second panel. Often, the first panel is held against the second panel and is held perpendicular to the second panel.

The first panel may have holes drilled or otherwise cut into the panel and includes a dovetail dowel extending outwardly from an edge or face of the panel. A second panel includes a mating slot which is lined up with the dowel. The shape of the slot generally corresponds with the shape of the dowel, but is slightly different from the shape of the dowel such that the head of the dovetail dowel is bent when it is inserted into the slot. The dowel is made of a resilient material so that it is elastically bent by the slot. Since the dowel is elastically deformed, the dowel is biased to return to its original shape and this bias of the dowel applies a force against the slot. The force applied between the dowel and the slot pulls the first panel against the second panel and makes the joint between these panels which is stiffer than conventional tab and slot joints.

FIG. 1 shows an isometric view of an example dovetail dowel 10. FIG. 2A shows a top view of the dowel 10. FIG. 2B shows a side view of the dowel 10. FIG. 2C shows a front view of the dowel 10. The dovetail dowel 10 includes a stem 14 and a head 18. The stem 14 is the portion of the dowel which is inserted into a first panel to secure the dowel 10 to the first panel. In this example, the stem 14 is an elongate shank and includes barbs 22 formed on the shank. The barbs 22, alone or in combination with adhesive, grip the inside of a bore formed in a first panel and secure the dovetail dowel 10 into the first panel. The head 18 extends beyond a first panel to which the dowel 10 is attached. The head 18 is the portion of the dowel which engages a slot formed in a second panel to form a furniture joint securing the first panel to the second panel. In the example dowel 10, the head 18 includes a shoulder 26, a neck 30, and a flange 34 which extends outwardly from the neck 30. The shoulder 26 abuts the first panel and places the head 18 in a consistent position with respect to the first panel. The neck 30 may be a smaller diameter than the shoulder 26. The flange 34 extends outwardly from the neck 30 and engages an enlarged portion of the second panel slot to prevent the head 18 from being withdrawn inadvertently from the slot. A recess 38, such as slot 38, may be formed in the flange 34 to make the flange easier to bend. In the example dowel, the stem 14, shoulder 26, neck 30, and flange 34 are generally round in cross section. The dowel 10 is inserted into a hole on an edge or face of a first panel so that the barbed stem 14 is inserted into the hole and the enlarged head 18 extends from the panel.

The shoulder 26 extends outwardly around the stem 14 near the barbs 22. The shoulder 26 contacts the first panel when the dowel stem 14 is inserted into a hole in the panel and provides a positive stop to ensure a consistent depth is achieved when inserting the dowel 10 into the hole. This regulates the height of the head 18 above the first panel and ensures consistent assembly with the second panel slot and results in consistent joints in the associated article of modular furniture. The shoulder 26 may extend outward further than the neck 30 and may be used to maintain the relationship of the head geometry and the plane of contact to the adjoining second panel. The head 18 includes a neck 30 which extends beyond the shoulder 26 and the enlarged flange 34 which extends outwardly from the neck 30. When viewed from the side as shown in FIGS. 2B and 2C, the enlarged flange 34 may have a conical or dovetail shape. The flange 34 has a sloped underside surface which slopes upwardly away from the barbed shank 14 and neck 30 and terminates in a flat upper surface. The underside surface of the flange 34 engages a corresponding surface in the second panel slot and is elastically deformed by the slot to apply pressure to the joint. The slot 38 formed in the flange 34 is designed to control the amount of force required to bend the flange 34. The slot 38 makes it easier to bend the two sides of the flange 34 lateral to the slot 38 inwardly as compared to bending the two sides of the flange 34 adjacent the ends of the slot 38 inwardly. Accordingly, the dowel 10 is inserted into a first panel so that the slot 38 is generally aligned with the length of a slot which bends the flange 34 away from the sides of the slot.

The barbs or burrs 22 are used to secure the dowel into the first panel and prevent the dowel from coming out of the first panel once it is inserted into a hole. The barbs 22 may be formed so that they extend out on only two sides of the dowel in alignment with the slot 38 formed in the flange 34. For a typical use of the dowel 10, this align the barbs 22 along the long axis of the panel edge and helps to preventing possible delamination or splitting of the first panel when the dowel 10 is inserted into the panel. The dowel 10 may be retained in the first panel with barbs alone, or could also be glued in alone or in combination with the barbs 22 or other surface texture or features.

Figure 3:
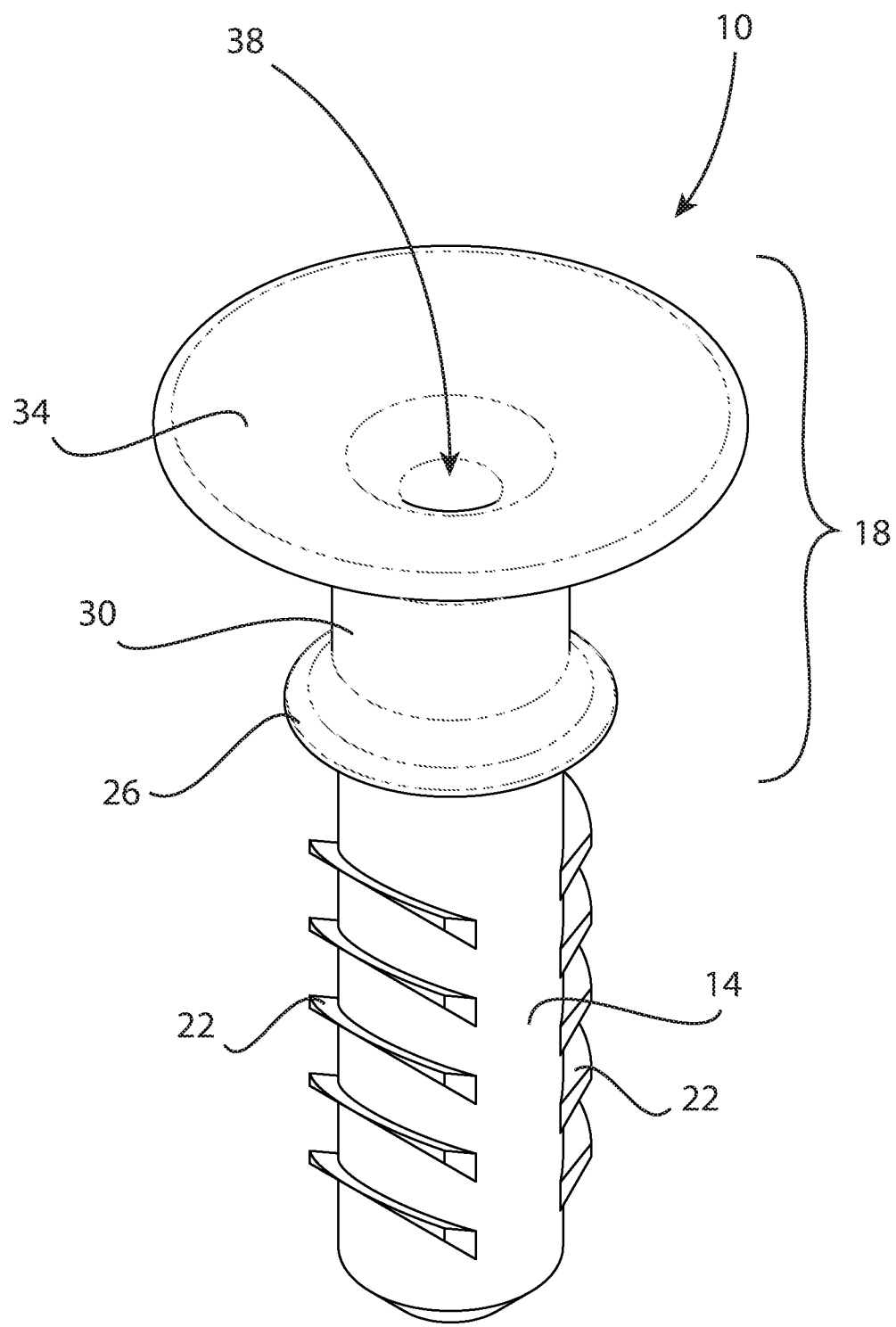
FIG. 3 shows a perspective view of a dovetail dowel.
Figure 4A:
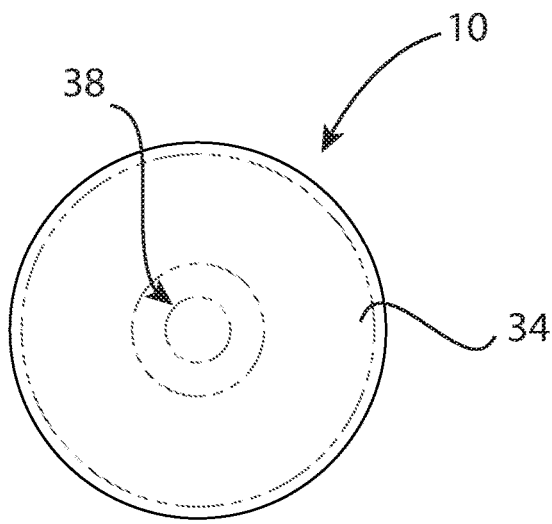
FIG. 4A shows a top view of the dovetail dowel of FIG. 3.
Figure 4B:
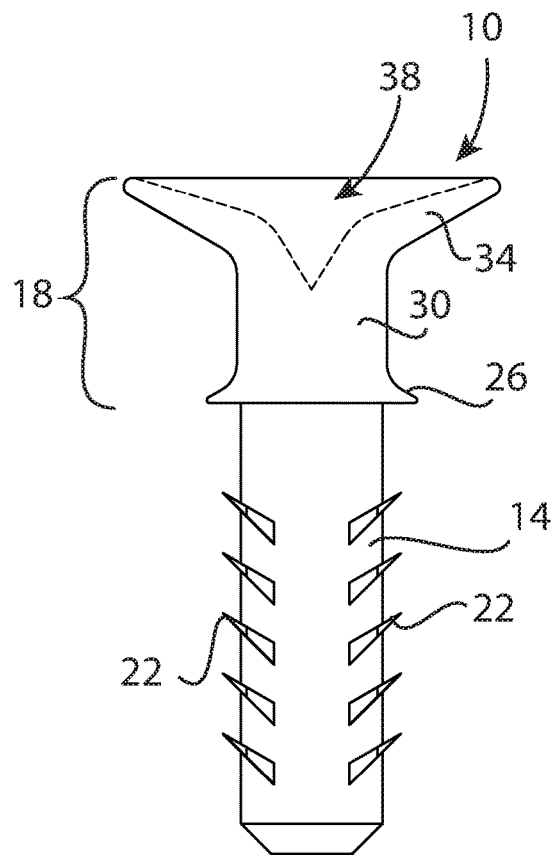
FIG. 4B shows a side view of the dovetail dowel of FIG. 3.
Figure 4C:
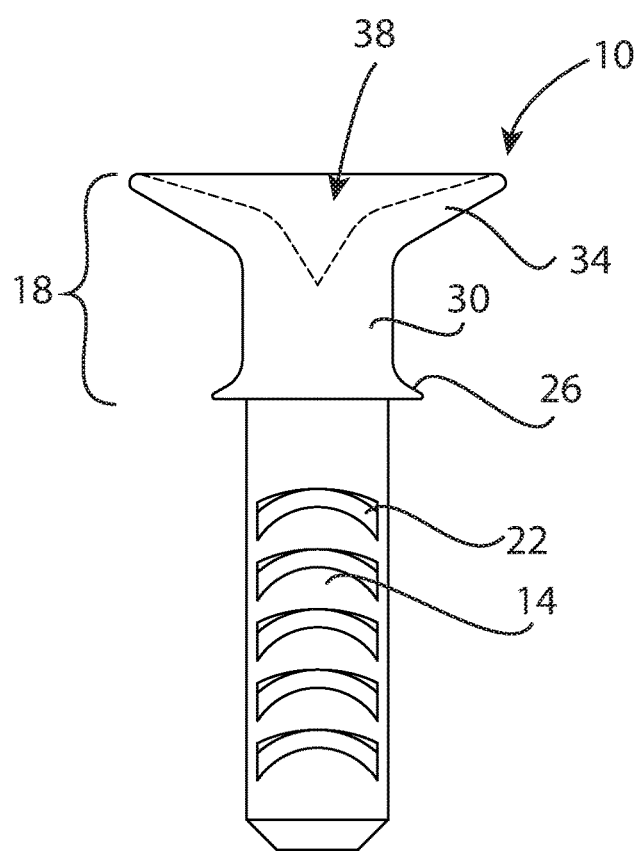
FIG. 4C shows a front view of the dovetail dowel of FIG. 3.

FIG. 3 shows an isometric view of an example dovetail dowel 10. FIG. 4A shows a top view of the dowel 10. FIG. 4B shows a side view of the dowel 10. FIG. 4C shows a front view of the dowel 10. The dovetail dowel 10 includes a stem 14 and a head 18. The stem 14 is inserted into a first panel to secure the dowel 10 to the first panel. The stem 14 is formed as an elongate shank and includes barbs 22 formed on the shank. The barbs 22, alone or in combination with adhesive, grip the inside of a bore formed in a first panel and secure the dovetail dowel 10 into the first panel. The head 18 extends beyond the first panel and engages a slot formed in a second panel to form a furniture joint securing the first panel to the second panel. In the example dowel 10, the head 18 includes a shoulder 26, a neck 30, and a flange 34 which extends outwardly from the neck 30. The shoulder 26 is attached to the stem 14 and abuts the first panel and places the head 18 in a consistent position with respect to the first panel. The neck 30 may be a smaller diameter than the shoulder 26 and may be approximately the same diameter as the stem 14. The flange 34 extends outwardly from the neck 30 and engages an enlarged portion of the second panel slot to prevent the head 18 from being withdrawn inadvertently from the slot. A recess 38 such as a circularly shaped dimple 38 is formed in the center of the flange 34 to make the flange easier to bend. In the example dowel, the stem 14, shoulder 26, neck 30, flange 34 and recess 38 are generally round in cross section. The dowel 10 is inserted into a hole on an edge or face of a first panel so that the barbed stem 14 is inserted into the hole and the enlarged head 18 extends from the panel.

The shoulder 26 extends outwardly around the stem 14 near the barbs 22 and contacts the first panel when the dowel stem 14 is inserted into a hole in the panel and provides a positive stop to ensure a consistent depth is achieved when inserting the dowel 10 into the hole. This regulates the height of the head 18 above the first panel and ensures consistent assembly with the second panel slot and results in consistent joints in the associated article of modular furniture. The shoulder 26 may extend outward further than the neck 30 and may be used to maintain the relationship of the head geometry and the plane of contact to the adjoining second panel. The neck 30 extends axially beyond the shoulder 26 and the enlarged flange 34 extends outwardly from the neck 30.

When viewed from the side as shown in FIGS. 4B and 4C, the enlarged flange 34 may have a conical or dovetail shape. The flange 34 has a sloped underside surface which slopes upwardly away from the barbed shank 14 and neck 30 and terminates in a flat upper perimeter surface. The underside of the flange 34 forms a circular dovetail shape. The underside surface of the flange 34 engages a corresponding surface in the second panel slot and is elastically deformed by the slot to apply pressure to the joint. The dimple recess 38 formed in the flange 34 is designed to control the amount of force required to bend the flange 34. The dimple recess 38 makes it easier to bend two opposing sides of the flange 34 inwardly as compared to bending a solid flange 34.

The barbs or burrs 22 are used to secure the dowel into the first panel and prevent the dowel from coming out of the first panel once it is inserted into a hole. The barbs 22 may be formed so that they extend out on only two sides of the dowel. For a typical use of the dowel 10, the barbs 22 may be aligned along the long axis of the panel edge and helps to preventing possible delamination or splitting of the first panel when the dowel 10 is inserted into the panel. The dowel 10 may be retained in the first panel with barbs alone, or could also be glued in alone or in combination with the barbs 22 or other surface texture or features.

The flange 34 of the dovetail dowel 10 shown in FIGS. 1 through 2C is more flexible when the rim of the enlarged head is bent inwardly towards the central slot 38 in a direction perpendicular to the slot and is less flexible when bent inwardly towards the slot in a direction parallel to the length of the slot. The flange 34 of the dovetail dowel 10 shown in FIGS. 3 through 4C is equally flexible in bending the rim inwardly regardless of the direction of the bend. Accordingly, the dovetail dowel 10 shown in FIGS. 3 through 4C may be attached to a first panel without regard to the rotational orientation of the dowel 10 unless consideration must be given to the orientation of the barbs 20. The dovetail dowel 10 shown in FIGS. 1 through 2C may be more easily aligned along the edge of the panel to orient the barbs 22 in a desired orientation as the slot 38 shows the orientation of the barbs.

Figure 5A:
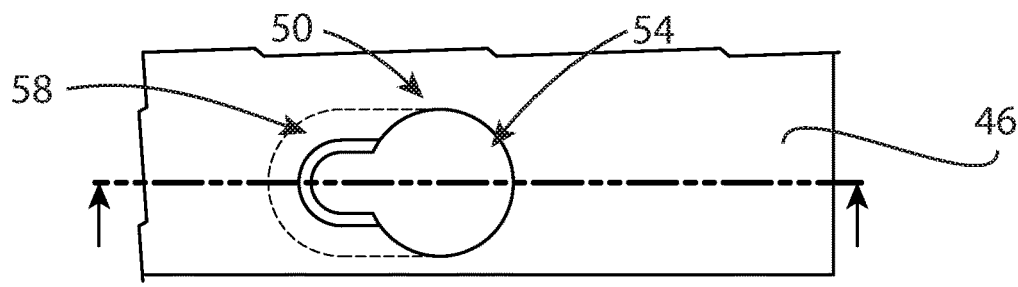
FIG. 5A shows a top view of a slot for a dovetail dowel.
Figure 5B:
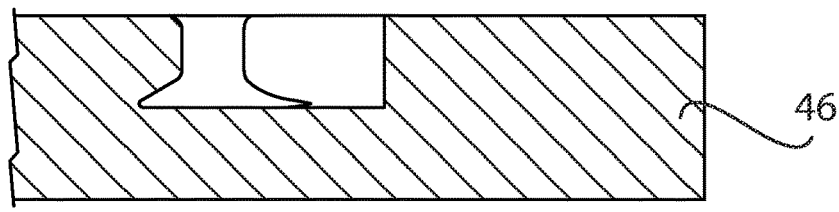
FIG. 5B shows a cross-sectional view of the slot of FIG. 5A.

FIG. 5A shows a top view of a portion of second panel 46 which includes a slot 50 designed to accept the dovetail dowel 10. FIG. 5B shows a cross-sectional view of the second panel 46 and slot 50. The slot 50 includes an open insertion section 54 which is large enough to accept the head 18 into the slot 50 and a narrowed retention section 58 which retains the head 18 when the joint is in an assembled configuration. The head 18 can slide into the retention section 58 laterally after first being inserted into the insertion section in a direction transverse to the surface of the second panel 46. The narrowed retention section 58 includes an enlarged lower (deeper) portion which receives the flange 34 and a narrower upper (shallower) portion which receives the neck 30. This enlarged lower portion of the retention section 58 is formed with angled sides which match the geometry of the flange 34 and capture the flange 34; preventing the flange 34 from coming out of the retention section 58 in a direction perpendicular to the second panel 46. The narrow portion of the retention section 58 has an open area which is sized to receive the neck 30 of the dowel head 18.

FIG. 5B shows a cross-sectional view of the second panel 46 and slot 50 taken through the center plane of the slot 50. The angled sides and end of the retention section 58 are visible. The slot 50 may be formed by using a cutter whose profile approximately matches that of the dowel head 10 to plunge into the second panel 46 at the insertion section 54 of the slot 50 and then cut laterally to form the retention section 58 of the slot. The cutter is then removed from the slot 50 in the opposite manner.

Figure 5C:
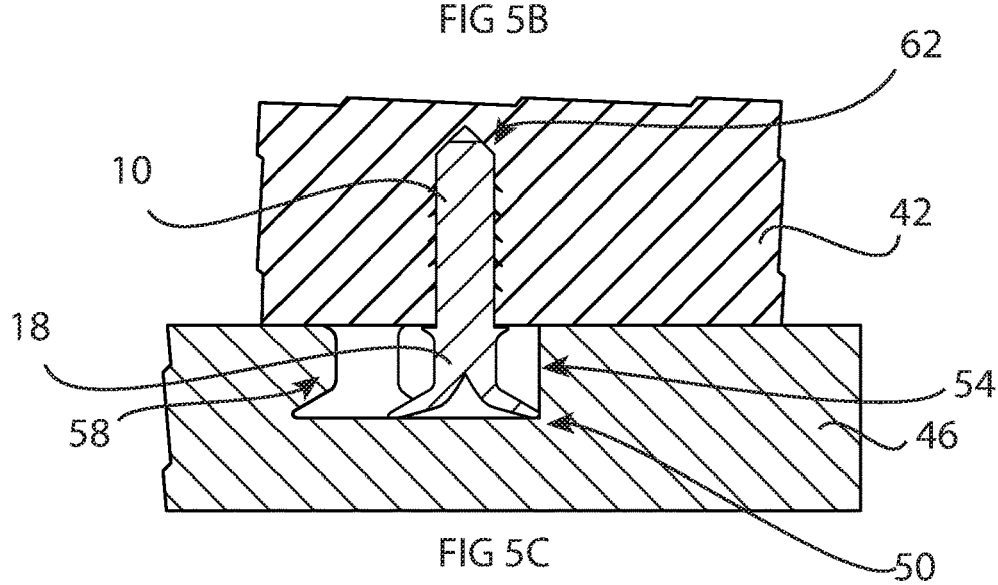
FIG. 5C shows a cross-sectional view of a joint with the dovetail dowel and slot.
Figure 5D:
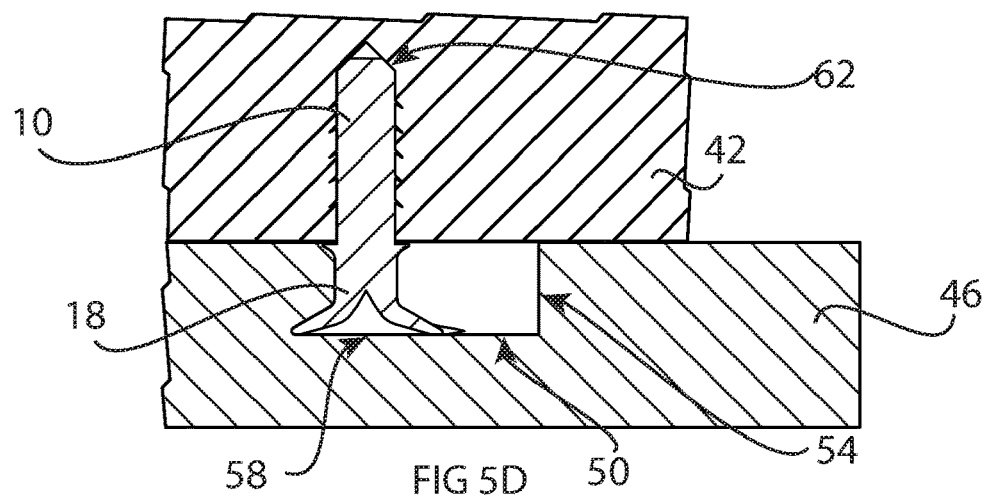
FIG. 5D shows a cross-sectional view of a joint with the dovetail dowel and slot.

FIGS. 5C and 5D shows cross-sectional views of the first panel 42 and second panel 46 along with the dovetail dowel 10 and the slot 50; illustrating insertion of the dowel 10 into the slot 50. The first panel 42 and the second panel 46 are panels which form part of an article of modular furniture. The dovetail dowel joint is useful in joints such as are found in cabinets, case goods (such as desks, dressers, cubbies), drawers, etc. The dowel 10 has been inserted into a hole 62 formed in the first panel 42 and remains rigidly attached to the first panel 42. To assemble the furniture joint, the dowel head 18 is inserted into the insertion section 54 of the slot 50. This places the edge of the first panel 42 adjacent the face of the second panel 46 as shown. The first panel 42 is then moved laterally relative to the second panel 46 to thereby move the dowel head 18 into the retention section 58 of the slot 50. This is shown in FIG. 5D. The dowel head 18 is now captured in the narrowed retention section 58 of the slot 50 and cannot be removed from the slot 50 in a direction perpendicular to the second panel 46. Accordingly, the first panel 42 cannot be pulled away from the second panel 46 in a direction perpendicular to the second panel 46.

Figures 6A, 6B:
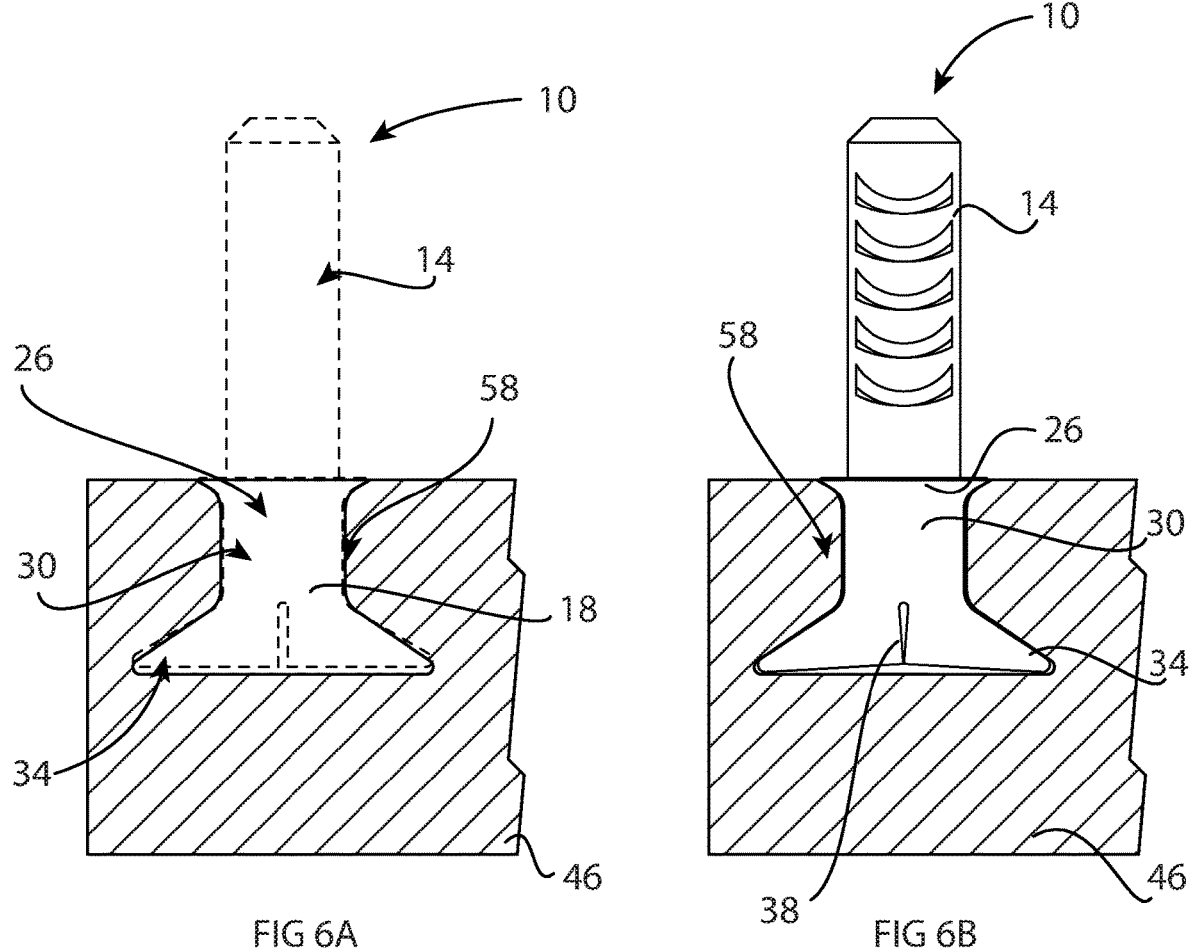
FIG. 6A shows a cross-sectional view of a joint with the dovetail dowel and slot.
FIG. 6B shows a cross-sectional view of a joint with the dovetail dowel and slot.

FIG. 6A shows a cross-sectional view of the retention section 58 of the slot 50 in a direction perpendicular to the length of the slot 50 to illustrate how the shape of the slot 50 differs from the shape of the head 18 of the dowel 10. This illustrates how the slot 50 and head 18 cooperate to provide a secure joint. An un-flexed dovetail dowel 10 with slot 38 formed in the flange 34 is superimposed over the slot 50 and is drawn with a dotted line. The angle of the underside of the flange 34 on the head 18 of the dovetail dowel 10 is slightly less (shallower) than the angle of the corresponding sides of the slot retention section 58. The slot retention section 58 is cut slightly deeper than the flange 34 and is approximately the same diameter as the flange 34. Accordingly, the outer rim of the flange 34 does not reach the bottom of the slot retention section 58 and would sit above the lower enlarged portion of the slot retention section 58. The narrowed upper portion of the slot retention section 58 corresponding to the neck 30 is slightly larger in diameter than the neck 30 so that the neck does not bind in this portion of the slot retention section 58. The portion of the slot retention section 58 corresponding to the dowel shoulder 26 is cut to approximately the same size and shape as the shoulder 26 so that the shoulder reliably locates the dowel 10.

FIG. 6B shows a cross-sectional view of the slot retention section 58 in a direction perpendicular to the length of the slot in the same orientation as is shown in FIG. 6A. A dovetail dowel 10 with a slot 38 is shown disposed in the slot retention section 58. The two opposing sides of the flange 34 are flexed together and bent downwardly by the geometry of the slot retention section 58. This illustrates how the dovetail dowel 10 would be held in the slot retention section 58 when the joint is assembled in a piece of furniture. Because the lower portion of the slot retention section 58 is deeper and more steeply angled than the flange 34 of the dowel 10, the outer rim of the flange 34 is bent downwardly and inwardly by the slot retention section 58 when the dowel head 18 is inserted into the slot retention section 58. As the dowel 10 is made from an elastically deformable material, the outer rim of the flange 34 is biased upwardly against the wall of the slot retention section 58 and applies pressure against the slot retention section. This flexing pf the dowel head 18 holds the dovetail dowel 10 tightly in place. The downward flexing of the flange 34 pulls the dowel 10 downwardly into the slot 50 and pulls the first panel (not shown) downwardly towards the second panel 46. This applied force stabilizes the joint and helps to prevent undesired movement between the first panel 42 and the second panel 46. This also creates some friction between the dowel head 18 and slot 50 and helps to keep the dowel head 18 in the slot retention section 58.

Figures 7A, 7B:
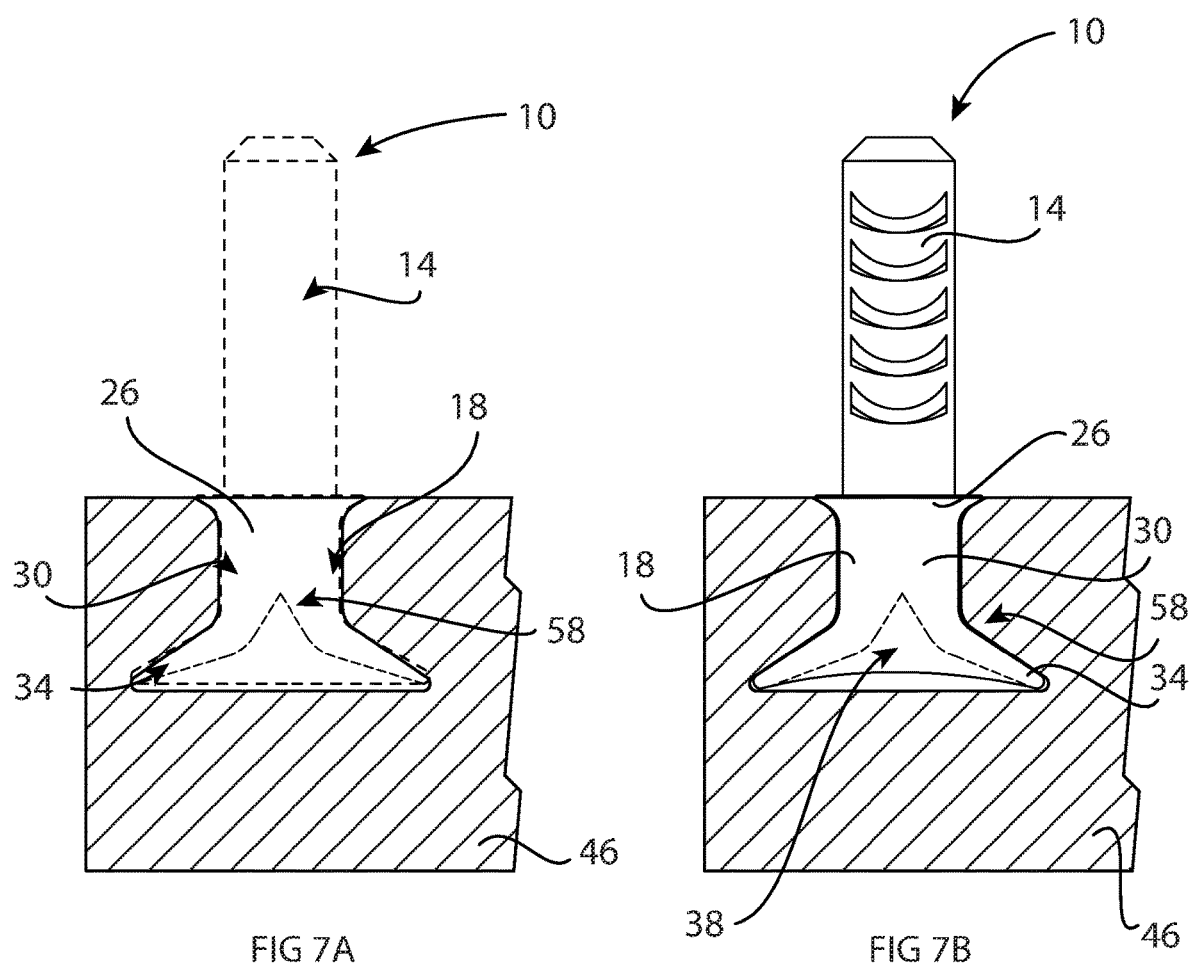
FIG. 7A shows a cross-sectional view of a joint with the dovetail dowel and slot.
FIG. 7B shows a cross-sectional view of a joint with the dovetail dowel and slot.

FIG. 7A shows a similar cross-sectional view of the retention section 58 of the slot 50 in a direction perpendicular to the length of the slot 50 with a superimposed un-flexed dovetail dowel 10 with a conical recess 38 formed in the flange 34. Again, the angle of the underside of the flange 34 on the head 18 of the dovetail dowel 10 is slightly less (shallower) than the angle of the corresponding sides of the slot retention section 58 and the slot retention section 58 is cut slightly deeper than the flange 34 and is approximately the same diameter as the flange 34. Accordingly, the outer rim of the flange 34 does not reach the bottom of the slot retention section 58 and would sit above the lower enlarged portion of the slot retention section 58. The narrowed upper portion of the slot retention section 58 corresponding to the neck 30 is slightly larger in diameter than the neck 30 so that the neck does not bind in this portion of the slot retention section 58. The portion of the slot retention section 58 corresponding to the dowel shoulder 26 is cut to approximately the same size and shape as the shoulder 26 so that the shoulder reliably locates the dowel 10.

FIG. 7B shows a cross-sectional view of the slot retention section 58 in a direction perpendicular to the length of the slot in the same orientation as is shown in FIG. 7A with a dovetail dowel 10 with a recess 38 shown disposed in the slot retention section 58. The two opposing sides of the flange 34 are again flexed together and bent downwardly by the geometry of the slot retention section 58. This illustrates how the dovetail dowel 10 would be held in the slot retention section 58 when the joint is assembled in a piece of furniture. Because the lower portion of the slot retention section 58 is deeper and more steeply angled than the flange 34 of the dowel 10, the outer rim of the flange 34 is bent downwardly and inwardly by the slot retention section 58 when the dowel head 18 is inserted into the slot retention section 58. As the dowel 10 is made from an elastically deformable material, the outer rim of the flange 34 is biased upwardly against the wall of the slot retention section 58 and applies pressure against the slot retention section. This flexing pf the dowel head 18 holds the dovetail dowel 10 tightly in place. The downward flexing of the flange 34 pulls the dowel 10 downwardly into the slot 50 and pulls the first panel (not shown) downwardly towards the second panel 46. This applied force stabilizes the joint and helps to prevent undesired movement between the first panel 42 and the second panel 46. This also creates some friction between the dowel head 18 and slot 50 and helps to keep the dowel head 18 in the slot retention section 58.

Figure 8A:
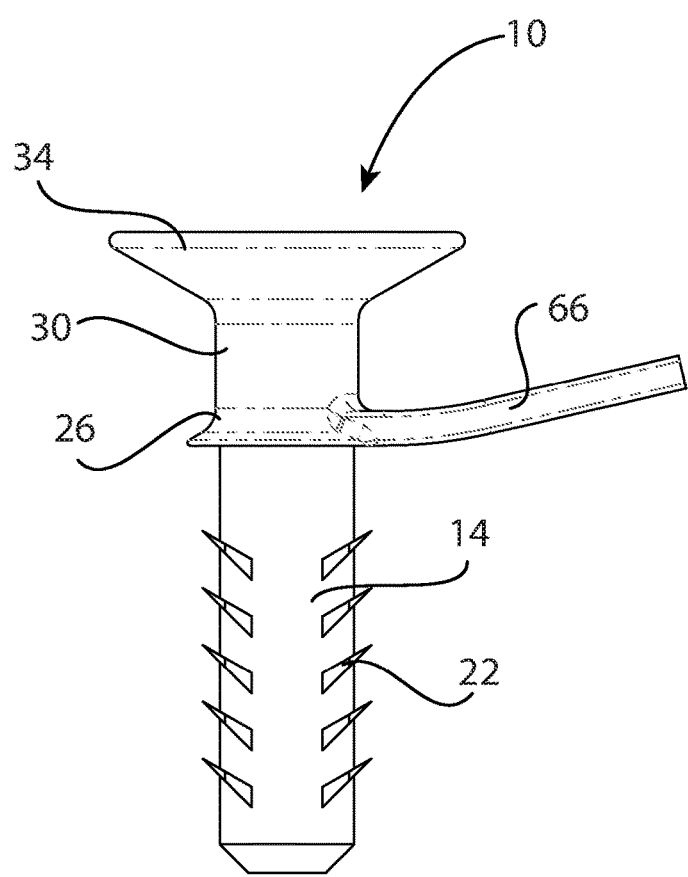
FIG. 8A shows a side view of a dovetail dowel.
Figure 8B:
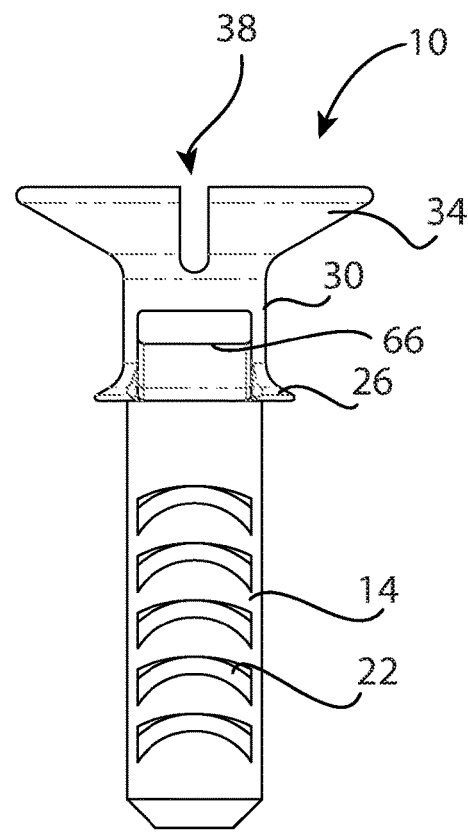
FIG. 8B shows a front view of the dovetail dowel of FIG. 8A.

FIG. 8A shows a side view of another embodiment of the dovetail dowel 10. The dowel 10 has a locking flange 66 that extends outward from adjacent the shoulder of the dowel head 18. The locking flange 66 allows the dowel 10 to be locked into place into a slot with a corresponding locking recess. FIG. 8B shows a back view of the locking dovetail dowel 10. Although the dowel is formed with a slot 38, the locking tab is also compatible with the dowel design with the dimple recess 38.

Figure 9A:
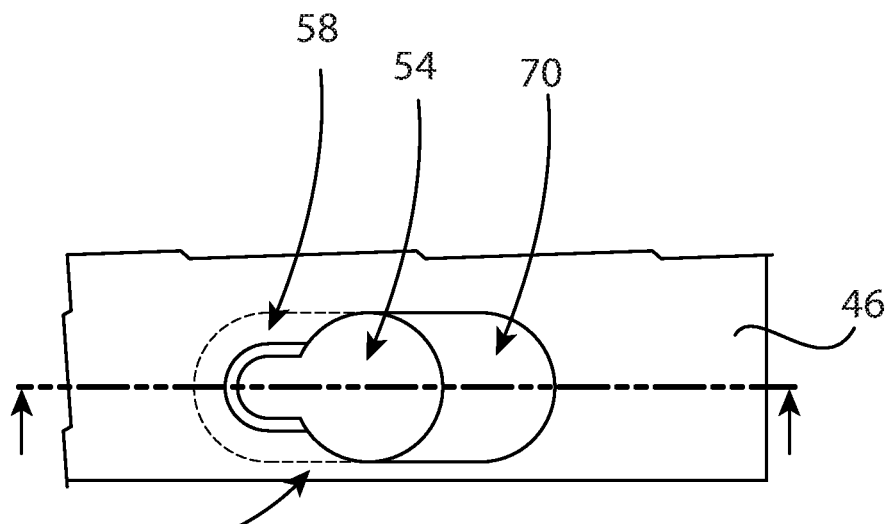
FIG. 9A shows a top view of a slot for a dovetail dowel of FIG. 8A.
Figure 9B:
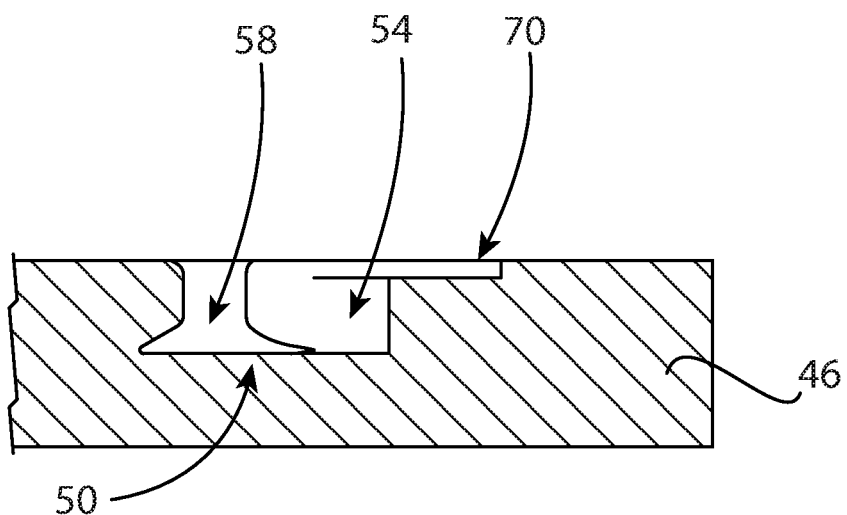
FIG. 9B shows a cross-sectional view of the slot of FIG. 9A.

FIG. 9A shows a top view of a second panel 46 with a locking slot 50 which is designed to accept the locking dovetail dowel 10 shown in FIGS. 8A and 8B. The slot 50 includes a shallow locking recess 70 on the side of the insertion section 54 opposite the retention section 58. The locking recess 70 receives the locking flange 66. FIG. 9B shows a cross-sectional side view of the locking slot 50 taken along the center plane of the slot 50. The locking recess 70 is relatively shallow compared to the depth of the slot insertion section 54 and is sufficiently deep to receive the locking flange 66.

The locking flange may be made to work in a few different ways. In one configuration, the locking flange 66 may enter the locking recess 70 when the dowel head 18 is fully inserted into the slot retention section 58. When the dowel head 18 is initially inserted into the slot 50, the locking flange 66 may be positioned to the right of the locking recess 70 and contact the top surface of the second panel 46. When the dowel head 18 is moved into the slot retention section 58 in an assembled configuration, the locking flange 66 is moved above the locking recess 70 and snaps down into the locking recess. The dowel head 18 cannot move to the right to take the dowel head out of the slot 50 unless the locking flange 66 is first lifted out of the locking recess 70.

Figure 10A:
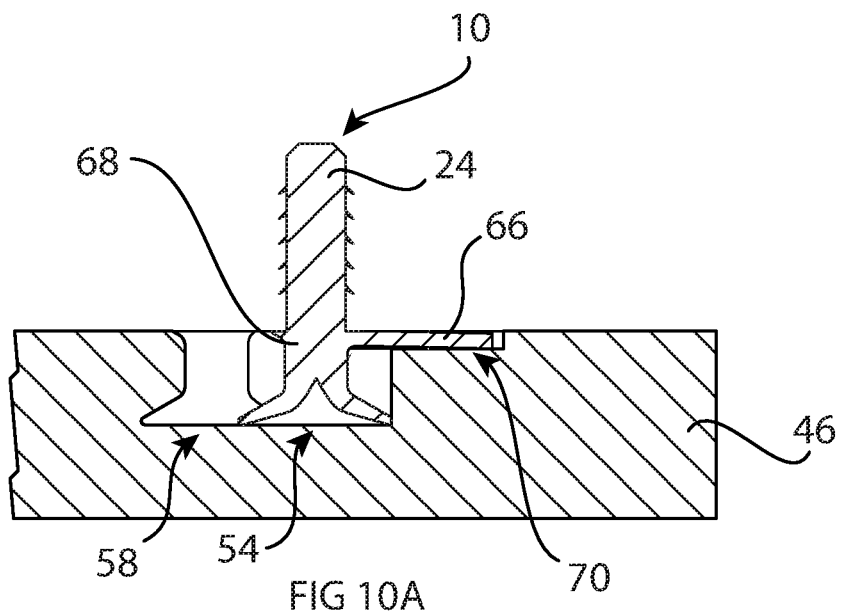
FIG. 10A shows a cross-sectional view of the slot of FIG. 9A with the dovetail dowel.
Figure 10B:
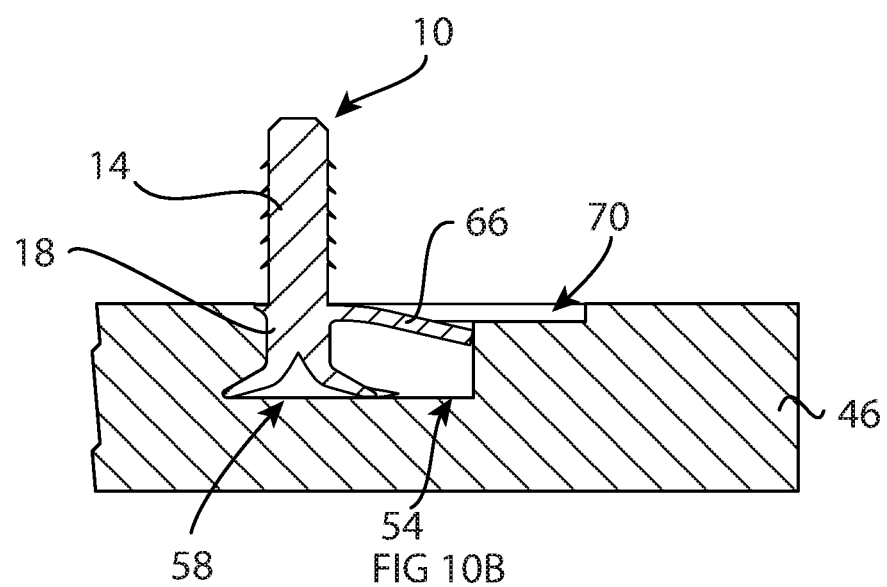
FIG. 10B shows a cross-sectional view of the slot of FIG. 9A with the dovetail dowel.

In another configuration, the locking flange 66 may be initially inserted into the locking recess 70 and may move into the insertion section 54 of the slot 50 to lock the dowel 10 in place in the slot retention section 58. FIGS. 10A and 10B show this configuration. FIG. 10A shows cross-sectional side view of the locking slot 50 and locking dovetail dowel 10 through the center plane of the slot 50. The dowel head 18 has entered the open insertion section 54 of the slot 50 and the locking flange 66 has been placed into the locking recess 70 of the slot 50. The locking flange 66 is bent upward by contact with the locking recess 70 area of the slot 50. FIG. 10B shows another cross-sectional side view of the locking slot 50 and locking dovetail dowel 10. The dowel head 18 has been moved to the left from the insertion section 54 of the slot 50 into the retention section 58 of the slot 50. This movement allows the locking flange 66 to snap down to its un-flexed position into the enlarged insertion section 54 of the slot 50. The locking flange 66 now acts as a catch, preventing the dowel head 18 from sliding back toward the slot insertion section 54 and locking the dovetail dowel in place. Depending of the design of the slot and the locking flange (e.g. through an access hole through the second panel 46), the joint may allow the locking flange to be bent upwardly to release the dowel 10 and permit disassembly of the joint. Alternatively, the locking flange and slot may be designed to be difficult to remove; resulting in a more permanent joint.

Figure 10C:
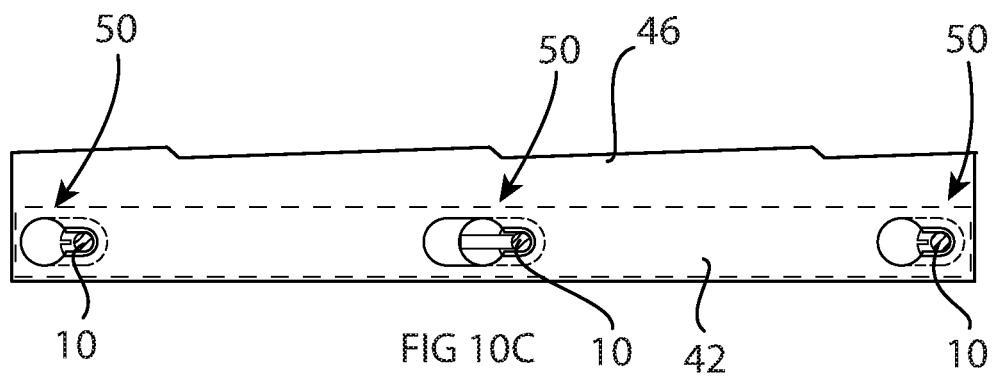
FIG. 10C shows a top view of a joint with the slot of FIG. 9A and the dovetail dowel.

FIG. 10C shows a cross-sectional top view of a first panel 42 (shown in dashed lines) which has three dovetail dowels 10 and a second panel 46 (shown in solid lines) with three corresponding slots 50. The center dowel 10 and center slot 50 include a locking flange 66 and locking recess 70. The first panel 42 is shown locked into an assembled configuration with the second panel 46. Three dovetail dowels 10 are positioned along the length of the edge of the first panel 42 and have been slid into the retention section 58 of their respective slots 50 on the second panel 46. Only one locking dovetail dowel 10 and slot 50 is necessary to prevent all three dovetail dowels from sliding back out as it prevents lateral movement of the first panel 42 relative to the second panel 46.

Figure 11A:
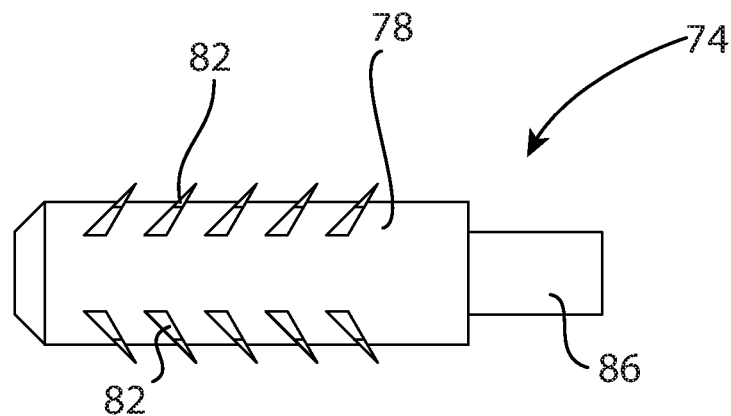
FIG. 11A shows a side view of a locking pin.
Figure 11B:
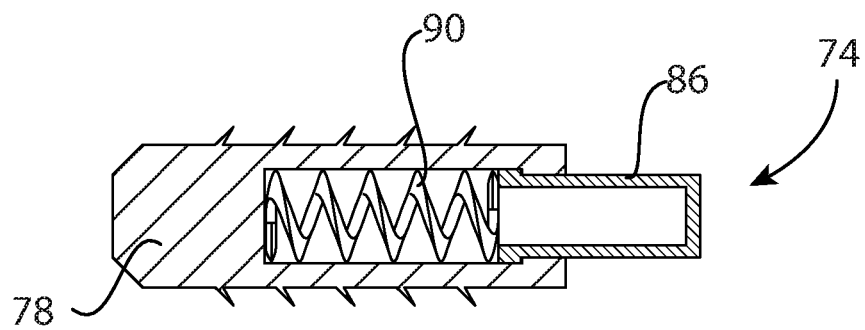
FIG. 11B shows a cross-sectional view of the locking pin of FIG. 11A.
Figure 11C:
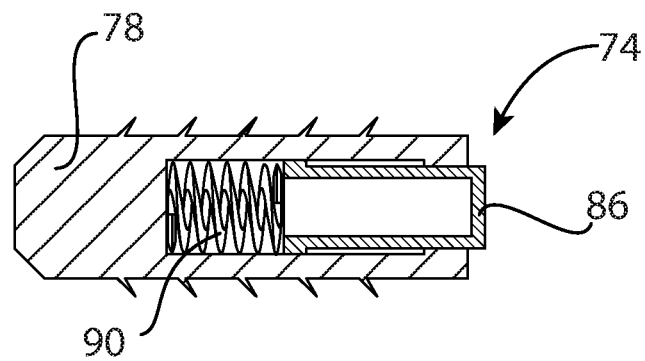
FIG. 11C shows a cross-sectional view of the locking pin of FIG. 11A.

FIG. 11A shows a side view of a locking pin 74 which could be used in combination with dovetail dowels to create a locking joint that prevents disassembly of a first panel 42 and second panel 46. The locking pin includes a stem 78 with barbs 82. The stem forms a housing holding a retractable pin 86. FIGS. 11B and 11C show cross-sections of the locking pin with the pin 86 extended and partially retracted. The stem 78 also houses a spring 90 which biases the pin 86 into an extended position.

FIG. 12A shows a cross-sectional side view of a furniture joint using the locking pin 74. A first panel 42 includes two dovetail dowels 10 and one locking pin 74 inserted into mating holes on the edge of the first panel. A second panel 46 includes two slots 50 and a locking pin hole 94 with locations corresponding to the position of the dowels 10 and locking pin 74. FIG. 12B shows how the heads of the dovetail dowels 10 have been inserted into the open insertion portions of their appropriate slots 50. This assembly step pushes the pin 86 into the locking pin stem 78 as it contacts the face of the second panel 46. As shown in FIG. 12C, the first panel 42 is then slid to the right, moving the heads of the dovetail dowels 10 to the right and into the retaining sections of their respective slots 50. The movement of the first panel 42 also moves the retractable pin 86 over the locking pin hole 94 in the second panel 46; allowing the pin 86 to extend into the locking pin hole 94. This locks the first panel 42 in place and prevents the dovetail dowels 10 from sliding backwards out of the retention sections of the slots 50. FIG. 12D shows a cross-sectional top view of FIG. 12C with the first panel 42 in dashed lines and the second panel 46 in solid lines. The second panel 46 may include a small hole formed coaxially with the locking pin hole 94 and extending through the second panel. This hole allows a pin to be inserted through the second panel 94 to depress the locking pin 86 and disassemble the joint.

Figure 13A:
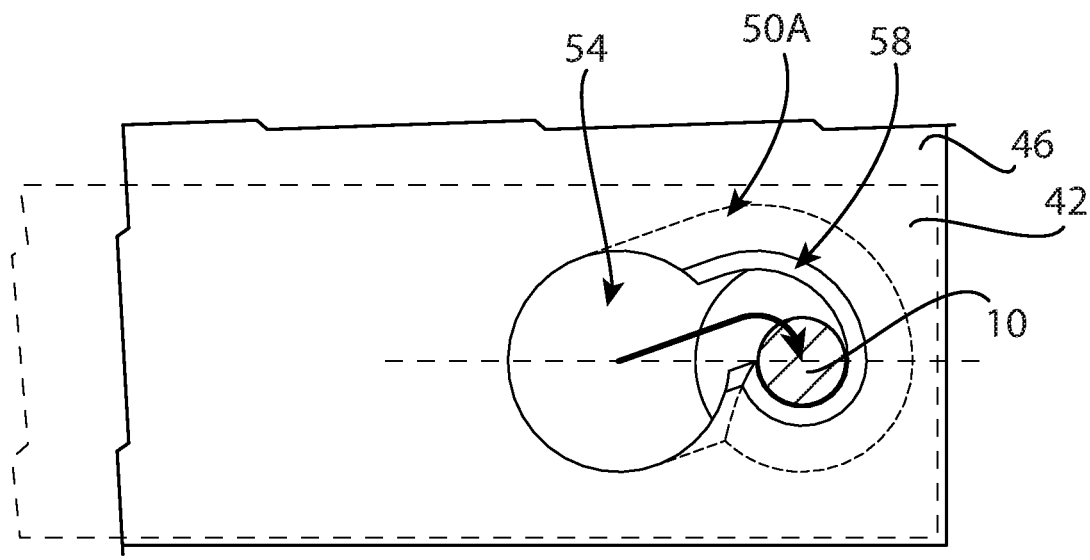
FIG. 13A shows a top view of a slot for a dovetail dowel.

FIG. 13A shows a cross-sectional top view of a portion of the second panel 46; illustrating another embodiment of the dovetail slot 50A. The slot 50A has a curved path on the retention section 58 of the slot 50A which causes bending of the first panel 42 during assembly of the joint and subsequent unbending of the first panel 42 when the joint is fully assembled. The first panel may remain with a small amount of bending in the assembled joint. The open insertion section 54 of the slot 50A is in line with the un-flexed position of the first panel, and the far end of the narrow retention section 58 of the slot 50A is also in line (or closely aligned) with the un-flexed position of the first panel. The curved path of the retention section 58 causes the dowel head 18 to move laterally between the insertion section 54 and the end of the retention section 58 and forces the first panel 42 to flex temporarily. If the far end of the retention section 58 of the slot is nearly in line with the un-flexed position of the panel but slightly displaced laterally, the first panel 42 flexes and un-flexes during assembly and remains slightly flexed when the joint is fully assembled. This would reduce looseness and slop in the joint.

Figure 13B:
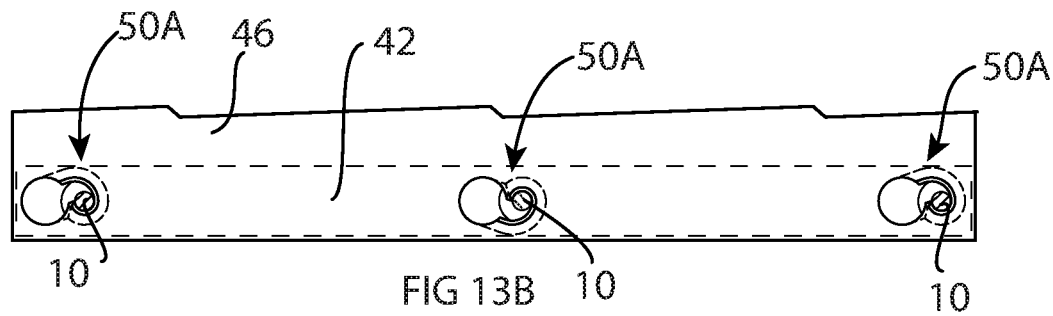
FIG. 13B shows a top view of a joint with the slot of FIG. 13A.

FIG. 13B shows a cross-sectional top view of a joint using the curved-path slot. A first panel 42 has three dovetail dowels 10 inserted in its edge. A mating second panel 46 has three curved-path slots 50A formed in its face. The left and right slots 50A curve clockwise (displaced up), while the center slot 50A curves counterclockwise (displaced down). This forces the center of the first panel 42 downward and the left & right sides of the first panel 42 upward as the dovetail dowels 10 are slid into the ends of the retention sections 58 of the slots 50A; flexing the first panel 42 during assembly of the joint. Once the dovetail dowels 10 have been pushed approximately halfway the distance to the end of the slot retention section 58, the geometry of the slots begins decreasing the amount of flexing of the first panel 42 and the elasticity of the first panel 42 forces the dovetail dowels 10 to the ends of the retention sections 58 of their respective slots 50A. The resistance to bending of the first panel 42 resists movement of the dovetail dowels 10 back out of the slots 50A. This creates a joint which resists disassembly, but which can still be disassembled without damage if sufficient force is applied to flex the first panel 42.

Figure 13C:
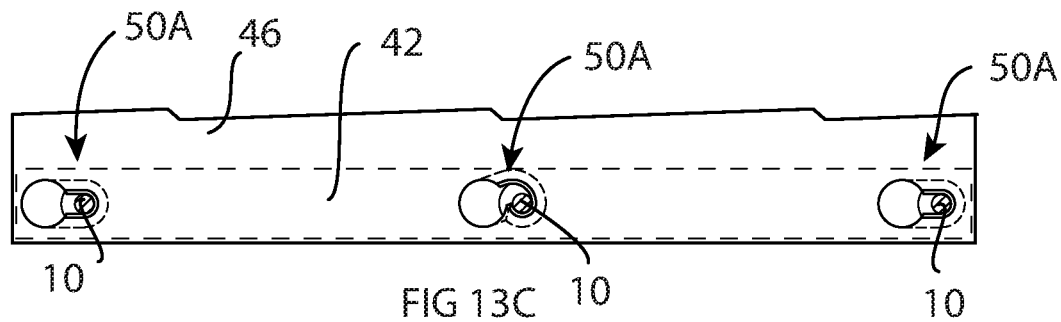
FIG. 13C shows a top view of a joint with the slot of FIG. 13A.

FIG. 13C shows a cross-sectional top view of a joint using the curved-path slot. A first panel 42 has three dovetail dowels 10 inserted in its edge. A mating second panel 46 has two slots 50 and one curved-path slot 50A formed in its face. The left and right slots 50 do not curve and the center slot 50A curves clockwise (displaced up). This forces the center of the first panel 42 upward as the dovetail dowels 10 are slid into the ends of the retention sections 58 of the slots 50, 50A; flexing the first panel 42 during assembly of the joint. This embodiment does not cause as much flexing as the embodiment shown in FIG. 13B, and is easier to assemble.

Figure 13D:
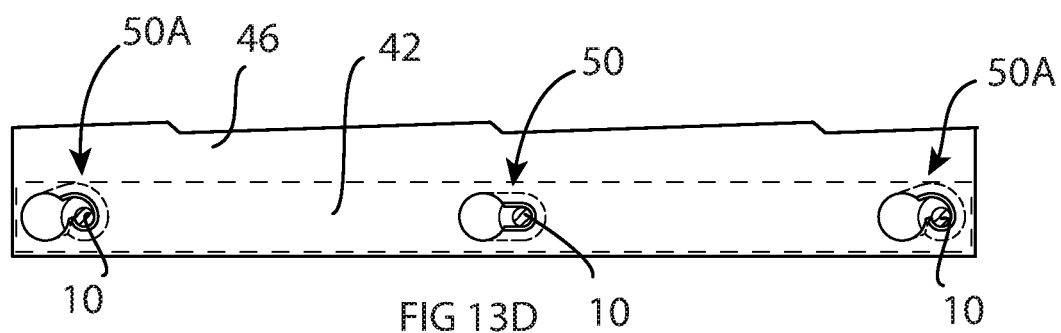
FIG. 13D shows a top view of a joint with the slot of FIG. 13A.

FIG. 13D shows a cross-sectional top view of a joint using the curved-path slot. A first panel 42 has three dovetail dowels 10 inserted in its edge. A mating second panel 46 has a slot 50 and two curved-path slots 50A formed in its face. The left and right slots 50A curve clockwise (displaced up) while the center slot 50 does not curve. This forces the ends of the first panel 42 upward as the dovetail dowels 10 are slid into the ends of the retention sections 58 of the slots 50, 50A; flexing the first panel 42 during assembly of the joint. This embodiment does not cause as much flexing as FIG. 13B, and is easier to assemble.

Figure 14A:
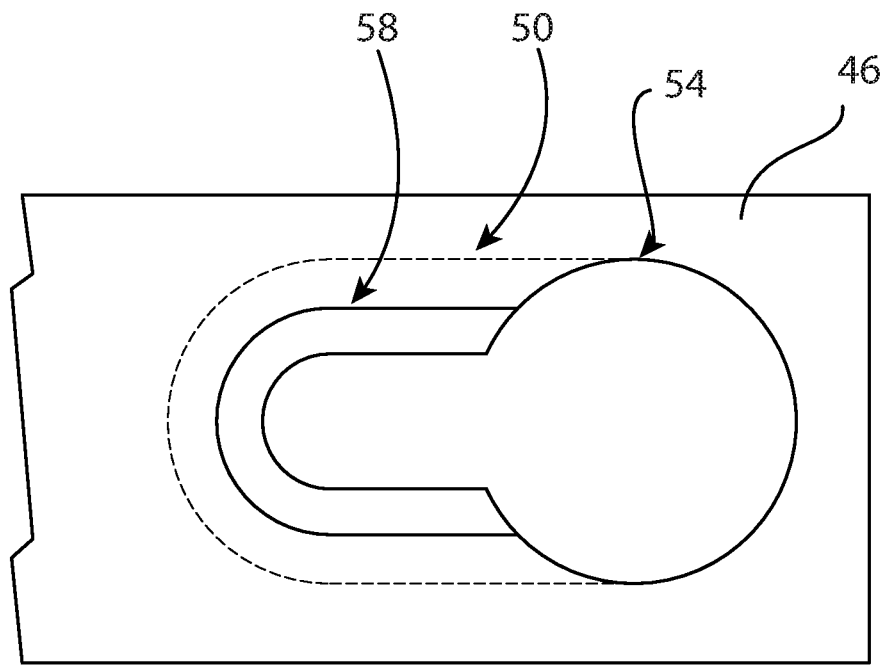
FIG. 14A shows a top view of a slot for a dovetail dowel.
Figure 14B:
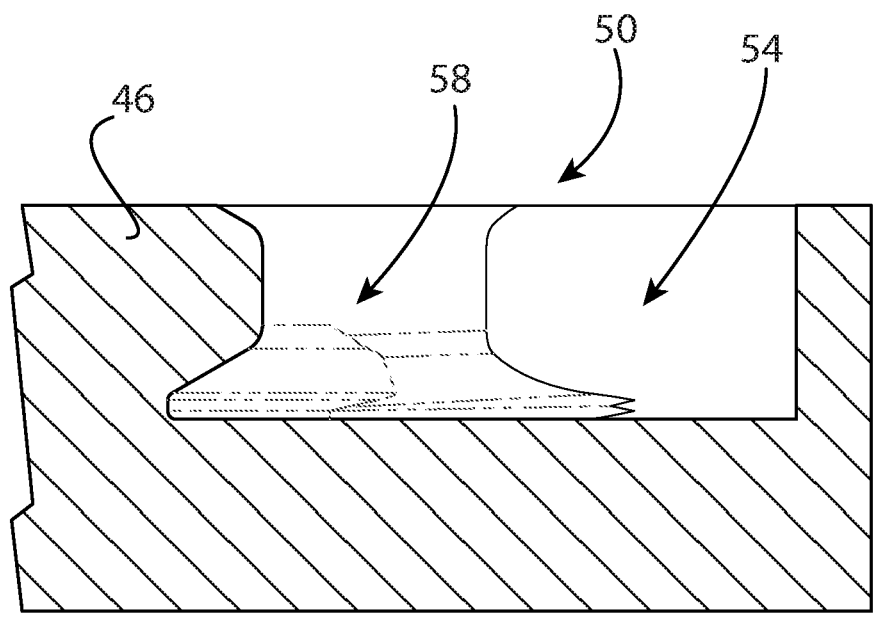
FIG. 14B shows a cross-sectional view of the slot of FIG. 14A.

FIGS. 14A and 14B show a top view and cross-sectional view of another embodiment of the slot 50. This slot 50 has an insertion section 54 and a retention section 58 of varying depth. The retention section 58 of the slot 50 gradually increases in depth as it extends left away from the open insertion section of the slot. FIG. 14B shows a cross-sectional side view of the slot 50 through the center plane of the slot 50. The slot retention section 58 may be formed by moving a cutter down through the insertion section 54 to a small distance above the maximum depth of the slot, laterally and down towards the end of the retention section 58, up or laterally and up to the end of the retention section, down to the maximum depth of the slot, over to the insertion section 54, and up out of the slot 50. The sloped inner surface of the retention section 58 of the slot 50 which contacts the sloped surface of the flange 34 thus starts out shallower adjacent the insertion section 54, becomes deeper through the middle of the retention section 58, and then becomes shallower at the end of the retention section. The dowel head 18 is thus pulled downwardly into the slot 50 as it moves through the middle of the retention section 58 and is allowed to move upwardly a little as it reaches the end of the retention section 58 in the assembled position. This may cause the flange 34 to bend more while moving through the middle of the retention section 58 and then unbend somewhat as it enters the end of the retention section 58. The flange 34 may remain bent at the end of the retention section 58 while the joint is in an assembled configuration.

In other words, as the head 18 is slid into the retention section 58 of the slot, the depth of the angled sides of the retention section of the slot 50 gradually increases, forcing the conical dowel head 18 downward. This increases the amount of flexing that the flange experiences. As the conical head reaches the left, far end of the retention section of the slot, the depth of the angled sides of the retention section of the slot decreases so that this portion of the retention section is less deep than the immediately adjacent portion of the retention section. This allows the conical head 18 to pull upward, or allows the flexed flange 34 of the conical head to relax upwardly, reducing the amount of the flexing that the conical head experiences. Once the conical head has reached the far end of the narrow side of the slot, it resists sliding backward towards the open end of the slot because to do so would force it to flex.

Figure 15A:
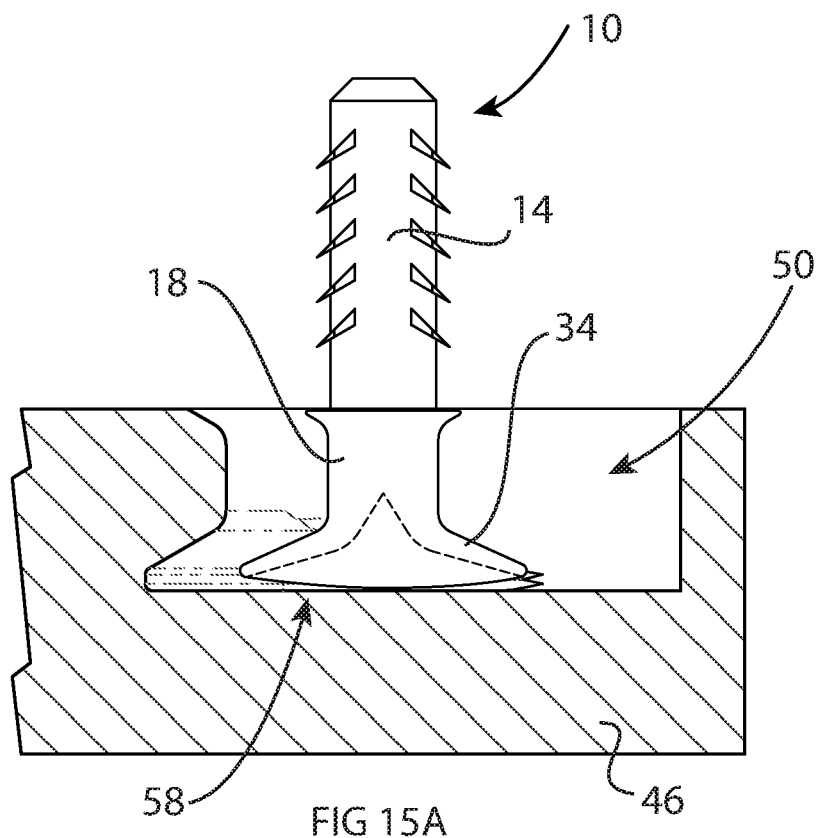
FIG. 15A shows a cross-sectional view of the slot of FIG. 14A with a dovetail dowel.
Figure 15B:
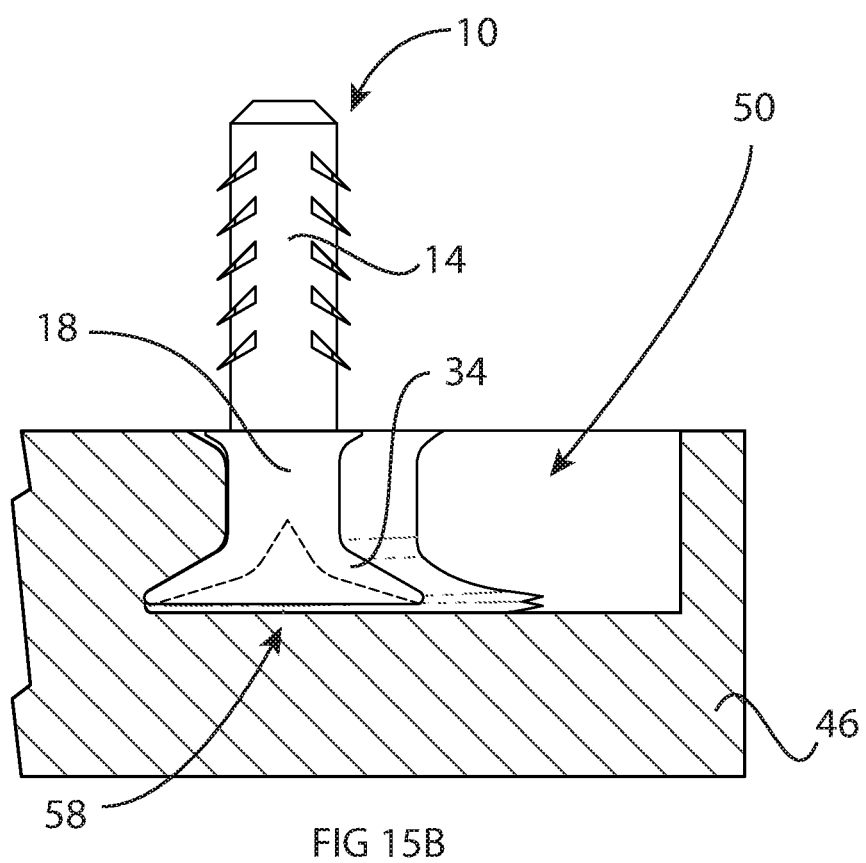
FIG. 15B shows a cross-sectional view of the slot of FIG. 14A with a dovetail dowel.

FIGS. 15A and 15B shows insertion of the dowel 10 into the slot 50. FIG. 15A shows the dowel head 18 inserted partway into the retention section 54 of the slot 50. As discussed, the sides of the flange 34 are bent downwardly by the retention section 54 of the slot. FIG. 15B shows the dowel head 18 inserted all the way to the left end of the retention section 58 of the slot 50. The flange 34 has been allowed to un-flex slightly due to the decreasing depth of the engaging surface of the retention section 58 of the slot 50. The flexing of the flange 34 can be reduced to any desired level, including full relaxation, or remaining stressed.

Figures 16A, 16B:
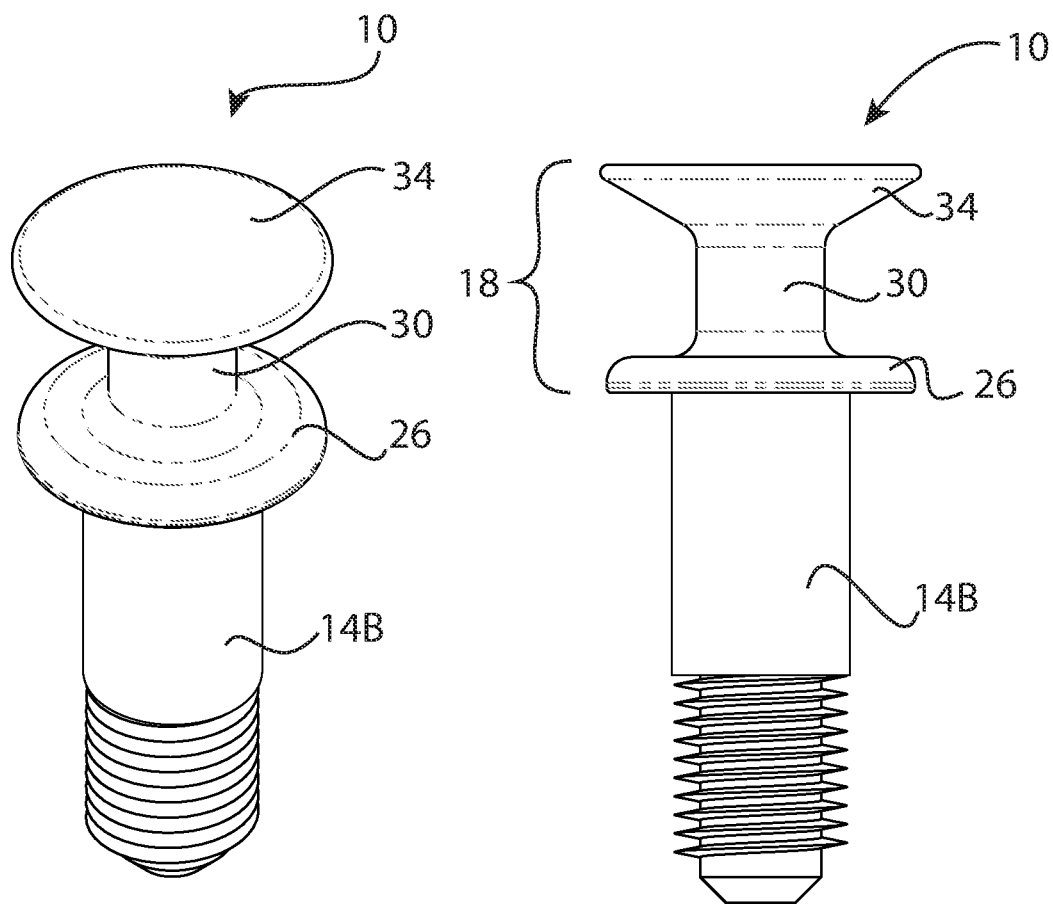
FIG. 16A shows a perspective view of a dovetail dowel.
FIG. 16B shows a side view of the dovetail dowel of FIG. 16A.
Figure 16C:
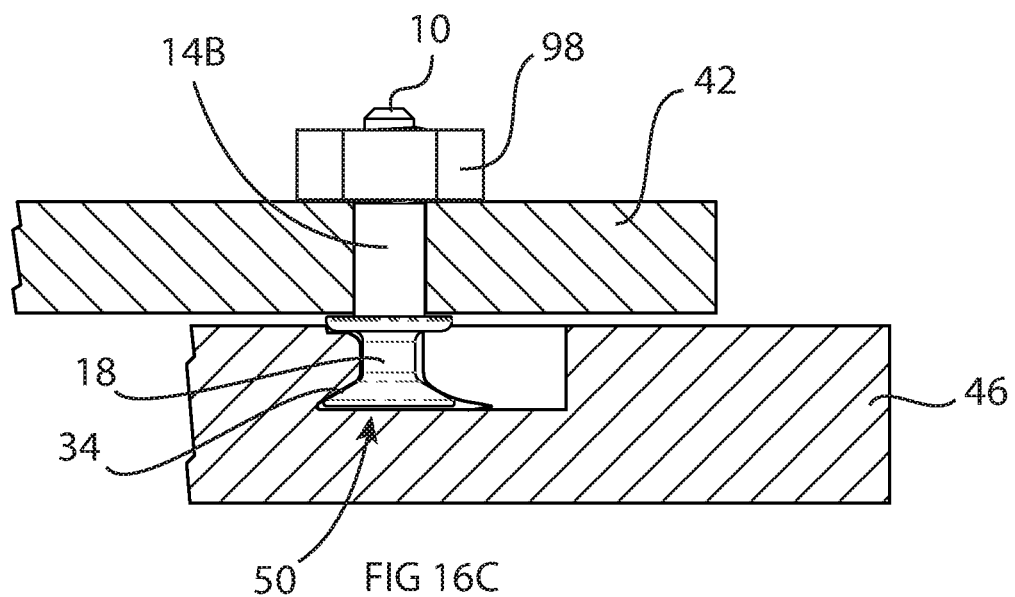
FIG. 16C shows a cross-sectional view of a joint with the dovetail dowel of FIG. 16A.

FIG. 16A shows an isometric view of a bolt-end embodiment of the dovetail dowel 10. The stem 14 of the dowel 10 has been replaced with a threaded stem 14B that can be attached to various furniture components with a nut or threaded hole. The head 18 along with the flange 34 maintain the geometry discussed above and may include the different recesses 38 used to control the flexibility of the flange 34. FIG. 16B shows a side view of the bolt-end dovetail dowel 10. The threaded stem 14B may include an unthreaded portion and threads. The threaded stem 14B allows the dowel 10 to be installed into panels or other furniture components such as legs, rails, etc. FIG. 16C shows a cross-sectional side view of the bolt-end dovetail dowel 10 with the dowel head 18 installed into a dovetail slot 50 as discussed above. The dowel 10 is installed into a first panel 42 and the slot 50 is formed in a second panel 46. The drawing illustrates how the two first panels 42 and the second panel 46 can be held apart from each other by the geometry of the shoulder 26 if desired.

Figures 17A, 17B:
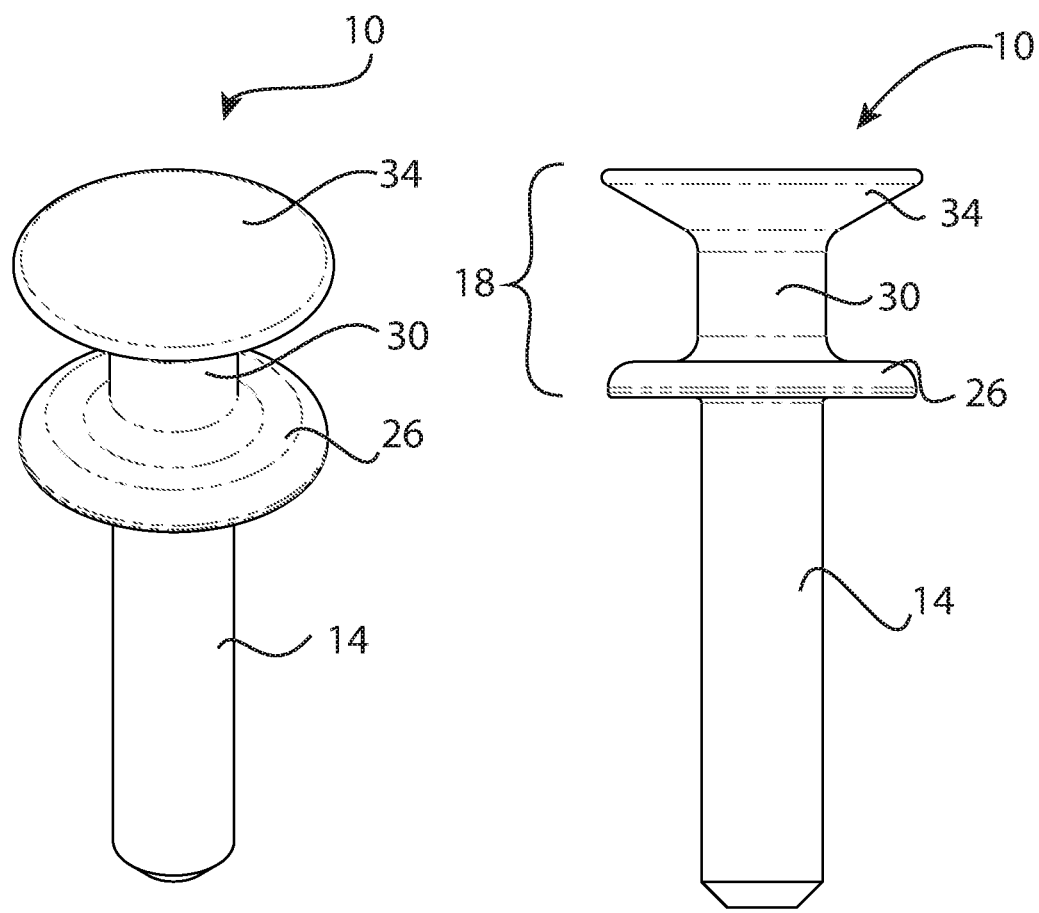
FIG. 17A shows a perspective view of a dovetail dowel.
FIG. 17B shows a side view of the dovetail dowel of FIG. 17A.
Figure 18A:
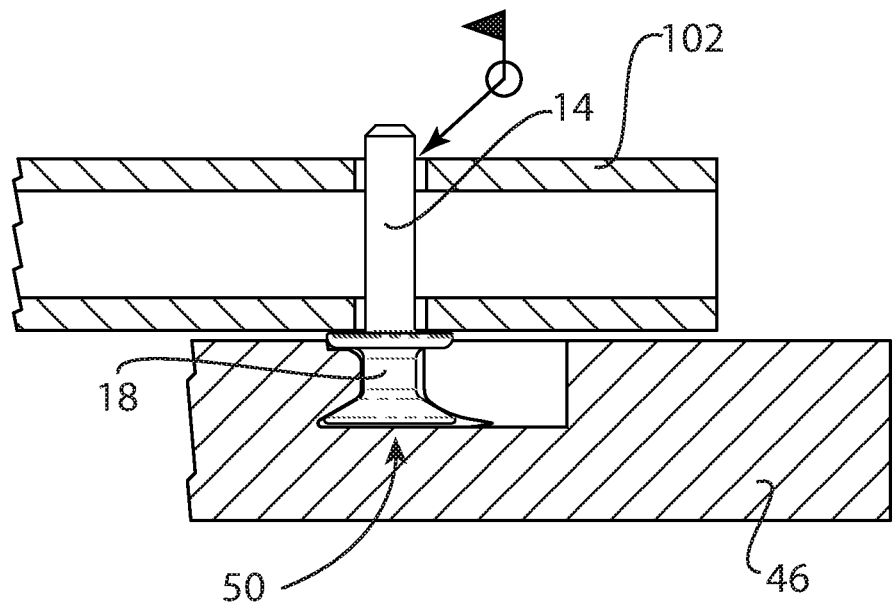
FIG. 18A shows a cross-sectional view of a joint with the dovetail dowel of FIG. 17A.
Figure 18B:
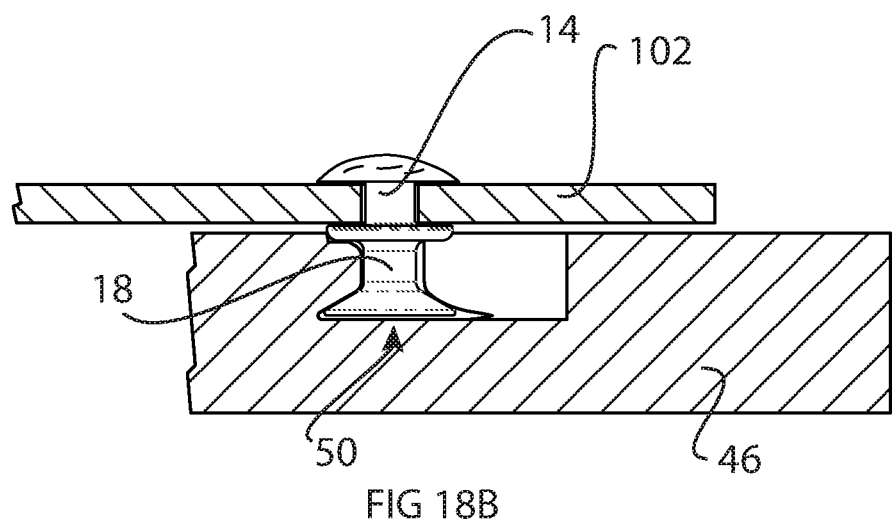
FIG. 18B shows a cross-sectional view of a joint with the dovetail dowel of FIG. 17A.

FIGS. 17A and 17B show an isometric view and a side view of a solid-end embodiment of the dovetail dowel 10 which includes a smooth stem 14. The stem 14 may be glued, welded, melted, or otherwise secured into a hole in a first panel 42 or other furniture component. FIG. 18A shows a cross-sectional side view of the dovetail dowel 10 installed into a tube 102 or other like furniture component. The stem 14 of the dovetail dowel goes through the tube 102, and is welded or bonded at the far end, fastening it to the tube 102. The dowel head 18 has been inserted into a slot 50 in a second panel 46 as discussed above. FIG. 18B shows a cross-sectional side view of a dovetail dowel 10 installed into a thin first panel 42. The stem 14 of the dovetail dowel goes through the first panel 42 and has been peened over or melted to create a rounded cap which fastens it to the first panel 42. The dowel head 18 has been assembled into a slot 50 as discussed above.

FIG. 19A shows an isometric view of a screw-end embodiment of the dovetail dowel 10. The stem 14 has been replaced with a screw stem 14C. The screw stem 14C allows the dowel 10 to be more easily installed into some types of wood, foamed plastic, etc. The flange 34 may be formed with a drive socket 38B which receives a drive tool to install the dowel 10. The drive socket 38B may be sized to act as a recess 38 which controls the flexibility of the flange 34. FIG. 19B shows a side view of the screw-end dovetail dowel 10. FIG. 19C shows a cross-sectional side view of the screw-end dovetail dowel 10 installed into a first panel 42. The head 18 has been assembled into a slot 50 formed into a second panel 46 as discussed above.

Figure 20A:
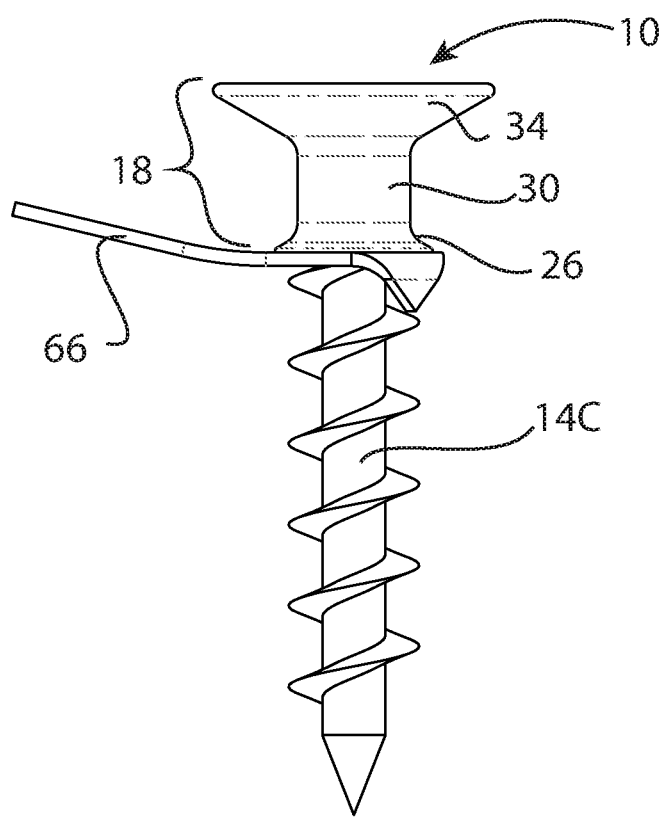
FIG. 20A shows a perspective view of a dovetail dowel.
Figure 20B:
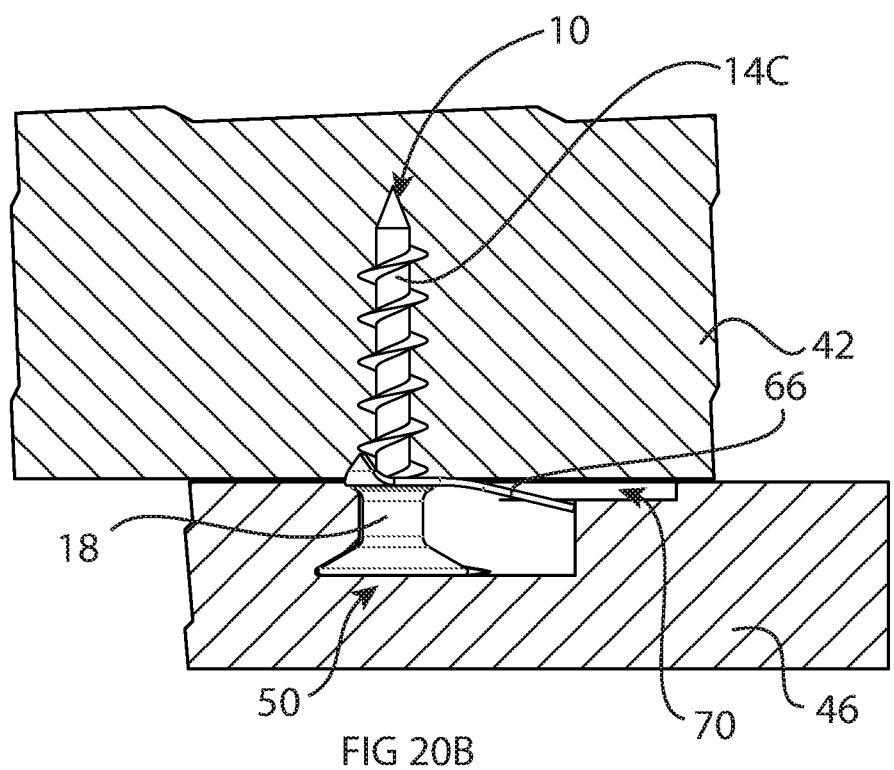
FIG. 20B shows a cross-sectional view of a joint with the dovetail dowel of FIG. 20A.

FIG. 20A shows a side view of a locking flange 66 used with the screw-end dovetail dowel 10. A thin piece of spring steel sheet metal has been formed into a locking flange 66 and threaded into the screw stem 14C until it is flush with the shoulder 26. The locking flange 66 has been formed with a slightly bent tail to engage the locking recess 70 and a bent over corner which engages the screw threads. Alternately, the locking flange may be molded in place making monolithic dowel 10. FIG. 20B shows a cross-sectional side view of a locking flange 66 and screw-end dovetail dowel 10 installed into a first panel 42. The bent over corner of the locking flange 66 adjacent the screw threads has dug into the first panel 42, preventing any rotation of the locking flange 66 relative to the panel 42. The locking flange 66 has popped below the lip of the slot locking recess 70 and entered the slot insertion section 54, acting as a catch to prevent the dowel head 18 from backing out of the slot.

Figure 21A:
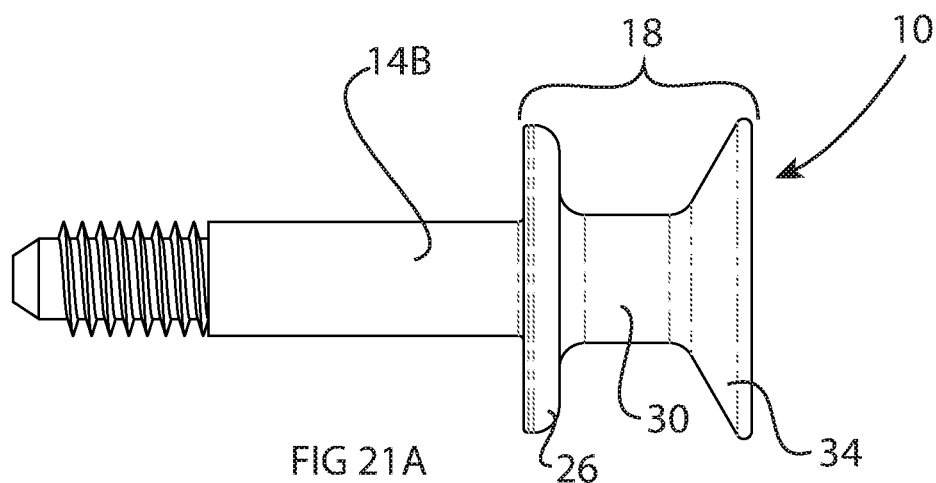
FIG. 21A shows a perspective view of a dovetail dowel.
Figure 21B:
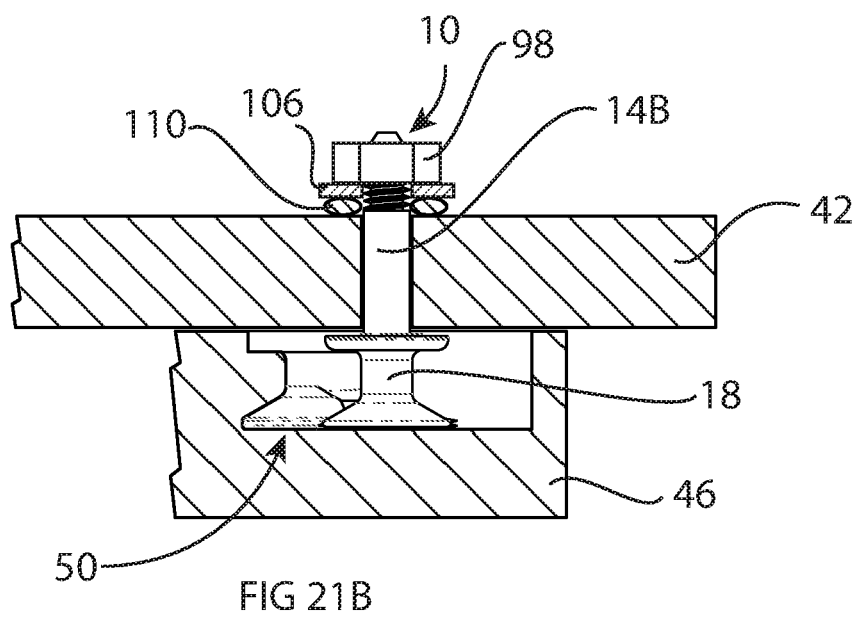
FIG. 21B shows a cross-sectional view of a joint with the dovetail dowel of FIG. 21A.
Figure 21C:
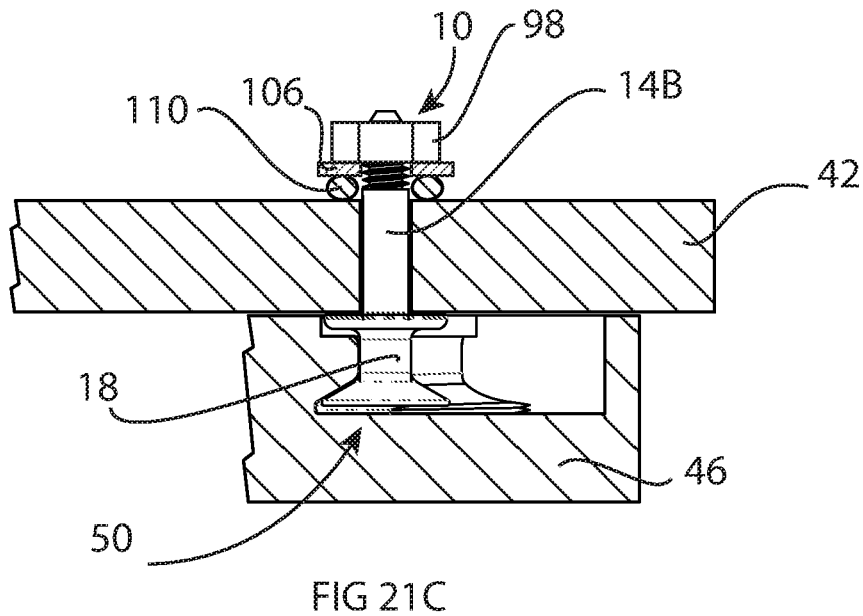
FIG. 21C shows a cross-sectional view of a joint with the dovetail dowel of FIG. 21A.

FIG. 21A shows another embodiment of the dovetail dowel 10 using a threaded stem 14B. The stem 14B may include a smooth portion and a threaded portion as shown. FIG. 21B shows a cross-sectional side view of the dowel 10 installed into a first panel 42. A nut 98, washer 106, and O-ring 110 may be used to install the dowel 10 onto the first panel 42. The nut 98 is tightened enough to cause a slight amount of deformation in a flexible O-ring 110. The head 18 of the dovetail dowel 10 is prevented from pulling through the first panel 42 due to the shoulder 26. The slot 50 in the second panel 46 is formed as a variable depth slot as discussed in FIGS. 14A through 15B. Accordingly, the retention section 58 of the slot has an angled engagement surface and deepens as it initially moves away from the insertion section 54 of the slot and then becomes less deep as it reaches the end of the retention section 58 of the slot 50. The head 18 of the dowel 10 is shown partway down the insertion section 58 of the slot 50, and therefore the head 18 has been forced downward. This downward movement is enabled via compression of the flexible O-ring 110 which sits between the washer 106 and the first panel 42. In this position, the O-ring 110 is deformed significantly. Another axially compliant member such as a wave washer, disc washer, or compression coil spring could be used in place of the O-ring 110. FIG. 21C shows a cross-sectional side view of the dowel 10 with the dowel head 18 moved to the end of the retention section 58 of the slot 50. The dowel head 18 has moved upwardly relative to the position shown in FIG. 21B as the depth of the retention section 58 of the slot 50 has decreased at its end. This movement allows the O-ring 110 to expand toward its normal circular shape. The O-ring 110 is still compressed slightly, which prevents the joint from having any slop and stiffens the joint.

Figure 22A:
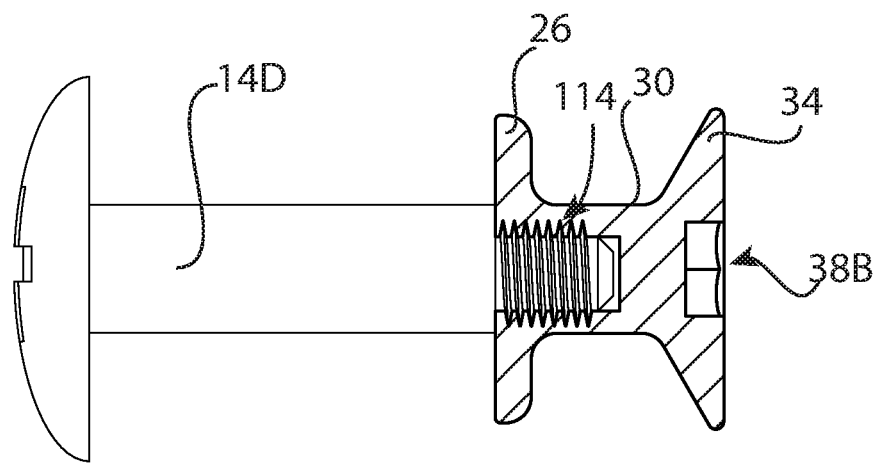
FIG. 22A shows a perspective view of a dovetail dowel.

FIG. 22A shows another embodiment of the dovetail dowel 10 similar to that shown in FIGS. 21A through 21C. This embodiment has a dovetail dowel head 18 with an internally threaded hole 114 hole formed in the shoulder 26 and a drive socket 38B formed on the distal face of the flange 34. The second part of the dowel 10 is formed by a shoulder bolt 14D which includes a shaft which has threads on one end, and a bolt head on the other end. In this embodiment, the shoulder bolt shaft threads into the hole 114 in the shoulder 26.

Figure 22B:
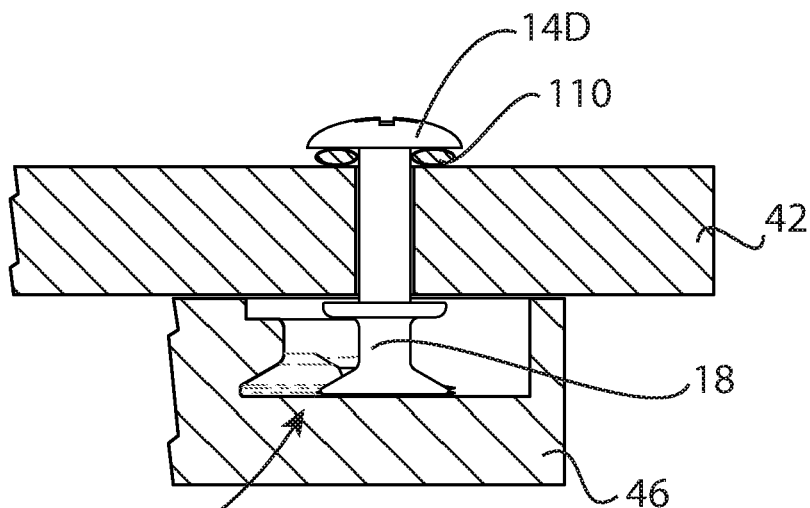
FIG. 22B shows a cross-sectional view of a joint with the dovetail dowel of FIG. 22A.

FIG. 22B shows a cross-sectional side view of the dovetail dowel 10 installed into a first panel 42. An O-ring 110 has been placed between the head of the bolt 14D and the first panel 42. A slot 50 is formed in the second panel 46. The retention section 58 of the slot 50 includes the variable-depth discussed above and with respect to FIGS. 14A through 15B. The head 18 is partway down the retention section 58 of the slot 50 and the head 18 has been forced downward by the changing depth of the retention section 58 of the slot 50. This downward movement is enabled via compression of the flexible O-ring 110 which sits between the washer and the panel.

Figure 22C:
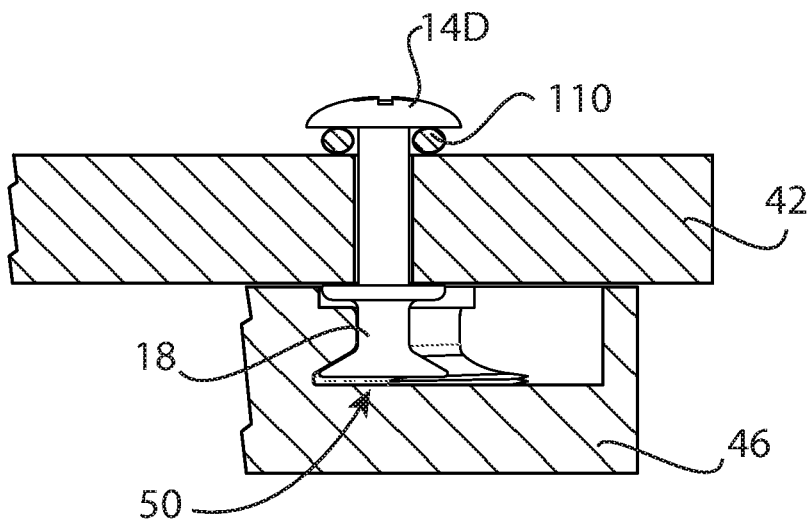
FIG. 22C shows a cross-sectional view of a joint with the dovetail dowel of FIG. 22A.

FIG. 22C shows a cross-sectional side view of the dovetail dowel 10 with the dowel head 18 moved to the end of the retention section 58 of the slot 50. The head 18 has moved upwardly relative to the position shown in FIG. 22B as allowed by the upward sloping/decrease in depth of the slot. This allows the O-ring 110 to expand toward its normal circular shape. The O-ring is still compressed slightly, which prevents the assembled joint from having any slop between the first panel 42 and the second panel 46.

Figure 23A:
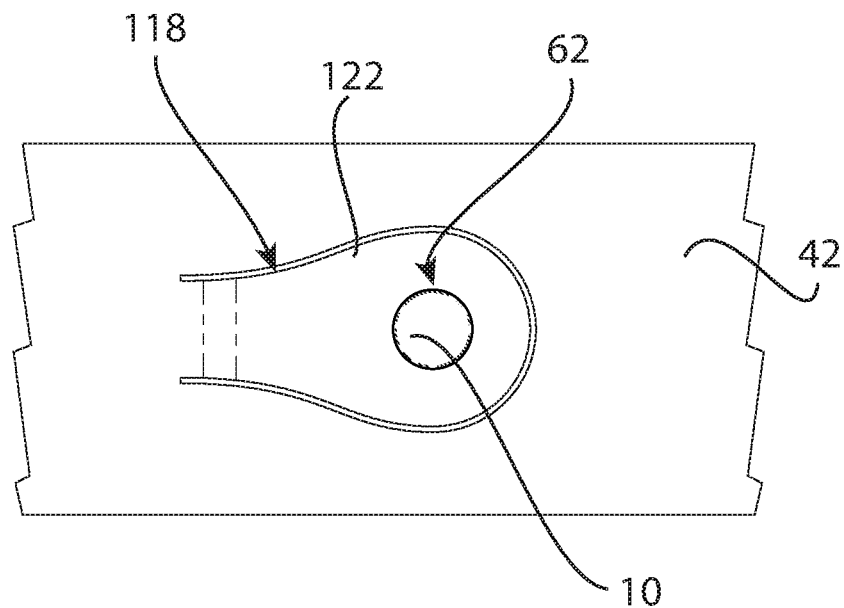
FIG. 23A shows a top view of a panel and a dovetail dowel.
Figure 23B:
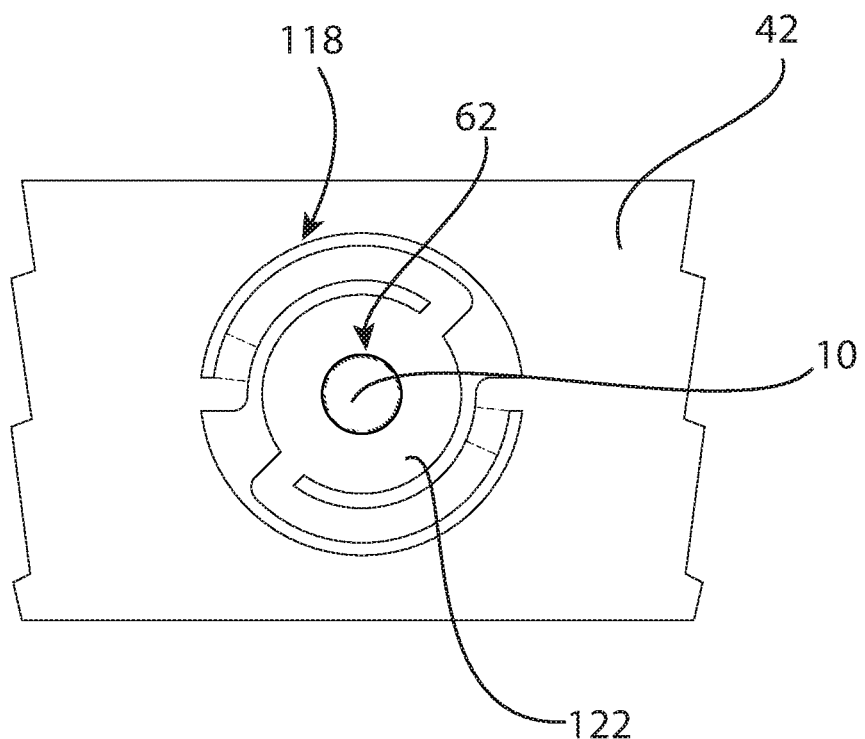
FIG. 23B shows a top view of a panel and a dovetail dowel.

FIG. 23A shows a top view of a first panel 42 (typically applicable to a metal furniture component) with a hole 62 to which a dovetail dowel 10 is fastened. The first panel 42 is formed with a slot 118 cut around the hole 62 which forms a tab 122 inside of the first panel 42 around the hole and dowel. The tab 122 is able to flex relative to the rest of the first panel 42 and allows the dowel 10 to flex upwardly and downwardly to accommodate a variable depth slot 50 as discussed above. FIG. 23B shows a top view of a first panel 42 with a hole 62 to which a dovetail dowel 10 has been fastened. The first panel 42 has been cut with a slot 118 around the hole 62 so that the dovetail dowel 10 is attached in a floating tab portion 122 of the panel 42 that is isolated from the rest of the panel and attached to the rest of the first panel 42 with fingers; allowing the tab 122 to flex around the dovetail dowel and accommodate a variable depth slot.

Figure 24A:
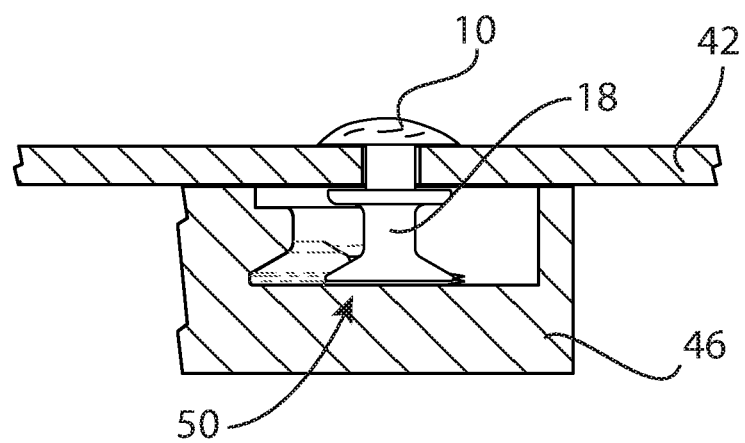
FIG. 24A shows a cross-sectional view of a joint with the panel and dovetail dowel of FIG. 23A or 23B.
Figure 24B:
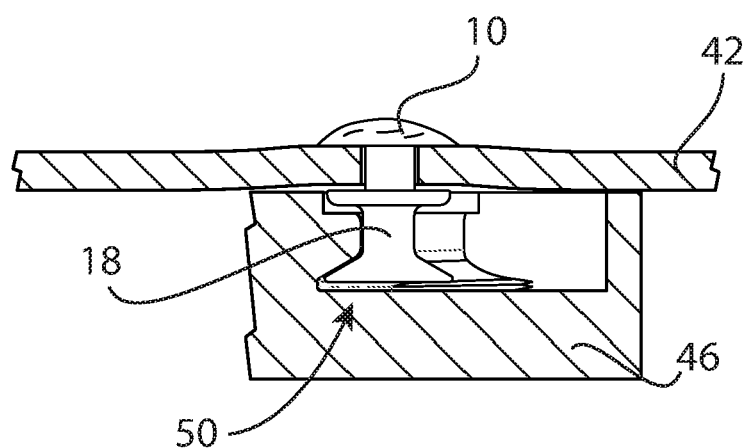
FIG. 24B shows a cross-sectional view of a joint with the panel and dovetail dowel of FIG. 23A or 23B.

FIG. 24A shows a cross-sectional side view of the dovetail dowel 10 and first panel 42 of FIG. 23A or 23B with a second panel 46 with a variable-depth slot 50. The dowel head 18 is shown partway down the insertion section 58 of the slot and the head 18 has been forced downward. This downward movement is enabled via the tab 122 flexing. FIG. 24B shows the joint of FIG. 24A fully assembled. The head 18 is at the far end of the insertion section 58 of the slot and the head 18 of the dowel 10 has moved upwardly relative to the position shown in FIG. 24B due to the decreasing depth of the slot retention section 58. This allows the tab 122 to bend upward towards its static geometry.

Figure 25:
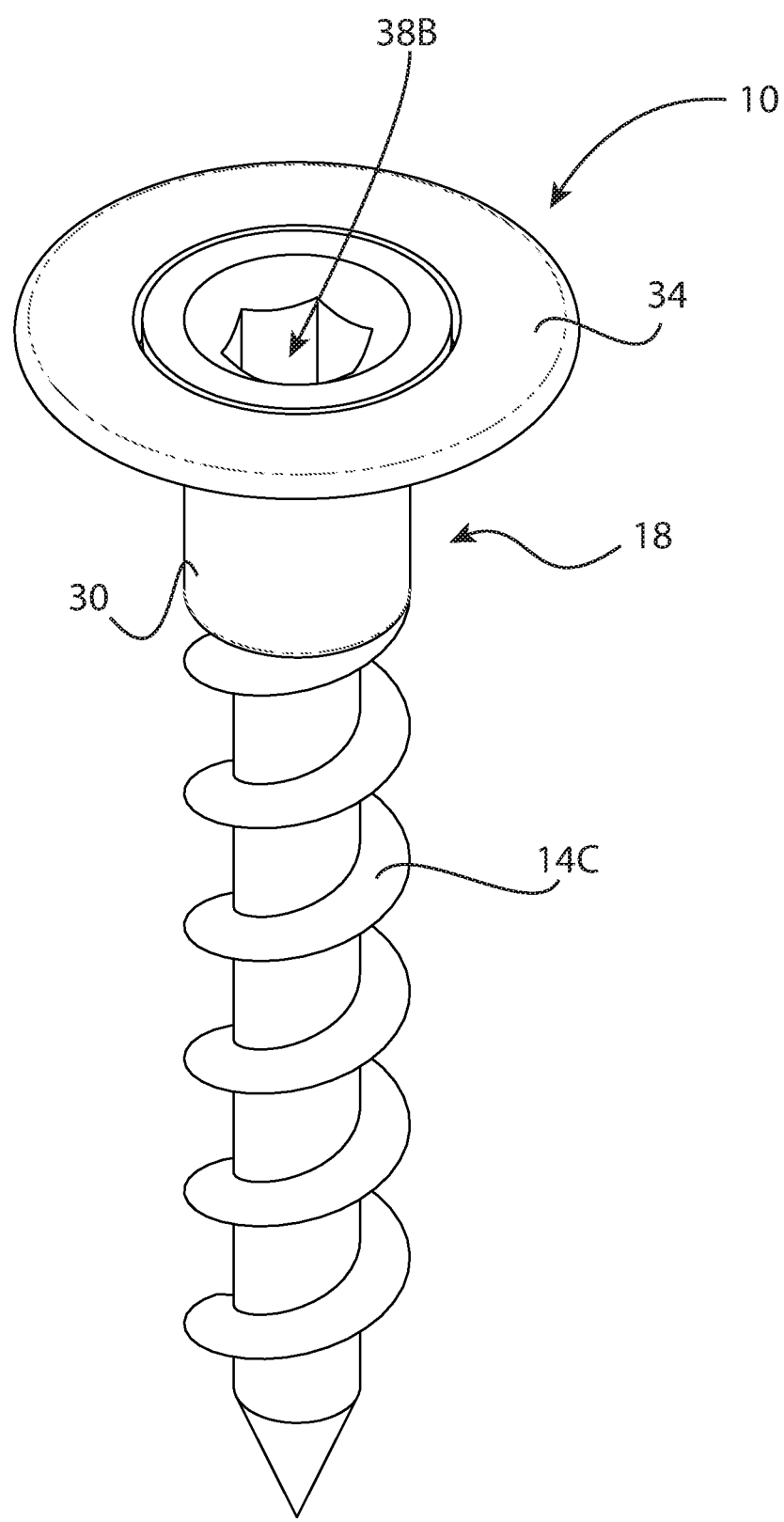
FIG. 25 shows a perspective view of a dovetail dowel.

FIG. 25 shows an isometric view of another embodiment of the dovetail dowel 10. This embodiment has a two-part head 18 with the flange 34 separated from the stem 14. While this dowel 10 is shown with a wood-screw stem 14C, it could be applied to a number of different dowel stems 14. The dowel includes a stem 14 such as a screw stem 14C or bolt stem 14B.

Figure 26A:
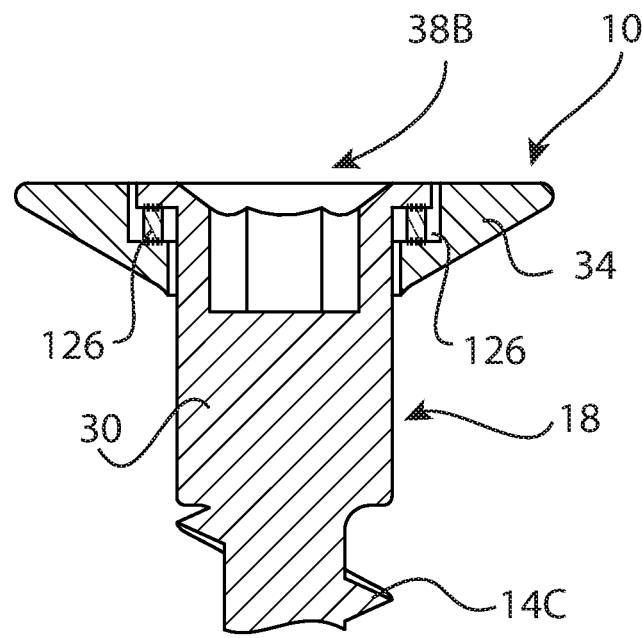
FIG. 26A shows a cross-sectional view of the dovetail dowel of FIG. 25.
Figure 26B:
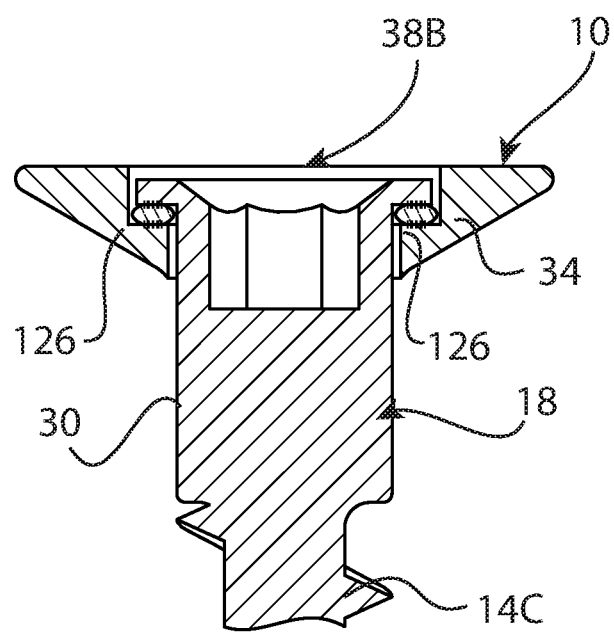
FIG. 26B shows a cross-sectional view of the dovetail dowel of FIG. 25.

FIG. 26A shows a cross-sectional side view of the dovetail dowel 10. The flange 34 is attached to the neck 30 with a flexible elastomeric coupling ring 126 with a rectangular profile which fits in between the neck 30 and flange 34. The coupling ring 126 may be connected to the neck 30 and flange 34 by an adhesive. FIG. 26B shows a cross-sectional side view of the dovetail dowel 10 with the flexible rubber ring 126 compressed; allowing the neck 30 and flange 34 to move relative to each other.

FIG. 27 shows a cross-sectional side view of the dovetail dowel 10 installed into a first panel 42. The dowel head 18 is inserted in a slot 50 with a variable-depth retention section 58 formed in a second panel 46. The head 18 is partway down the retention section 58 of the slot 50 and the flange 34 has been forced downwardly. This downward movement is enabled via the flexible rubber ring 126 which fits in between the neck 30 and the flange 34. FIG. 28 shows a cross-sectional side view of the dovetail dowel 10 with the head 18 at the far end of the retention section 58 of the slot 50; allowing the flange 34 to return upward relative to the position shown in FIG. 27. This movement allows the flexible rubber ring 126 to return towards its static geometry.

Figure 29A:
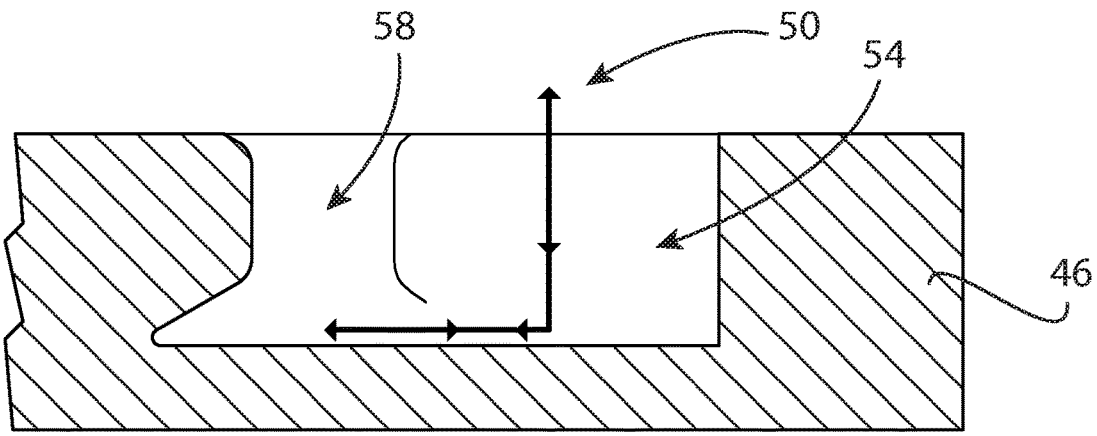
FIG. 29A shows a cross-sectional view of the slot of FIG. 5B.

FIG. 29A shows the toolpath a router bit would traverse in order to cut a simple dovetail slot 50 such as is shown in FIG. 5B. The bit moves down through the insertion section 54 and laterally through the retention section 58 and exits the second panel 46 in reverse order.

Figure 29B:
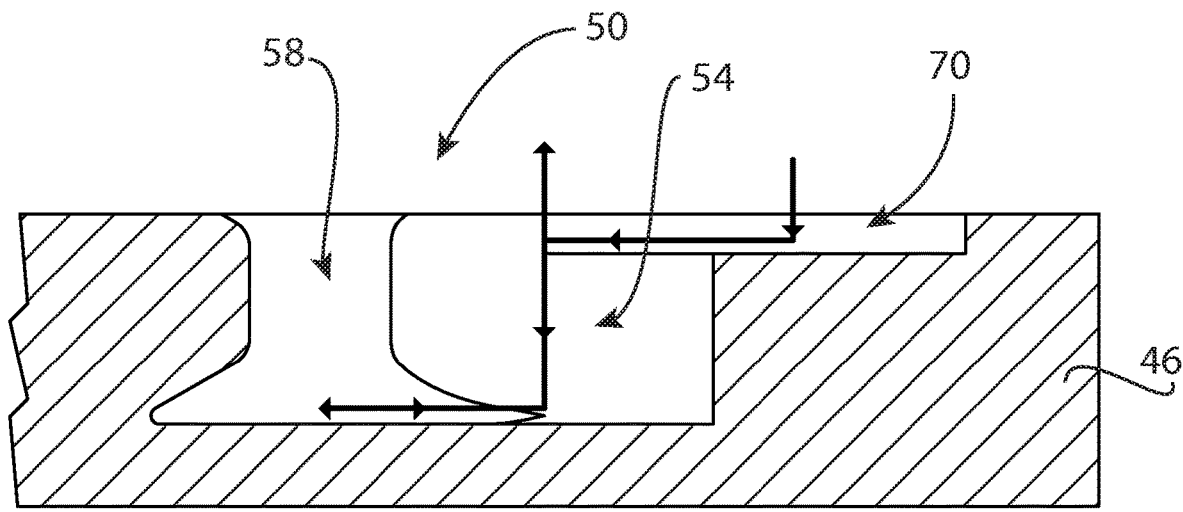
FIG. 29B shows a cross-sectional view of the slot of FIG. 9A.

FIG. 29B shows the toolpath a single router bit would traverse in order to cut a locking dovetail slot 50 as shown in FIGS. 9A and 9B. The bit moves down into the locking recess 70 and laterally to the insertion section 54, down through the insertion section 54, and then laterally through the retention section 58. The bit exits the second panel 46 by moving laterally out of the retention section 46 and upwardly out of the insertion section 54.

Figure 29C:
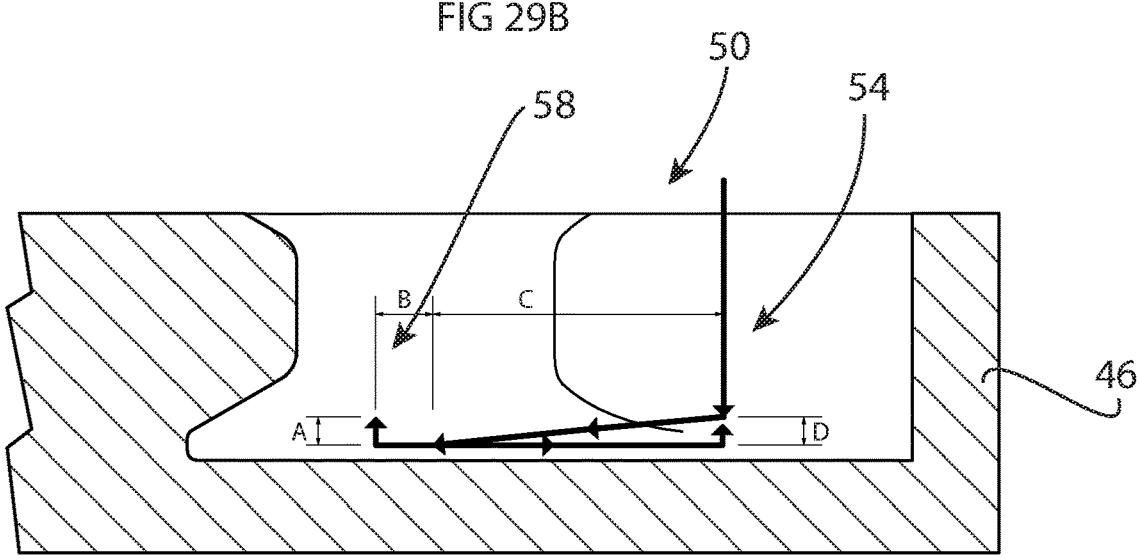
FIG. 29C shows a cross-sectional view of the slot of FIG. 14A.

FIG. 29C shows the toolpath a router bit would traverse in order to cut a variable-depth dovetail slot as shown in FIGS. 14A through 15B. Dimension D determines the amount of flexing or extending a dovetail dowel would need to be designed for in order to traverse the length of the slot retention section 58. Dimension A determines how much the dovetail dowel 10 is allowed to relax at the end of the retention section 58 of the slot 50. Dimension C defines the length of the ramp path. Dimension B defines the distance from the end of the ramp path to the end position. The bit moves downwardly into the insertion section 54 until short of the depth by dimension D, down and laterally through the retention section 58 through length C, laterally through length B and upwardly through length A. The bit is then removed by moving downwardly along length A, laterally out of the retention section 58, and upwardly out of the insertion section 54. This configuration creates a step when the dowel head 18 reaches the end of the retention section 58 and snaps upwardly. This configuration is harder to disassemble. Alternately, the slot 50 could be cut by moving the bit downwardly into the insertion section 54 until short of the depth by dimension D, down and laterally through the retention section 58 through length C, upwardly and laterally together through both length B and length A. The bit is then removed by moving downwardly along length A, laterally out of the retention section 58, and upwardly out of the insertion section 54. This configuration creates a ramp towards the end of the retention section 58 where the dowel head 18 moves upwardly more gradually when reaching the end of the retention section 58. This configuration is easier to disassemble.

Figure 30A:
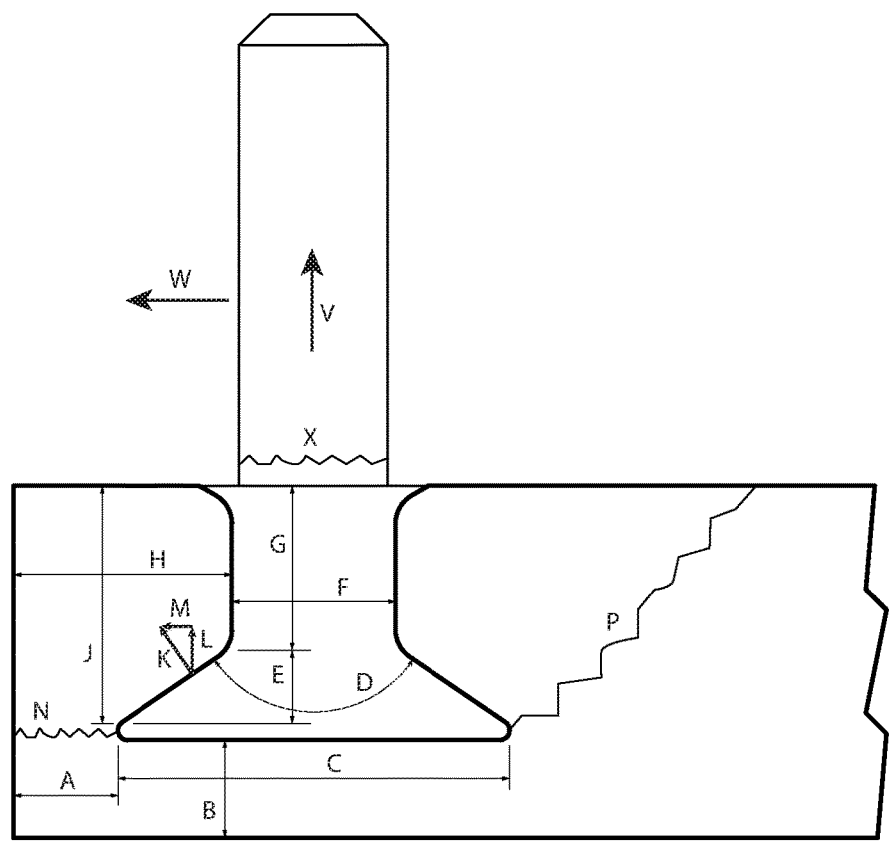
FIG. 30A shows a side view of a slot and dovetail dowel.

FIG. 30A shows dimensions which can be optimized depending on the relative strengths of the dowel and panel materials. A, B, C, D, E, F, G, H, and J are important dimensions. K, L, and M are force vectors describing the pressure that the conical head puts upon the panel material. V is a force vector applied to the dovetail dowel which potentially can cause failure mode P. W is a force vector applied to the dovetail dowel which potentially can cause failure mode N.

Figure 30B:
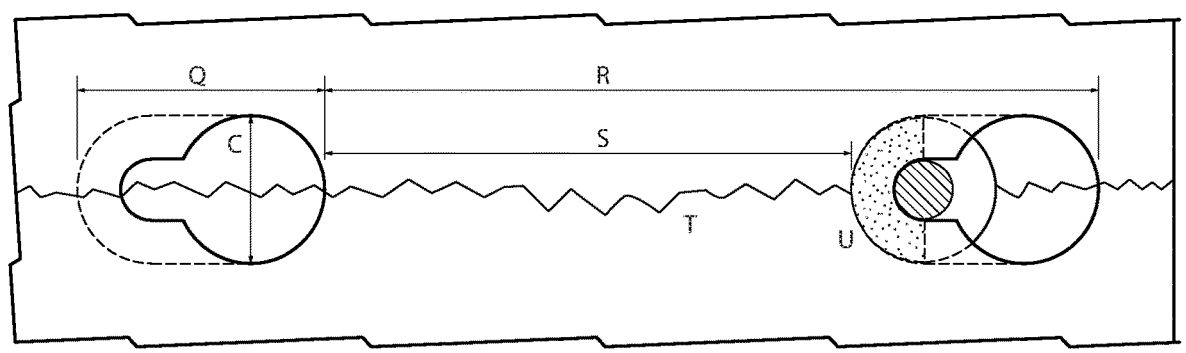
FIG. 30B shows a top view of the slot and dovetail dowel.

FIG. 30B shows dimensions which can be optimized depending on the relative strengths of the dowel and panel materials. C, Q, R, and S are important dimensions. T is a potential failure mode. And U is an approximation of the area which the conical head puts pressure upon the panel material.

The geometry can thus be optimized to achieve a very high strength joint in thin materials, which provides advantages over prior art. Assuming that the panel is an anisometric material such as wood, and the dowel is made of a higher strength isometric material such as plastic or metal, the geometry can be optimized to balance the strength of each component and maximize the overall strength of the joint.

There are several common failure models of a dowel joint

Axial slot tear out (P) from tension in the axial direction (V)

Dowel snap (X) or dowel pull out from tension in the axial direction (V)

Lateral slot tear out near an edge (N) from force in the direction (X)

Dowel shearing at base (X) from force in the direction (X)

Panel delamination at dowel insertion from dowel pressure and shear force (W)

Panel Fracture along a dowel line (T) for panel weakening due to slots

By modeling the strength of each joint in each failure mode, and normalizing the joint strengths by the desired strength, an optimization algorithm could be used to solve for optimal geometry which would reduce total underperformance, or the worst case under performance.

Manual optimization can also be done to provide higher strength joints than provided by prior art.

P shows a tear out failure mode from direct tension (V). By using a wedge shaped head the amount of material providing resistance to tear out (J) can be maximized while still providing sufficient resistance to puncture (B). A wider angle D will ensure that the horizontal component (M) of the force vector (K) is minimal, limiting the likelihood of sideways blowout. A smaller head diameter C and dowel diameter F weaken the material less, so they should be minimized until the dowel tensile strength is near the pullout strength.

The panel can also fail in bending along a line of joints. By making a smaller joint (Q) the line of fracture (T) is less interrupted and remains stronger. Alternatively, for the same strength of panel, more joints can be added. Whether more joints per length are required, or more resistance to failure is required, a smaller joint (Q) is superior.

Figure 31A:
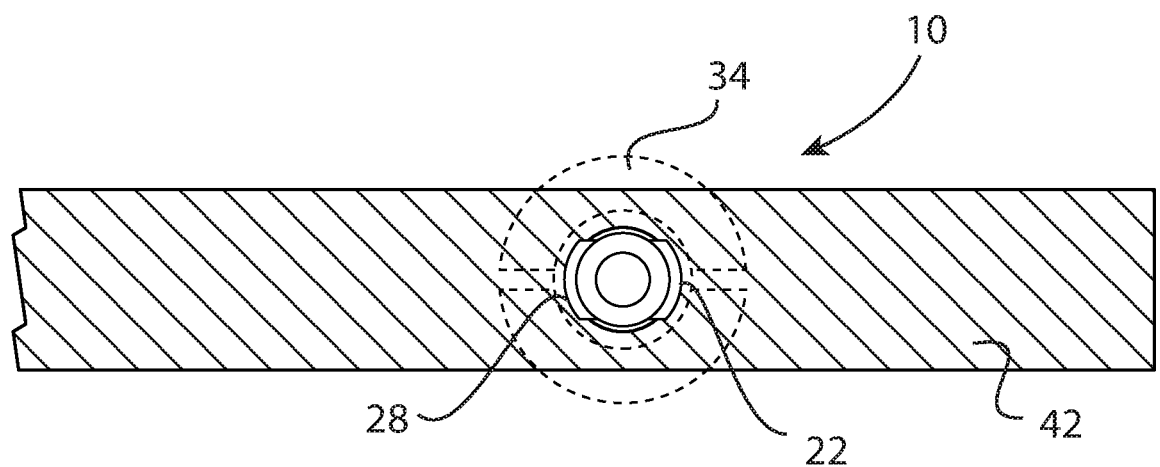
FIG. 31A shows a cross-sectional view of a panel and dovetail dowel.

FIG. 31A shows a depiction of the orientation of the barbs 22 formed on the shank 14 of the dovetail dowels 10 in FIGS. 1 through 4 in their respective first panel 42. The barbs 22 are oriented to extend parallel to the plane of the panel (left and right) which decreases the risk of splitting the panel by applying excessive force up and down.

Figure 31B:
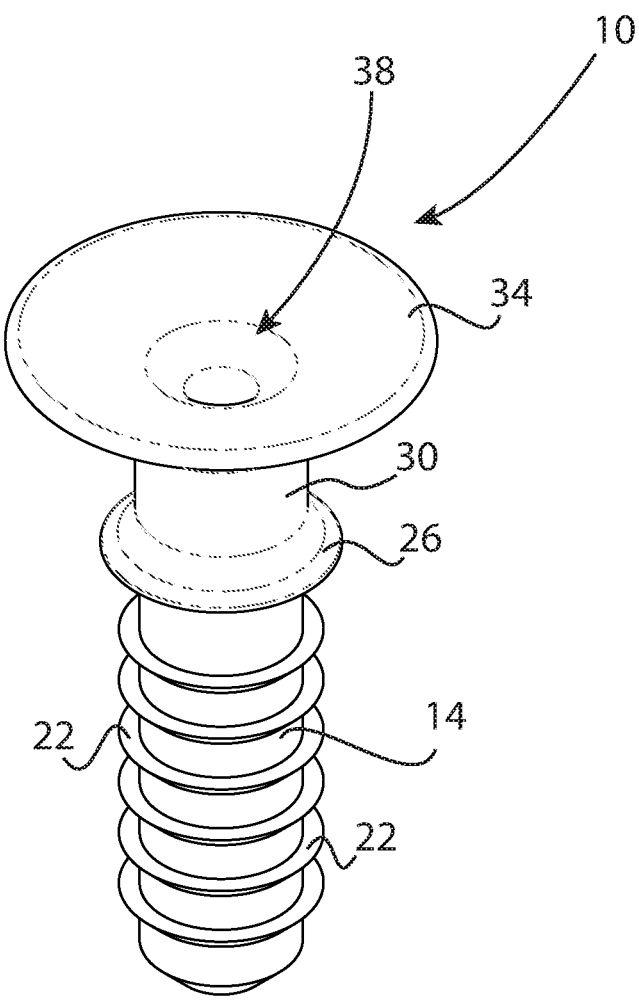
FIG. 31B shows a perspective view of a dovetail dowel.

FIG. 31B shows another embodiment of the dovetail dowel 10. When the conical head 18 does not have a preferred strength orientation, such as with the dimple recess 38 formed in the flange 34 as depicted, the barbs 22 on the dowel stem 14 can extend all the way around the stem 14, making insertion of the dowel 10 easier as the orientation of the dowel 10 is not important.

Figure 32A:
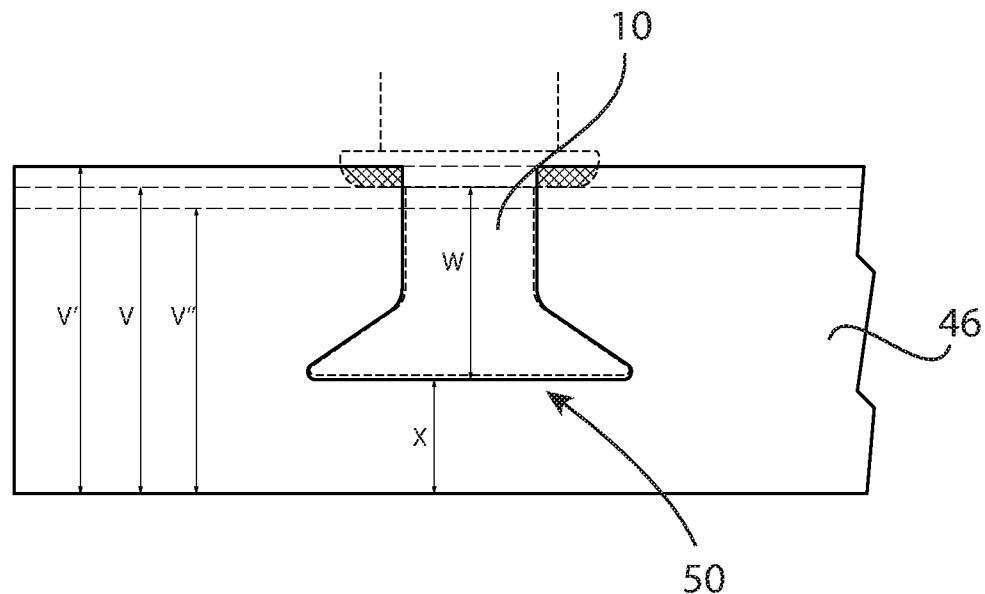
FIG. 32A shows a side view of a slot and dovetail dowel.

FIG. 32A shows a slot 50 formed into a second panel 46. Sheet material such as plywood has a nominal thickness, but actual thickness does not always match that thickness. For a dovetail dowel 10 designed for nominal thickness V, if the actual thickness V' is greater than nominal, the dovetail dowel will not fit into the slot. If the actual thickness V" is less than nominal, then there will be slop and gaps in the resulting joint.

Figure 32B:
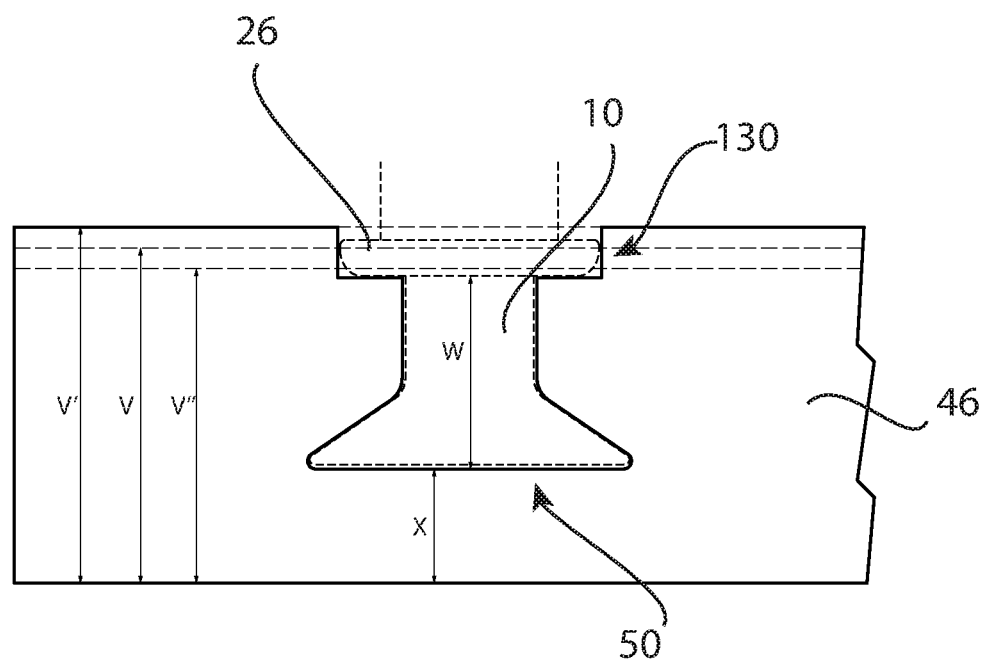
FIG. 32B shows a side view of a slot and dovetail dowel.

FIG. 32B shows a diagram illustrating how a slot 50 cut with a shouldered bit allows for an ideally tight fit that is not affected by differences in material thickness of the second panel 46. The slot 50 is cut with an upper recess 130 that contacts the shoulder 26 of the dowel 10 and provides for a controlled fit.

Figure 33:
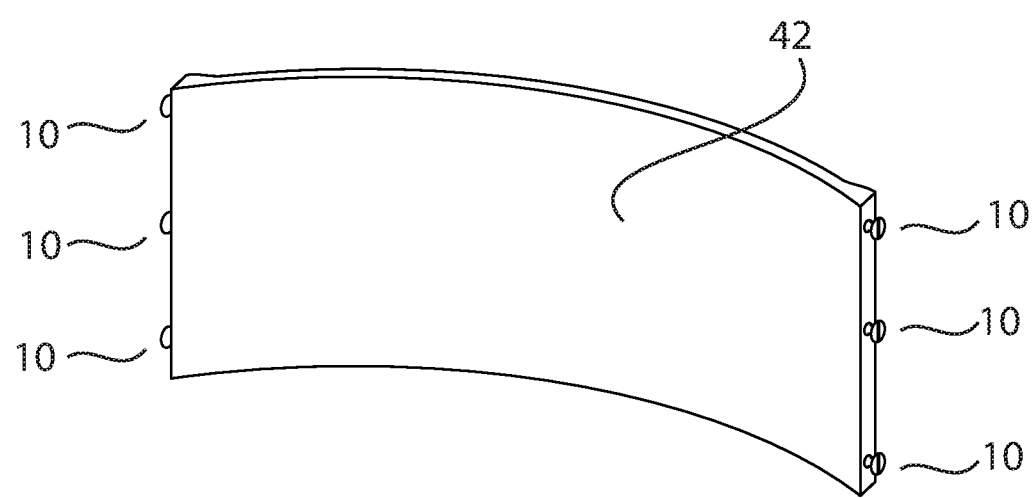
FIG. 33 shows a perspective view of a panel and dovetail dowels.

FIG. 33 shows another embodiment of the dovetail dowel 10. The dowels 10 are formed as part of an injection-molded plastic furniture panel 42 which may be made as one solid piece, with the dowel heads 18 extending from and formed as an integral part of the panel 42. The dovetail heads 18 extend from an edge of the panel 42. The panel is assembled to a second panel 46 as discussed above.

Figure 34A:
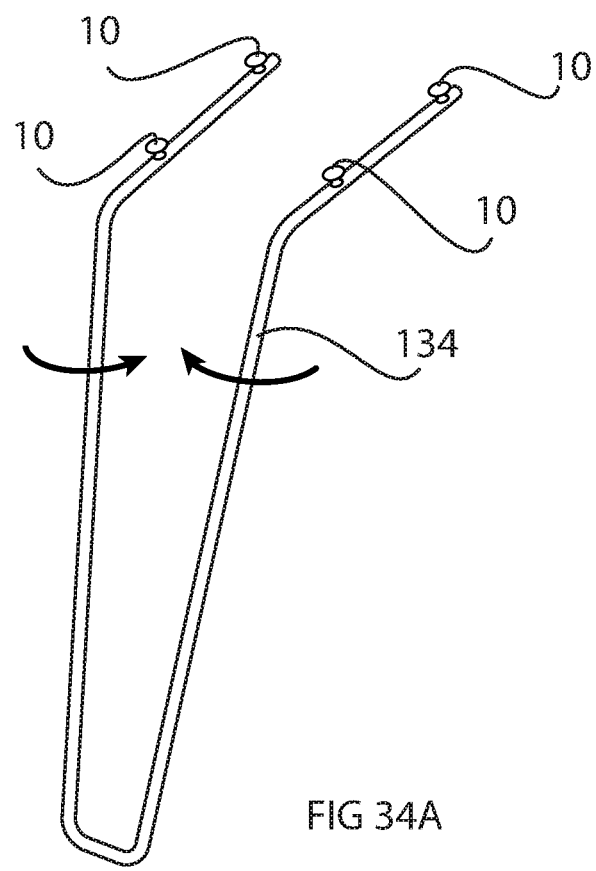
FIG. 34A shows a perspective view of a table leg and dovetail dowels.

FIG. 34A shows a hairpin leg 134 which may be used as a table or desk leg, for example. The leg 134 has dovetail head dowels 10 fastened to the two ends and extending upwardly from the leg 134. The leg 134 may be formed from metal rod or tube, and the dowels 10 may be attached to holes formed through the rod. The hairpin leg may flex somewhat, allowing the dovetail dowels 10 to enter and remain in their slots.

Figure 34B:
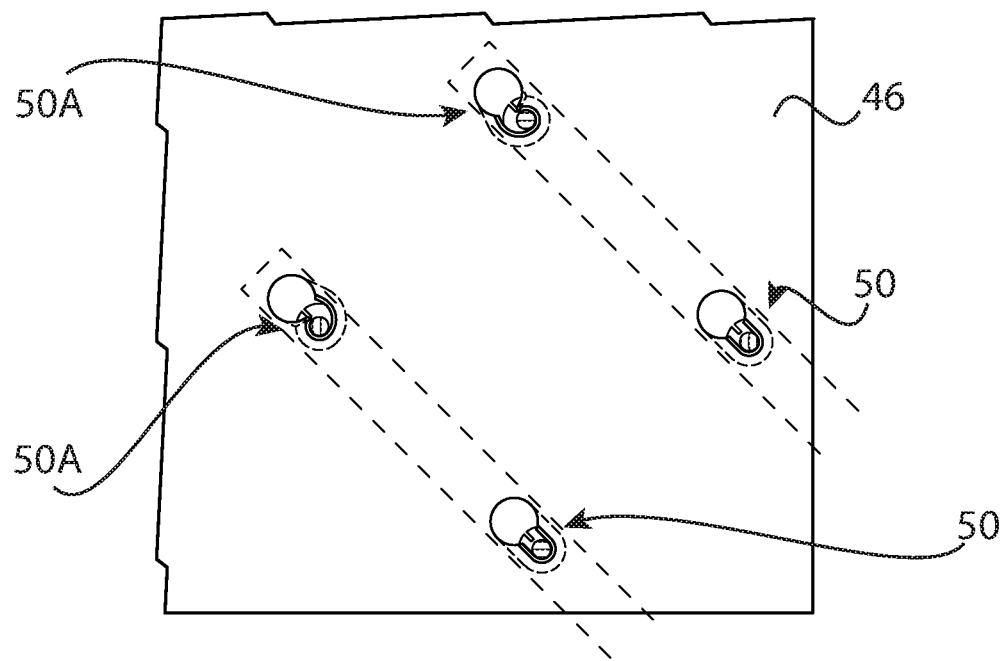
FIG. 34B shows a bottom view of a table top and the table leg.

FIG. 34B shows a portion of a panel 46 such as a table panel with four dovetail slots 50, 50A designed to accept the dowel heads 18 found on the hairpin leg 134 in FIG. 35A. Two of the slots 50A are curved-path slots, which force the hairpin leg 134 to flex during assembly, and prevent the heads 18 from coming out of their slots 50, 50A. This embodiment of a hairpin leg 134 uses four dovetail dowels and slots, although other arrangements are possible.

Figure 35:
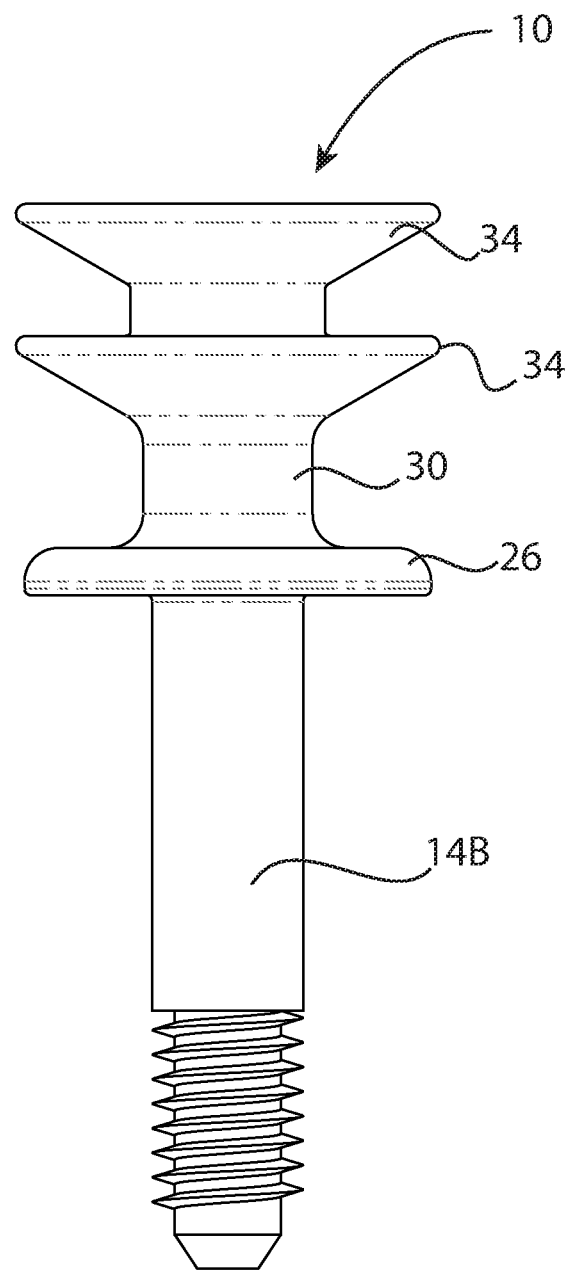
FIG. 35 shows a side view of a dovetail dowel.

FIG. 35 shows another embodiment of a dovetail dowel 10 which includes two flanges 34 which extend from above the neck 30 and engage complementary features in a slot 50.

Figure 36:
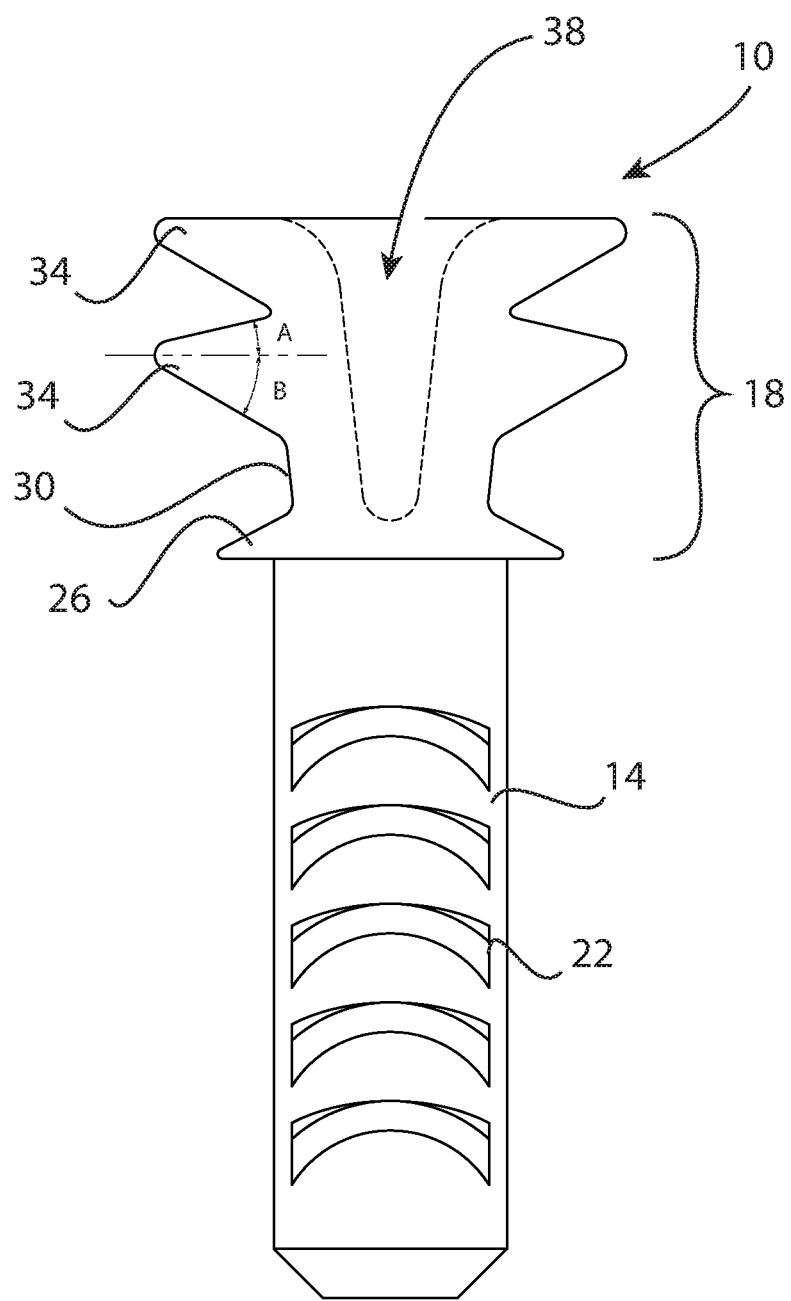
FIG. 36 shows a side view of a dovetail dowel.

FIG. 36 shows another embodiment of the dovetail dowel 10. This embodiment has two flanges 34 and a larger dimple recess 38 formed in the head 18. The two flanges 34 may allow for greater gripping power for the same diameter head, or a smaller diameter head with no loss in gripping power. When the dowel material is stronger than the slot material, Angle A should typically be smaller than Angle B in order to maximize the amount of slot material that the upper flange 34 can grab on to. The geometry and material of the head 18 can be adjusted to optimize the flexibility and stiffness of the flanges 34. More than two flanges 34 could also be used.

FIG. 37A shows a cross-sectional view of a slot 50 cut in a second panel 46 for a dowel with two flanges 34 as shown above, taken perpendicular to the length of the slot 50. An un-flexed dowel 10 with two flanges 34 is indicated with a dotted line. As seen, the angle of the flange 34 of the dovetail dowel 10 is shallower than the mating angle of the sides of the slot retention section 58 and causes the flanges 34 to bend during insertion as discussed above.

FIG. 37B shows a cross-sectional view of the slot 50 with the dovetail dowel 10 shown inserted into the retaining section 58 of the slot 50. The flanges 34 are flexed; holding the dovetail dowel 10 tightly in place and preventing any movement. It can be seen how the conical flanges 34 of the dovetail head 18 are bent downwardly and inwardly as they are inserted into the slot 50.

Figure 38A:
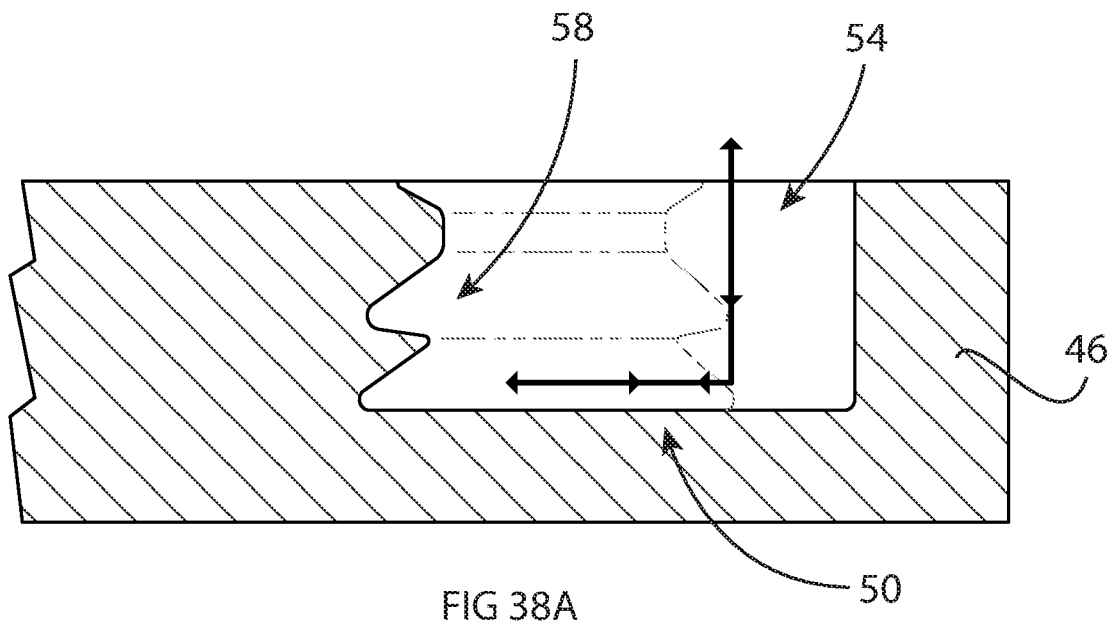
FIG. 38A shows a cross-sectional view of the slot of FIG. 37A.

FIG. 38A shows the toolpath a router bit would traverse in order to cut a simple dovetail slot 50 for the double-flange dovetail dowel 10. The bit moves down through the insertion section 54 and laterally through the retention section 58. Alternatively a slight amount of lead-in to ease assembly could be created during machining by using the path shown in FIG. 29C where A is 0 and C is one to three times D.

Figure 38B:
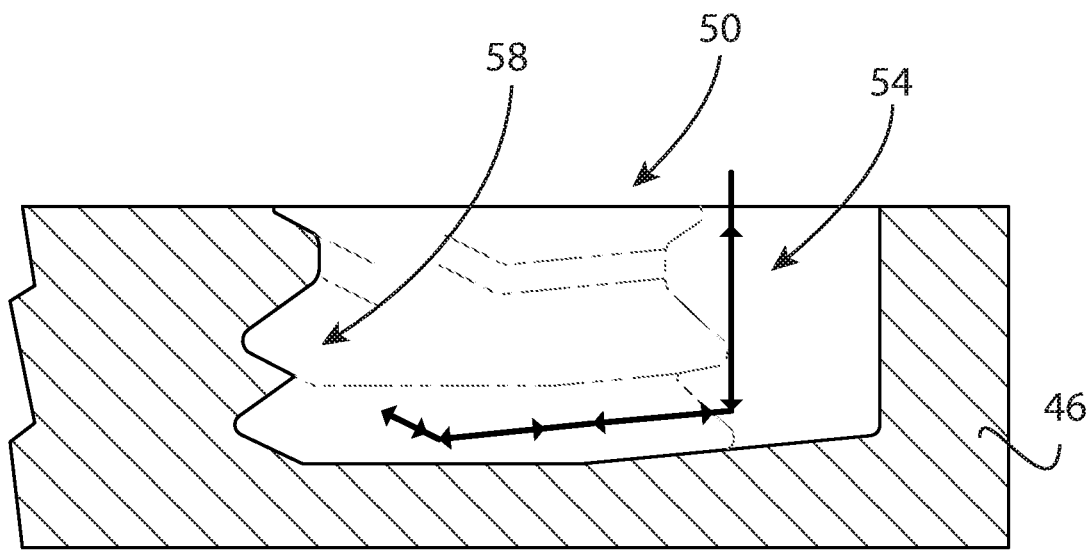
FIG. 38B shows a cross-sectional view of the slot of FIG. 37A.

FIG. 38B shows the toolpath a router bit would traverse in order to cut a variable-depth dovetail slot 50 for the double-flange dovetail dowel 10. The bit moves down through the insertion section 54 to near full depth, down and laterally through a portion of the retention section 58, and up and laterally to the end of the retention section 58.

The dowels 10 have been discussed above separately with respect to the differing stems 14 and heads 18 as well as with respect to differing slots 50. It will be appreciated that the different head designs may be used in combination with the different stem designs so as to match a preferred head flexibility with a preferred stem for fastening into different furniture panels or pieces. Additionally, these dowels may be used in combination with the various straight or ramped slots shown herein.

As has been shown above, the dowels 10 may be fastened to a first panel 42 with a barbed stem 14 that has barbs 22 which extend in two opposing directions instead of extending around the shank circumferentially in all directions. When inserted into a panel, the barbs 22 may be oriented so that they are extend parallel to the plane of the panel and apply pressure parallel to the plane of the panel and not perpendicular to the plane of the panel. This results in a dowel that is less likely to delaminate the panel due to dowel pressure, as in a standard round dowel and lends itself to use in thinner first panels 42. This is particular useful with panels made of material such as plywood, which may delaminate between layers if excessive pressure is applied.

FIG. 31B shows radial barbs which could also be used if the panel strength is sufficient. These barbs are directionally oriented (e.g. sloped towards the dowel head 18) to provide easier insertion than extraction of the dowel. Barbs could be designed to engage fully when the dowel is put under tension, pulling out slightly. Glue could also be used to ensure a secure dowel. However, Glue is not appropriate if the dowel is designed to pull out slightly under tension.

Many of the joints discussed above utilize deformation of the flange 34 when placed into a slot 50 in order to increase the stiffness of the resulting joint. To assemble a joint, the head 18 is inserted into the slot insertion section 54 and then slid in a perpendicular direction, seating it into the retaining section 58 of the slot 50. FIGS. 5C through 5D, for example, show how the head 18 is inserted and slid into place. As it is slid, the flange 34 undergoes deformation and stays deformed once the joint is assembled. This deformation creates a continual pressure and friction which keeps the furniture parts tight and resists disassembly of the joint. FIGS. 6A through 6B shows a similar process happening with the conical head of a split-head dovetail dowel being pinched in the slot. The flexing of the flange 34 allows for tolerances of slot 50 and slot depth which do not have to be as exact to maintain a snug fit. The amount of flex designed for should be kept in the plastic range of deformation for the dowel material if repeated assembly and disassembly is desired.

Some of the joints discussed above utilize axial displacement of the flange 34/dowel head to increase the stiffness of the resulting joint. In FIGS. 21B, 22B, 23A through 23B, 24A through 24B, and 26A through 26B, methods of configuring a fastener that allows for axial displacement due to deformation of one or more of the components or the part which the fastener is attached to are shown. As force is put on the head in the axial direction, one of the components deforms, and the head is displaced until it fits the slot it is being inserted into. The advantage of this type of configuration is twofold. Joints can remain snug despite manufacturing and environmental variation. Secondly, displacement-force profiles can be implemented in the mating slot to create joints that resist disassembly.

In FIGS. 21B and 22B, displacement is achieved primarily through deformation of the O-ring 110. In FIG. 24A, the furniture component 42 which the fastener is attached to is deforming to provide displacement of the head. In FIGS. 26B through 27A, the rectangular-profile coupling ring 126 is deforming to allow displacement of the flange 34. Other potential components which could be designed to deform include split lock washers, cushioning washers, tooth lock washers, spring lock washers, wave washer springs, disc washer springs, compression springs, and other compliant components.

The joint shown between dowel 10 and slot 50 is advantageous over prior art joints as it is generally less susceptible to failures or performance changes due to manufacturing variation and/or material dimension change caused by humidity and temperature.

Many manufacturing processes such as CNC routing are programmed to provide a consistent vertical height dimension, usually based off of the height of the machine bed, with a zero height reference on the bottom of the part. FIGS. 32A and 32B illustrate how a bit that cuts an upper shoulder slot 130 at the same time as the lower slot 50 can overcome some limitations of material thickness variation to create a more reliable joint. Both show a min, max, and nominal material thickness. In FIG. 32A, it can be seen that if a standard slot is made and designed for a snug fit at the nominal thickness, it will not be able to enter at a max material thickness condition, and will be loose in a min material thickness condition.

FIG. 32B shows that if a shoulder bit is used and cut at a level less than the minimum material condition, in all material conditions, the dowel 10 with a shoulder 26 will have a very snug fit in slot 50. The situation shown in FIG. 32A is subject to the variation of processes found in making wood panels. The situation shown in FIG. 32B is subject to the variation of processes found in making fasteners and router bits, which are much higher precision processes with lower variation than the wood panel thicknesses.

Three configurations of the slot 50 to achieve locking due to depth variation are disclosed. By varying the parameters in FIG. 29C they can be achieved. Typically, D should be high enough to provide a ramp which eases assembly force. The length of C may also affect the force to assemble, with a longer ramp requiring less force. Note that the head 18 (e.g. flange 34) also can provide ramping, and so in some cases D can be zero. j In a first configuration, in order for the head 18 to be slid sideways, the flange 34 must be bent or axially displaced, increasing the force required to assemble the joint. At the end of the slot, A is configured to allow relaxation of the flexible component. In order to disassemble, the head has to traverse the reverse path from the relaxed position through the fully displaced position to the slot opening, again requiring a higher force to deform the head.

Dimension A may be zero and the head 18 stays fully stressed when assembled. This creates the snuggest joint but has the least resistance to disassembly.

Several embodiments that create positive locking resistance to disassembly are shown. The dowel 10 in FIG. 8 has a locking flange 66 that can prevent the piece it is attached to from moving once installed. In FIG. 10A the head 18 is inserted into the slot and the locking flange 66 elastically deforms. In FIG. 10B, after being slid to the far end of the slot, the locking flange 66 pops down into its relaxed state, creating a positive lock. Machining could be done with one bit as shown in FIG. 29B.

FIG. 20 shows the same type of locking flange 66 applied to a metal part. The locking flange 66 would likely be spring steel, but could also be configured as a wire piece rather than a sheet metal piece. It could also be plastic. The same locking flange 66 could also be applied to fasteners like those seen in FIGS. 16, 17, 18, 21, 22, and 23.

The joints discussed herein have broad application to furniture as a variety of materials can be jointed including solid wood, plywood, mdf, particle board, plastic sheets, plastic shaped parts, sheet metal parts, tube and pipe parts, etc. Many pieces of furniture that use standard fasteners could also be retrofitted with minimal change.

Plastic dowels 10 would be well suited for a variety of case goods including bookcases, bookshelves, drawers, TV stands, chairs, coffee tables, side tables, cabinets, chests, ottomans, beds, dressers, nightstands, armoires, benches, bar stools, desks, filing cabinets, etc. The dowels could join the side panels to the back panels, for example. FIG. 33 shows how the dowels could be included directly into a plastic molded piece such as a chair back. FIG. 34 shows a tubular table leg. FIGS. 23A and 23B would also be suited for metal chair or table legs or metal panels in furniture.

Figure 39:
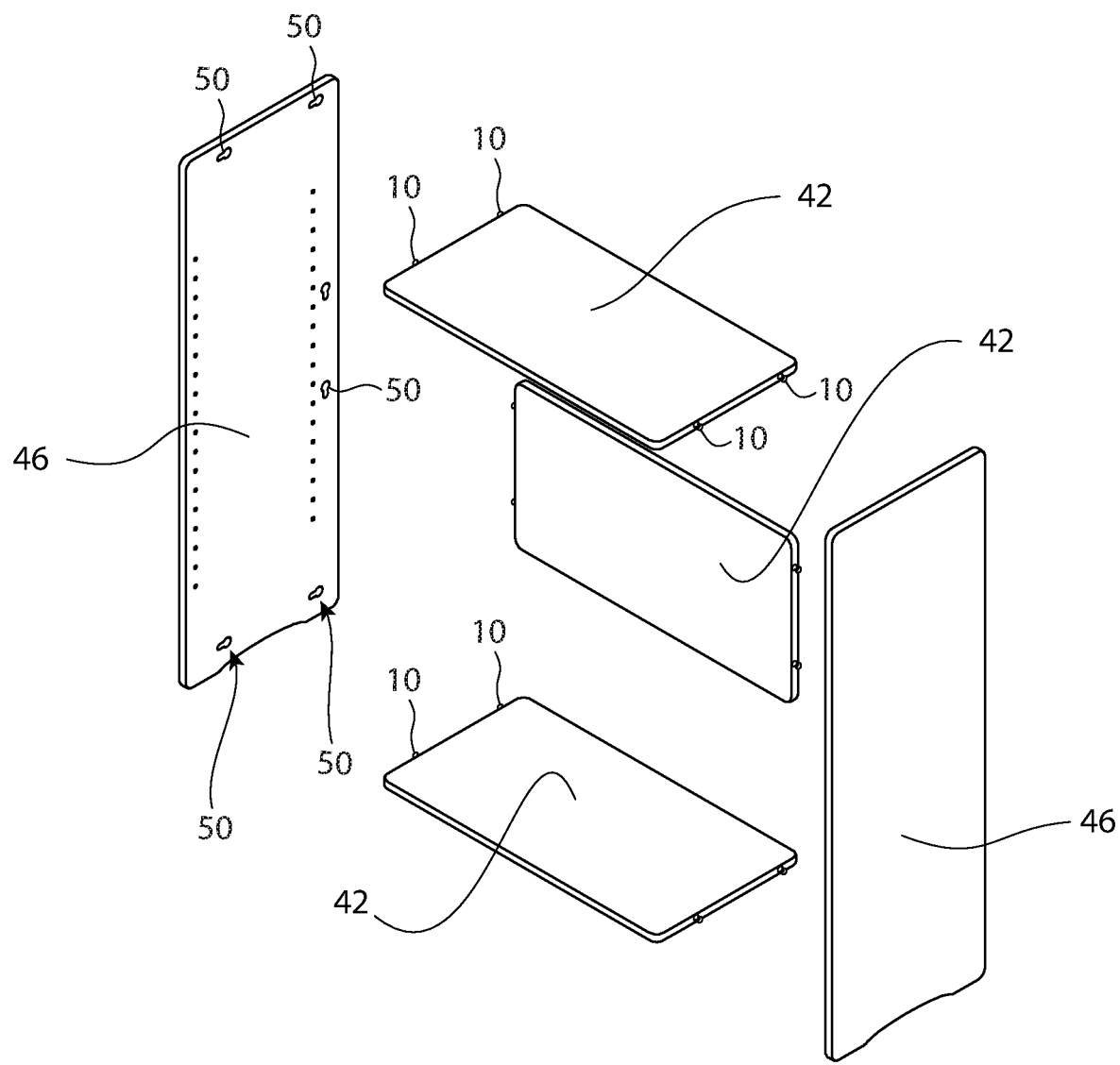
FIG. 39 shows an exploded view of a furniture cabinet using the dovetail dowel and slot.
Figure 40:
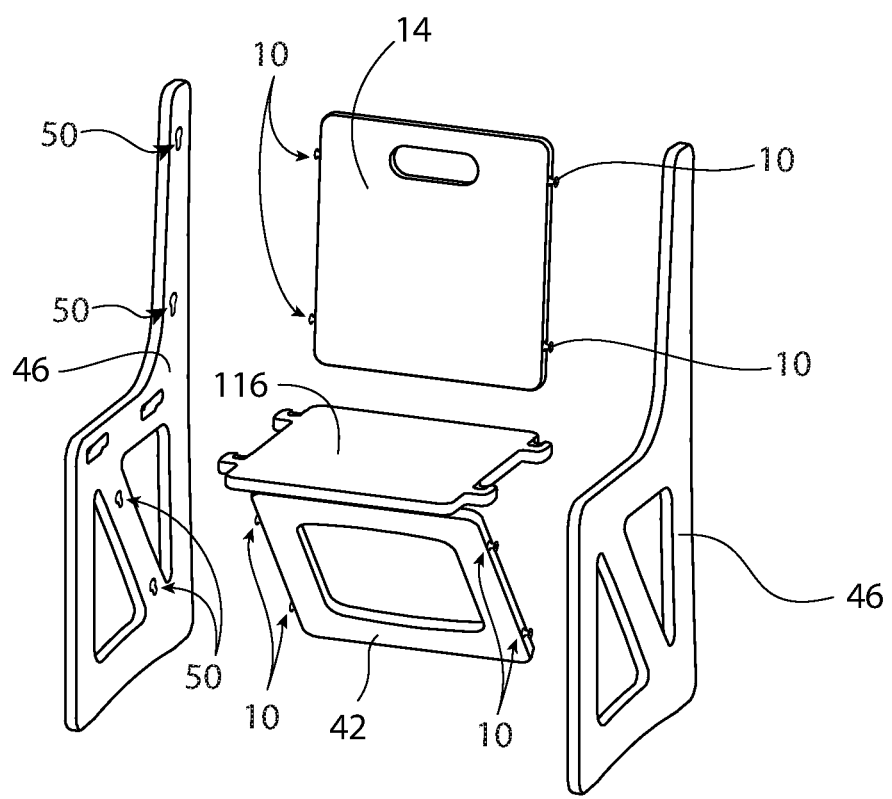
FIG. 40 shows an exploded view of a chair using the dovetail dowel and slot.

The joint can be used to create a variety of furniture pieces including case goods (bookshelves, dressers, night stands, cabinets) as well as other furniture. FIGS. 39 and 40 show different pieces of modular furniture for the purpose of illustrating how the dowel and slot may be utilized in modular furniture. FIG. 29 illustrates how the dowel and slot may be used to create a bookcase or other case or box based goods such as a chest, storage box, etc. The dowels 10 and slots 50 may be used between side panels 46 and any or all of back and shelf panels 42. The dowels 10 extend from the back and shelf panels 42 in the manner shown in FIG. 33. FIG. 40 illustrates how the dowel 10 and slot 50 may be used to create a chair, bench, or other similar item of modular furniture. The dowels 10 and slots 50 may be used in joints between side panels 46 and panels such as the back or brace panels 42. The dowels 10 extend from the back and brace panels 42 in the manner shown in FIG. 33. If desired for strength, conventional tabs 138 and slots 142 may be used between the seat panel 146 and the side panels 46. In each example item of modular furniture, one or more joints between intersecting panels or parts may be made with the dowel 10 and slot 50 disclosed herein. The dowel and slot joints of the present invention may thus be used in items of modular furniture to provide an improvement of stability, strength, and ease of assembly over prior art tab and slot joints, and to provide a joint which is not inadvertently disassembled. The dowel and slot joints also provide easier manufacturing than many prior art joints.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. An article of modular furniture having a joint comprising:
    a first panel having a dowel extending from the first panel;
    wherein the dowel includes a neck and a flange which extends laterally from the neck;
    a second panel having a slot formed therein;
    wherein the slot comprises an insertion section extending downwardly into a face of the second panel and a retention section extending laterally from the insertion section, wherein the retention section comprises a narrow channel which extends downwardly through the face of the second panel and laterally away from the insertion section and a wide lower portion which is disposed beneath the narrow channel and which extends wider than the narrow channel;
    wherein the dowel is inserted into the slot so that the neck is located in the narrow channel and so that the flange is located in the wide lower portion of the retention section of the slot;
    wherein the flange is elastically bent by the lower portion of the retention section such that portions of the flange are bent away from the first panel; and
    wherein the flange is maintained in a bent configuration when the joint is in an assembled configuration.

2. The article of modular furniture of claim 1, wherein the flange comprises a sloped surface which slopes outwardly from the neck and away from the first panel, wherein the sloped surface engages a corresponding sloped surface in the slot retention section, and wherein the sloped surface is bent away from the first panel by the slot retention section.

3. The article of modular furniture of claim 1, wherein the dowel comprises a stem which extends from the dowel neck, and wherein the stem is inserted into a hole in the first panel to secure the dowel to the first panel.

4. The article of modular furniture of claim 1, wherein the dowel comprises a shoulder disposed adjacent the first panel, wherein the neck extends away from the shoulder, and wherein the flange is located adjacent a distal end of neck.

5. The article of modular furniture of claim 1, wherein the dowel comprises a recess formed in a distal end of the flange which increases the flexibility of the flange to allow edges of the flange to bend away from the first panel.

6. The article of modular furniture of claim 1, wherein the slot retention section comprises a sloped surface which engages the dowel flange and which is sloped relative to the second panel and increases in depth moving away from the insertion section to a first point along a length of the retention section, and wherein the dowel flange is increasingly bent as it moves from the insertion section to the first point.

7. The article of modular furniture of claim 6, wherein the retention section sloped surface decreases in depth from the first point to an end of the retention section disposed away from the insertion section, and wherein the dowel flange is unbent as it moves from the first point to the end of the retention section.

8. The article of modular furniture of claim 1, wherein the joint further comprises a locking element which prevents the dowel from moving out of the retention section of the slot.

9. The article of modular furniture of claim 8, wherein the locking element is a spring loaded pin extending from the first panel and engaging a hole formed in the second panel to prevent lateral movement of the first panel relative to the second panel.

10. The article of modular furniture of claim 8, wherein the locking element is a locking flange which extends laterally from the dowel, and wherein the locking flange engages a surface in the slot to prevent the dowel from moving out of the slot retention section.

11. The article of modular furniture of claim 1, wherein the dowel is generally circular in cross section.

12. An article of modular furniture comprising:
    a first component which forms a piece of the modular furniture;
    a dowel attached to the first component and extending from the first component;
    wherein the dowel includes a neck which extends beyond the surface of the first component and a flange which extends laterally from the neck portion;
    a second component which forms a piece of the modular furniture and which is attached to the first component;
    a slot formed in the second component;
    wherein the slot comprises an insertion section extending into a face of the second component and a retention section extending laterally from the insertion section,
    wherein the retention section comprises a narrow channel which extends downwardly through the face of the second component and laterally away from the insertion section and a wide lower portion which is disposed beneath the narrow channel and which extends wider than the narrow channel;

wherein the dowel is disposed in the slot so that the neck is located in the narrow channel and so that the flange is located in the wide lower portion of the retention section of the slot;

wherein the dowel is elastically deformed by the lower portion of the retention section such that portions of the flange are moved away from the first panel by contact with the second panel; and wherein the dowel is maintained in an elastically deformed configuration when the joint is in an assembled configuration.

13. The article of modular furniture of claim 12, wherein the dowel flange is flexible and wherein the flange is bent from contact with the slot retention section.

14. The article of modular furniture of claim 13, wherein the dowel comprises a recess formed in a distal end of the flange which increases the flexibility of the flange to allow edges of the flange to bend away from the first panel.

15. The article of modular furniture of claim 12, wherein the flange comprises a sloped surface which slopes outwardly from the neck and away from the first panel, wherein the sloped surface engages a corresponding sloped surface in the slot retention section, and wherein the sloped surface is bent away from the first panel by the slot retention section.

16. The article of modular furniture of claim 12, wherein the dowel comprises a stem which extends from the dowel neck, and wherein the stem is inserted into a hole in the first panel to secure the dowel to the first panel.

17. The article of modular furniture of claim 12, wherein the dowel comprises a shoulder disposed adjacent the first panel, wherein the neck extends away from the shoulder, and wherein the flange is located adjacent a distal end of neck.

18. The article of modular furniture of claim 12, wherein the slot retention section comprises a sloped surface which engages the dowel flange and which is sloped relative to the second panel and increases in depth moving away from the insertion section to a first point along a length of the retention section, and wherein the dowel flange is increasingly bent as it moves from the insertion section to the first point.

19. The article of modular furniture of claim 18, wherein the retention section sloped surface decreases in depth from the first point to an end of the retention section disposed away from the insertion section, and wherein the dowel flange is unbent as it moves from the first point to the end of the retention section.

* * * * *